United States Patent
Takahashi et al.

[11] Patent Number: 5,729,387
[45] Date of Patent: Mar. 17, 1998

[54] SOLAR LIGHTING APPARATUS AND CONTROLLER FOR CONTROLLING THE SOLAR LIGHTING APPARATUS

[75] Inventors: Kazuo Takahashi, Ota; Norioki Fujimoto, Kumagaya; Masashi Takazawa, Oizumi-machi; Takashi Odaira; Tomohito Koizumi, both of Ota; Kiyondo Kobayashi, Ashikaga; Syozo Kato; Tetsuo Miyamoto, both of Ota; Mamoru Kubo, Sakai-machi, all of Japan

[73] Assignee: Sanyo Electric Co., Ltd., Moriguchi, Japan

[21] Appl. No.: 831,182

[22] Filed: Apr. 2, 1997

Related U.S. Application Data

[63] Continuation of Ser. No. 450,782, May 25, 1995, abandoned.

[30] Foreign Application Priority Data

| Feb. 17, 1899 | [JP] | Japan | 7-052116 |
| May 31, 1994 | [JP] | Japan | 6-118935 |
| May 31, 1994 | [JP] | Japan | 6-118936 |
| Jun. 29, 1994 | [JP] | Japan | 6-148036 |
| Jun. 29, 1994 | [JP] | Japan | 6-148038 |
| Jul. 29, 1994 | [JP] | Japan | 6-179152 |
| Jul. 29, 1994 | [JP] | Japan | 6-179157 |
| Feb. 7, 1995 | [JP] | Japan | 7-041434 |
| Feb. 7, 1995 | [JP] | Japan | 7-041436 |
| Feb. 20, 1995 | [JP] | Japan | 7-053793 |
| Feb. 24, 1995 | [JP] | Japan | 7-060007 |

[51] Int. Cl.$^6$ .................... F04B 7/18; G02B 17/00
[52] U.S. Cl. .................... 359/591; 359/592; 250/203.4
[58] Field of Search .................... 359/591, 592; 250/203.4

[56] References Cited

U.S. PATENT DOCUMENTS

| 4,114,186 | 9/1978 | Dominguez . | |
| 4,377,154 | 3/1983 | Meckler | 126/425 |
| 4,382,434 | 5/1983 | Meckler | 126/425 |
| 4,429,952 | 2/1984 | Dominguez . | |
| 4,509,825 | 4/1985 | Otto et al. | 350/259 |
| 4,761,716 | 8/1988 | Mori . | |
| 4,883,340 | 11/1989 | Dominguez . | |
| 5,461,496 | 10/1995 | Kanada et al. | 359/592 |
| 5,493,824 | 2/1996 | Webster et al. | 52/200 |

OTHER PUBLICATIONS

Patent Abstracts of Japan, JP-A-61 180217, Aug. 12, 1986.

*Primary Examiner*—Daniel P. Malley
*Attorney, Agent, or Firm*—Oblon, Spivak, McClelland, Maier & Neustadt, P.C.

[57] ABSTRACT

A solar lighting apparatus according to the present inveniton is configured so that one lighting prism plate is rotatably arranged in a lighting portion or a plurality of lighting prism plates are rotatably arranged in the lighting portion at intervals of a predetermined distance, and a prism angle of each the lighting prism plate is controlled correspondingly to the height and azimuth of the sun so that the sunlight refracted by the lighting prism plates goes out in a predetermined direction. Therefor, the lighting prism plates and parts relevant thereto are formed under predetermined conditions.

A solar lighting controller in a solar lighting apparatus operated under predetermined conditions for improvement of lighting efficiency, reduction of consumed electric power, etc., the controller comprising a solar position detector, a central processing unit including an arithmetic operation storage means such as a micro computer and a necessary means such as an optical axis sensor.

24 Claims, 54 Drawing Sheets

FIG. 2

| ITEM | | FIRST LIGHTING PRISM PLATE | | SECOND LIGHTING PRISM PLATE | |
|---|---|---|---|---|---|
| | | FIRST FACE | SECOND FACE | FIRST FACE | SECOND FACE |
| DESIGN VALUE | PRISM VERTICAL ANGLE | PLANE | 42.0° | PLANE | 51.5° |
| | PRISM PITCH | 1 mm | | 0.5 mm | |
| | MATERIAL | POLYCARBONATE (PC) | | | |
| | SIZE (THICKNESS) | 500 φ (2 mm) | | | |
| CHARACTERISTIC | CONTROL RANGE | SOLAR HEIGHT 10° ~ 84° | | | |
| | TRANSMITTANCE | 55.4 % ±13% | | | |

FIG. 3A
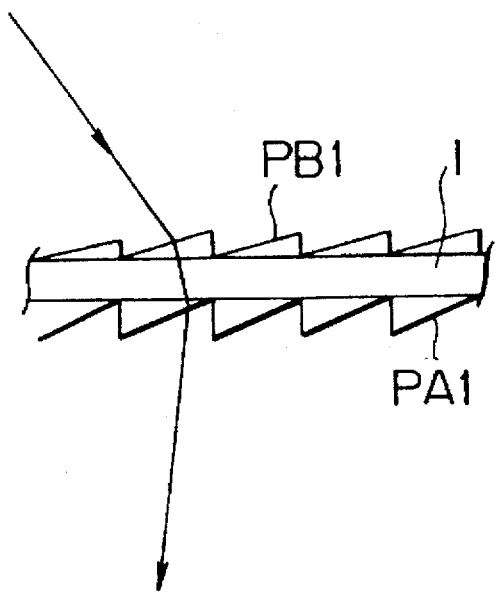
FIG. 3B
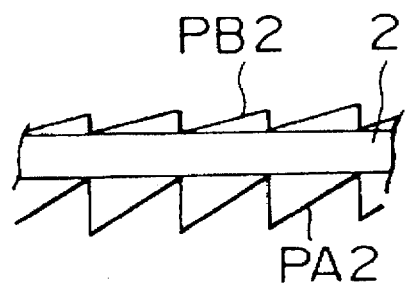
FIG. 4
| SOLAR HEIGHT / FIRST FACE | PLANE (COMPARATIVE) | 5° |
|---|---|---|
| 20° | 68% | 73% |
| 50° | 72% | 75% |
| 70° | 61% | 63% |

FIG. 6A

| SHAPE<br>NUMBER OF PLATES | $\alpha_n$ | $\beta_n$ | $P_n$ | $t_n$ | MATERIAL |
|---|---|---|---|---|---|
| FIRST PLATE | 0° | 45.0° | 1.0 mm | 2.0 mm | PMMA |
| SECOND PLATE | 0° | 51.48° | 1.0 mm | 2.0 mm | PC |

FIG. 6B

| SOLAR HEIGHT | 15° | 30° | 45° | 60° | 75° |
|---|---|---|---|---|---|
| DISPERSION | 2.0° | 1.7° | 1.3° | 1.0° | 1.2° |

FIG. 7A

| SHAPE<br>NUMBER OF PLATES | $\alpha_n$ | $\beta_n$ | $P_n$ | $t_n$ | MATERIAL |
|---|---|---|---|---|---|
| FIRST PLATE | 0° | 47.03° | 1.0 mm | 2.0 mm | PC |
| SECOND PLATE | 39.24° | -0.17° | 1.0 mm | 2.0 mm | PMMA |
| THIRD PLATE | -2.92° | 3.07° | 1.0 mm | 2.0 mm | PC |

FIG. 7B

| SOLAR HEIGHT | 15° | 30° | 45° | 60° | 75° |
|---|---|---|---|---|---|
| DISPERSION | 0.8° | 1.0° | 1.4° | 1.5° | 1.4° |

FIG. 8A

| SHAPE / NUMBER OF PLATES | $\alpha_n$ | $\beta_n$ | $P_n$ | $t_n$ | MATERIAL |
|---|---|---|---|---|---|
| FIRST PLATE | 0° | 35.35° | 1.0 mm | 2.0 mm | PMMA |
| SECOND PLATE | 16.83° | 12.55° | 1.0 mm | 2.0 mm | PC |
| THIRD PLATE | 20.10° | 7.49° | 1.0 mm | 2.0 mm | PC |

FIG. 8B

| SOLAR HEIGHT | 15° | 30° | 45° | 60° | 75° |
|---|---|---|---|---|---|
| DISPERSION | 1.2° | 1.1° | 1.0° | 0.8° | 0.6° |

FIG. 9A

| SHAPE / NUMBER OF PLATES | $\alpha_n$ | $\beta_n$ | $P_n$ | $t_n$ | MATERIAL |
|---|---|---|---|---|---|
| FIRST PLATE | 0° | 42.0° | 1.0 mm | 2.0 mm | PC |
| SECOND PLATE | 0° | 51.48° | 1.0 mm | 2.0 mm | PC |
| THIRD PLATE | 52.37° | 2.11° | 1.0 mm | 2.0 mm | PMMA |
| FOURTH PLATE | 30.11° | 10.80° | 1.0 mm | 2.0 mm | PC |

FIG. 9B

| SOLAR HEIGHT | 15° | 30° | 45° | 60° | 75° |
|---|---|---|---|---|---|
| DISPERSION | 0.5° | 0.4° | 0.2° | 0.8° | 1.5° |

| SHAPE<br>NUMBER OF PLATES | $\alpha_n$ | $\beta_n$ | $P_n$ | $t_n$ | MATERIAL |
|---|---|---|---|---|---|
| FIRST PLATE | 0° | 42° | 1.0 mm | 2.0 mm | PC |
| SECOND PLATE | 0° | 51.48° | 1.0 mm | 2.0 mm | PC |

| SOLAR HEIGHT | 15° | 30° | 45° | 60° | 75° |
|---|---|---|---|---|---|
| DISPERSION | 2.3° | 2.0° | 1.5° | 1.3° | 2.2° |

FIG.15
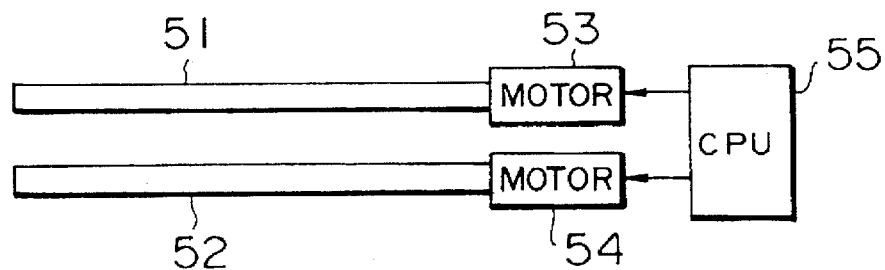
FIG.16
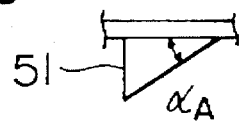
FIG.17
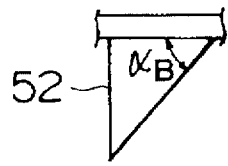
FIG.18
| MATERIAL OF PRISM | FIRST LIGHTING PRISM PLATE | | SECOND LIGHTING PRISM PLATE | |
|---|---|---|---|---|
| | FIRST FACE | SECOND FACE | FIRST FACE | SECOND FACE |
| PMMA | 0° | 45° | 0° | 61.16° |
| PC | 0° | 42° | 0° | 51.48° |

| CONDITIONS OF MEASUREMENT \ STATE OF MEASUREMENT FACE | ILLUMINATION IN EACH CASE [Lx] | | | | |
|---|---|---|---|---|---|
| | JUST UNDER | 1 [m] | 2 [m] | 3 [m] | 4 [m] |
| (1) SKYLIGHTING OF INVENTION | 2000 | 1000 | 400 | 200 | 80 |
| (2) NO LIGHTING PRISM PLATE (CONVENTIONAL CASE) | 150 | 80 | 40 | 10 | 10 |
| (3) SKYLIGHTING OF INVENTION (NO DIRECT SUNLIGHT) | 100 | 70 | 40 | 10 | 10 |

SOLAR LIGHTING APPARATUS AND CONTROLLER FOR CONTROLLING THE SOLAR LIGHTING APPARATUS

This application is a Continuation of application Ser. No. 08/450,782, filed on May 25, 1995, now abandoned.

BACKGROUND OF THE INVENTION

1. Field of the Invention

The present invention relates to an improvement in a solar lighting apparatus having flat lighting prism plates in a lighting portion and to an improvement in a solar lighting controller for controlling the solar lighting apparatus.

2. Description of the Prior Art

The basic configuration of a solar lighting apparatus will be first described with reference to FIG. 78.

In FIG. 78, a portion indicated by the solid line shows the configuration of a conventional solar lighting apparatus whereas a portion indicated by the two-dot-and-dash line shows the configuration of Embodiments 6-1 to 6-4 according to the present invention. In FIG. 78, the reference numeral 301 designates a roof of a building; 302a to 302d, walls of the building; 303a and 303b, windows; and 304, an electric lamp provided in a room of the building.

The reference numeral 305 designates a solar lighting apparatus; 306, a duct through which the sunlight collected by the solar lighting apparatus 305 is led indoors; and 320, a lighting prism plate which is a chief constituent member of a lighting portion of the solar lighting apparatus 305.

In the aforementioned configuration, the sunlight is collected by the solar lighting apparatus 305 and is led indoors through the duct 306.

As a specific structure of the lighting prism plate 320 provided in a lighting portion, for example, there is known a structure described in Japanese Patent Unexamined Publication (JP-A) No. 61-180217.

In the structure described in Japanese Patent Unexamined Publication (JP-A) No. 61-180217, as shown in FIGS. 79A and 79B, two transparent plates having finely roughened surfaces for performing a prism function, are provided that is, so-called lighting prism plates (Flesnel prisms) $P_1$ and $P_2$ are laid to overlap each other, at least one lighting prism plate $P_1$ (or $P_2$) is rotated so that direct light rays from the sun are sent out in a predetermined direction regardless of the position of the sun.

As for a lighting prism plate driver/holder in the conventional solar lighting apparatus, there arise problems as follows.

(1) In the structure of these lighting prism plates, it is comprehensible that the lighting prism plates are driven to optimize the prism rotation angle (hereinafter referred to as "prism angle") of each lighting prism plate correspondingly to the movement of the sun. However, it is unclear how to drive the lighting prism plates and how to hold the lighting prism plates. In other words, the structure of a lighting prism plate driver/holder is unclear. Accordingly, it is difficult to produce a practical apparatus of the prior art.

(2) For example, from the description of the prior art publication, it may be that of a structure in which as means for rotating and holding the lighting prism plates $P_1$ and $P_2$ of FIGS. 79A and 79B, a shaft is provided in the center axis C of the lighting prism plates $P_1$ and $P_2$ so that not only is this shaft is rotatably held, but also torque of a motor, or the like, is given to the shaft. In this structure, however, the shadow of the shaft and the shadow of portions for supporting the shaft are projected onto the lighting prism plates, so that the sunlight collecting effect is lowered greatly.

As a conventional example of the lighting prism plate, there is a lighting prism plate, for example, shown in FIG. 80. In FIG. 80, the reference numeral 351 designates a lighting prism plate in which a plurality of saw-toothed micro prism portions $351a_1$, $351a_2$, $351a_3$, . . . having vertical inoperative faces (which are not used as optical faces) K are formed on the lower face of the lighting prism plate 351. Accordingly, in this occasion, the inoperative face angle $\alpha$ is 90°.

In FIG. 80, the reference character Y designates a drive shaft which is arranged so as to be perpendicular to the center portion of the lighting prism plate. The drive shaft Y serves to rotate the lighting prism plate 351 correspondingly to the movement of the sun by means of a motor (not shown) on the basis of an instruction given from a micro computer, or the like.

In the aforementioned configuration, transmitted light goes out of the lighting prism plate 351 at an outgoing angle of $\theta_h$ as represented by the broken line when the sun is at a relatively high height (or altitude, but hereinafter wholly referred to as "height") of $T_1$, whereas transmitted light goes out of the lighting prism plate 351 at an outgoing angle of $\theta_e$ as represented by the two-dot-and-dash line when the sun is at a relatively low height of $T_2$.

Further, when the sun is at a lower height of $T_3$, transmitted light is, however, blocked by the inoperative face K of the lighting prism plate 351 so as to be reflected to an ineffective region.

As described above, analysis of the property of the prior art type lighting prism plate 351 shows the following results.

(1) The influence of the shape of the inoperative face K constituting the lighting prism plate 351 is large so that outgoing light is blocked to be not transmitted but reflected when outgoing light from one micro prism portion strikes on the inoperative face of the next micro prism portion.

(2) Further, in the case where a plurality of lighting prism plates 351 are used in this system, for example, outgoing light from the first lighting prism plate is required to be effectively incident on the optical face of the second lighting prism plate and incident on the optical faces of lighting prism plates after the second lighting prism plate. Though not shown, displacement between the respective lighting prism plates 351 must be designed to be an optimum value.

Further, a conventional skylight apparatus is configured as shown in FIG. 81.

In FIG. 81, the reference numeral 421 designates a skylight frame; 422, a transparent cover; and 423, a diffusion plate which is provided as occasion demands and which serves to diffuse sky light to take the diffused sky light indoors.

That is, the basic object of the conventional skylight apparatus is to take mainly sky light indoors as room lighting but not to positively control the direction of light taken indoors. Because the conventional skylight apparatus has the configuration in which sky light is taken indoors simply as described above, there arises a problem that a sufficient quantity of light cannot be obtained as room lighting. Further, also in the case where a diffusion plate is arranged in the outgoing portion of the indoor side, there is nothing but diffusing sky light to lead the diffused sky light indoors. Therefore, a skylight apparatus having a light distribution plate set instead of the diffusion plate is seen but also in this case the way of spreading light and the intensity of light cannot be changed or adjusted freely.

Accordingly, in the conventional apparatus, when the distribution or intensity of light is to be changed, there is only a way in which the light distribution plate is replaced by a new one. There arises therefore a further problem that a risk due to work in a high place and a cost for spare light distribution plates are required.

Further, a conventional solar lighting controller is configured, for example, as shown in FIG. 82. In FIG. 82, the reference numeral 501 designates a flat lighting prism plate constituting a lighting portion. The lighting prism plate 501 has a plurality of triangular micro prism portions 501a which are formed on the lower face portion thereof, and teeth (not shown) which are formed on the outer circumferential portion thereof so as to engage with teeth of a gear 503 which will be described later. The reference numeral 502 designates a motor; and 503, a gear for rotating the lighting prism plate 501 by the driving force of the motor. The reference numeral 504 designates a central processing unit (hereinafter referred to as "CPU") constituted by an arithmetic operation storage means such as a micro computer, or the like. The CPU 504 has a storage function and an arithmetic operation function. The reference numeral 505 designates an input device for the CPU 504; 506, a connection shaft for connecting the gear 503 and the motor 502; and 507 and 508, lead wires, respectively.

In the aforementioned configuration, data concerning every date and every time and initial data concerning the height, azimuth, etc. of the sun on the date and time are supplied to the CPU 504 through the input device 505.

Here, the CPU 504 calculates a prism angle of the lighting prism plate 501 every hour by carrying out an arithmetic operation on the initial data and gives an instruction of the prism angle to the motor 502 to drive the motor 502 to rotate the lighting prism plate 501 through the gear 503 to thereby pursue the movement of the sun so that direct light from the sun is collected appropriately.

Because the conventional solar lighting controller has the aforementioned structural defect in that a long time and a high cost are taken for data input if accurate data adapted to the place where the apparatus is set are to be given to the input device, standard data are stored in advance in the input device so that a control signal is computed by the CPU while the sunlight is pursued only on the basis of the data given from the input device.

The initial data from the input device, however, do not correspond to all differences in the point of time and the height and azimuth of the sun caused by differences in the latitude and longitude of the place where the solar lighting controller is set. Accordingly, there arises a problem that optimum light collection at each point of time in the set place cannot be obtained. Furthermore, there arises a problem that a long time is taken when control due to the CPU is performed on the basis of the data which are unsuitable to the set place.

There arises a further problem that lighting accuracy cannot be corrected even in the case where lighting accuracy based on the initial input data is made worse because of deterioration of the physical property of the lighting prism plate in long-term use.

Another conventional solar lighting controller is configured as shown in FIGS. 83A, 83B and 83C.

In FIG. 83A, the reference numerals 611 and 612 designate first and second flat lighting prism plates, respectively.

These lighting prism plates 611 and 612 have triangular micro prism portions 611a and 612a, respectively, formed on the lower faces thereof as shown in FIG. 83B.

The reference numerals 613 and 614 designate drivers for driving the lighting prism plates 611 and 612, respectively. For example, each of the drivers 613 and 614 has a motor, a driving gear, and so on.

The reference numerals 615 and 616 designate controllers for giving control signals to the drivers 613 and 614, respectively.

The reference numeral 617 designates a setter which gives driving instructions for determining prism angles of the lighting prism plates 611 and 612 every hour to the controllers 615 and 616.

Therefore, for example, the setter 617 is constituted by a CPU.

Data concerning prism angles of the lighting prism plates 611 and 612 for optimizing the prism angles of the lighting prism plates 611 and 612 correspondingly to the height and azimuth of the sun (hereinafter mainly referred to as "the position of the sun") every date and every hour are stored in the setter 617 in advance.

The conventional solar lighting apparatus is constituted by the aforementioned parts 611 to 617.

Incidentally, parts, such as a power supply, and so on, attached to this apparatus are omitted from the drawings.

The solar lighting controller for driving the conventional solar lighting apparatus will be described below with reference to FIG. 83C which is a flow chart.

When the apparatus is powered on to start its operation (ST1), data concerning the current position of the sun every hour on the date are read from data having been already stored in the setter 617 in connection with a clock included in the setter 617 (ST2).

Driving instructions for the lighting prism plates 611 and 612 are issued to the controllers 615 and 616, respectively, on the basis of the data read as described above (ST3).

Accordingly, the lighting prism plates 611 and 612 are driven simultaneously by the respective drivers 613 and 614 to form required prism angles set by the setter 617.

Hence, the solar lighting apparatus always collects light rays of the sun in a predetermined direction regardless of the change of the position of the sun.

In the solar lighting controller for driving the conventional solar lighting apparatus, there arise the following problems in a practical case.

(1) Because the lighting prism plates are often driven simultaneously, the controller has a merit that the driving can be controlled continuously, that is, lighting characteristic can be improved in accuracy. On the contrary, because the capacity of the power supply becomes large, not only does the cost of the controller increases, but also electric power consumed by the controller increases.

(2) Accordingly, the driving method in the conventional solar lighting controller cannot meet the demand that reduction in the cost of the apparatus and reduction in consumed electric power should be obtained in exchange for lowering of accuracy in lighting characteristic to a practically reasonable justifiable degree.

Further, an origin position detector as the conventional solar lighting controller is configured, for example, as shown in FIGS. 84A, 84B, 84C, 85A and 85B.

In FIGS. 85A and 85B, the reference numeral 701 designates a lighting prism plate which is rotated by torque of a motor (not shown), or the like, while held horizontally by a rotation holding mechanism (not shown).

The reference numeral 702 designates a light ray shutter which is provided on the outer circumferential portion of the lighting prism plate 701 so as to project therefrom. The light ray shutter 702 is arranged in a reference position which is the origin of the lighting prism plate 701.

The reference numeral 703 designates a light sensor. As the detailed structure of the light sensor 703 is shown in FIG. 84C, a photodiode 705 as a light-emitting element is put into a lower leg portion 704a of a C-shaped resin package 704, and a phototransistor 706 as a light-receiving element and an electric source therefor and elements relevant thereto are put into an upper leg portion 704b of the package 704. After the optical sensor 703 is arranged in a position where the light ray shutter 702 passes through a space in an opening portion 704c of the package 704 when the lighting prism plate 701 rotates, the optical sensor 703 is fixed to a support (not shown). In the drawings, the reference character O designates the center of rotation of the lighting prism plate.

The reference numerals $705a_1$ and $705a_2$ designate input terminals of the optical sensor 703 (that is, input terminals of the photodiode 705); and $706a_1$ and $706a_2$, output terminals of the optical sensor 703 (that is, output terminals of the phototransistor 706 or output terminals via other elements relevant thereto). In the following description and in FIGS. 84A, 84B, 85A and 85B, these input and output terminals are expressed as single lines 705a and 706a, respectively.

In the aforementioned configuration, when electric power is supplied to the light sensor 703 through the input terminal 705a so that, for example, infrared rays are radiated from the photodiode 705 to the phototransistor 706 on one hand and the lighting prism plate 701 is rotated while held by the rotation holding mechanism on the other hand, the light radiated to the phototransistor 706 is shielded by the light ray shutter 702 in a condition shown in FIG. 84A. As a result, the voltage between the output terminals changes, so that the light sensor 703 generates an ON signal as an origin detection signal. When the lighting prism plate 701 is then further rotated so as to go out of the origin as shown in FIG. 84B, the shielding of light by the light ray shutter 702 is canceled so that radiation of light to the phototransistor 706 is made again. As a result, the voltage between the output terminals of the light sensor 703 returns to its original value, so that the light sensor 703 generates an OFF signal.

In the origin position detector of the solar lighting apparatus used in the conventional solar lighting controller, the following problems arise on the aforementioned configuration.

(1) If error on production arises in the lighting prism plate holding mechanism, backlash may occur in the holding of the lighting prism plate. On the other hand, the lighting prism plate expands or contracts thermally correspondingly to the charges in the ambient temperature in use, so that the outer diameter of the lighting prism plate changes.

When, for example, the lighting prism plate 701 expands thermally as shown in FIG. 85A, there is a risk that the light ray shutter 702 touches the inner wall of the opening portion 704c to thereby disorder the alignment of the lighting prism plate 701 and the rotation holding mechanism when the light ray shutter 702 passes through the opening portion 704c of the light sensor 703, and that the rotation of the lighting prism plate 701 stops in the worst case where the lighting prism plate 701 touches the side wall of the package 704.

On the other hand, when the lighting prism plate 701 contracts as shown in FIG. 85B, there is brought about a situation that the lighting prism plate 701 passes through a space in the front of the opening portion 704c of the light sensor 703.

In any of these cases, the position of the origin cannot be detected by the light sensor 703 though the lighting prism plate 701 rotates and passes through the position of the origin.

The same phenomenon as described above is brought about in the case where backlash occurs in the holding of the lighting prism plate.

(2) As a measure to counter these aforementioned situations, it may be that a light sensor having an opening portion (sensor slit) with a large vertical width is used or that the position of the light shutter provided to the lighting prism plate is adjusted correspondingly to the season. In the former case, the light-emitting element side and the light-receiving element side are required to be powered up. In the latter case, much labor and time is required. In each of the cases, a large cost is required.

(3) Further, the tolerable temperature of the existing light sensor is structurally in a range of from about 0° C. to about 6° C. On the contrary, in the solar lighting apparatus, a temperature rise is also caused by the use condition that the lighting prism plate is arranged in a hood. Accordingly, the temperature of the portion in which the light sensor is arranged is estimated to be as high as about 100° C. in the summer which is the hottest season. In the solar lighting apparatus, there is a risk that the light sensor may be used at a high temperature beyond the allowable temperature range.

(4) As described above, in the conventional configuration, it is difficult to detect the position of the origin of the lighting prism plate constantly and accurately. Accordingly, there is a risk that the lighting characteristic of the solar lighting apparatus becomes unstable.

SUMMARY OF THE INVENTION

An object of the present invention is therefore to provide a solar lighting apparatus excellent in lighting efficiency, in which apparatus a predetermined optical condition for a lighting prism plate is set so that sunlight is pursued appropriately correspondingly to the change of the height of the sun throughout the year.

Another object of the present invention is to provide a solar lighting apparatus in which diffusion of outgoing light rays can be reduced.

A further object of the present invention is to provide a solar lighting apparatus in which the probability that the blocking of transmitted light by an inoperative face of a flat lighting prism plate will occur as a defect of the flat lighting prism plate is reduced so that the total transmittance efficiency in the lighting portion can be improved.

A further object of the present invention is to provide a solar lighting apparatus in which lighting can be made for a long time throughout the year and in which machining property and weather resistance can be improved.

A further object of the present invention is to provide a solar lighting apparatus in which reflection of light on the surface of a lighting prism plate is reduced so that the quantity of transmitted light can be increased.

A further object of the present invention is to provide a solar lighting apparatus which has a lighting prism plate driver/holder as a practical device.

A further object of the present invention is to provide a solar lighting apparatus which has a holder for holding a lighting prism plate stably regardless of the deformation of the lighting prism plate caused by thermal expansion.

A further object of the present invention is to provide a skylight type solar lighting apparatus in which sunlight is pursued in the position of the sun so that not only is optimum lighting achieved but also a light distribution characteristic is changed freely.

A further object of the present invention is to provide a solar lighting apparatus in which the position of the origin of a lighting prism plate can be detected constantly and accurately.

A further object of the present invention is to provide a solar lighting controller in which correction can be made correspondingly to lowering of optical characteristic of a lighting prism plate caused by long-term use.

A further object of the present invention is to provide a solar lighting controller for driving a lighting prism plate in which reduction in the cost of the apparatus and reduction in consumed electric power can be attained in exchange for lowering of accuracy in lighting characteristic to a practically reasonable degree.

To attain the above object, in the solar lighting apparatus according to an aspect of the present invention, one lighting prism plate is rotatably arranged in a lighting portion or a plurality of lighting prism plates are rotatably arranged in the lighting portion at intervals of a predetermined distance, and prism angles (angles of rotation) of the lighting prism plates are controlled correspondingly to the height and azimuth of the sun so that the sunlight refracted by the lighting prism plates goes out in a predetermined direction, wherein when two, first and second, lighting prism plates are used as the lighting prism plates, the condition given by either one of the following expressions (1) and (2) is satisfied:

$$(|\theta H|+|\theta L|)/2 \geq (90°-\theta\alpha) \tag{1}$$

$$|\theta H|=|\theta L| \tag{2}$$

in which $\theta L$ represents the minimum height incident light outgoing angle between outgoing light and the normal line when objective light rays at the lowest height of the sun goes out from the first lighting prism plate, $\theta H$ represents the maximum height incident light outgoing angle between outgoing light and the normal line when light rays at the highest height of the sun goes out, and $\theta\alpha$ represents a permissible incident angle range in which the second lighting prism plate can be controlled.

Preferably, micro prism portions are formed on either one of or each of the first and second lighting prism plates so as to be opposite to an incident face of the lighting prism plate in the direction of incident light rays.

Preferably, micro prism portions are formed on the lower face portion of each of the lighting prism plates; a distance of displacement S is provided between an end portion of inoperative faces of the micro prism portions of one lighting prism plate and an end portion of inoperative faces of the micro prism portions of the other lighting prism plate; and the distance of displacement S is determined in a range 0<S<P (P: prism pitch) so that the transmittance is maximized.

Preferably, the inoperative face angle e of each micro prism portion of at least one of the lighting prism plates satisfies the following expressions:

$$90° < \alpha \geq \theta_e \tag{3}$$

$$\theta_h \leq \alpha \leq \theta_e \tag{4}$$

in which $\theta_e$ represents the outgoing angle of the lighting prism plate at the lowest height of the sun, and $\theta_h$ represents the outgoing angle of the lighting prism plate at the highest height of the sun.

Preferably, at least one lighting prism plate using a material different in Abbe number is mixed in the plurality of lighting prism plates arranged in the lighting portion.

Preferably, as a combination of the lighting prism plates, one member selected from the group of polymethyl methacrylate, polymethylpentene, norbornene resin, and amorphous polyolefin is used for one lighting prism plate and polycarbonate is used for the other lighting prism plate.

Preferably, a high-refractive material, such as polycarbonate, excellent in machining property and weather resistance is used as a material for the lighting prism plates.

Preferably, in order to prevent the surface reflection of light rays, each of the lighting prism plates is coated with at least one coating layer of a fluorine type antireflection film having a uniform thickness.

Preferably, in order to drive/hold the lighting prism plate accurately, there are provided: a drive means having a driving roller for rotating the lighting prism plate on the basis of a predetermined control instruction corresponding to the height, azimuth, etc. of the sun; a pressure means for elastically pressing the lighting prism plate from one side; and a support means for rotatably supporting the lighting prism plate from a side opposite to the pressure means.

In this case, preferably, the pressure means is constituted by at least one pressure roller for giving pressing force to the lighting prism plate from one side through elastic force of a spring supported to a fixed portion; and the support means is constituted by at least one pair of driven rollers which are arranged in positions opposite to the pressure roller and which rotate together with the rotation of the lighting prism plate while kept in the predetermined positions to thereby support the pressing force of the pressure roller.

Preferably, the drive means has a motor for giving rotation force to the driving roller directly or indirectly, a sunlight condition detector for detecting the condition of movement of the sun such as height, azimuth, etc. of the sun, and a setter such as a micro computer, or the like, for receiving a signal from the sunlight condition detector and giving a control instruction to the motor.

Further, the drive means may have a first torque transmission means such as a gear, or the like, provided on the outer circumference of the driving roller, and a second torque transmission means such as a gear, or the like, provided on the outer circumference of the lighting prism plate or on the outer circumference of a concentric ring united with the lighting prism plate for receiving torque transmitted by the first torque transmission means, so that the lighting prism plate is driven on the basis of the control instruction given to the drive means.

In this case, preferably, the lighting prism plate is held by using a plurality of holding plates made of transparent resin.

In this case, preferably, the holding plates are idly mounted on a metal rotary ring through insertion or stoppage fittings provided separately so that differences in expansion/contraction due to thermal expansion coefficients of the holding plates and the lighting prism plates can be absorbed.

Preferably, the solar lighting apparatus for a skylight, comprises a lighting means for performing lighting correspondingly to the height and azimuth of the sun, the direction of light rays of which changes every moment with respect to a skylight for taking sky light indoor, wherein the lighting means is formed so that one lighting prism plate is arranged or a plurality of lighting prism plates are arranged up and down at intervals of a predetermined distance and that the lighting prism plate(s) is rotated to thereby obtain optimum incident light corresponding to the height and azimuth of the sun.

In this case, if room light distribution is required to be selected, a light distribution plate is arranged in the outgoing side of the lighting means so that diffusion of light can be changed by controlling liquid crystal orientation in a light outgoing portion on the indoor side.

Further, in order to detect the position of the origin in the solar lighting apparatus, the solar lighting apparatus includes an origin roller provided in a reference position of the outer circumferential portion of the lighting prism plate as the origin of the lighting prism plate or an origin roller provided in a reference position of the outer circumferential portion of a rotary ring as the origin of the lighting prism plate when the rotary ring is integrally provided on the outer circumference of the lighting prism plate so as to be concentric with the lighting prism plate; a mechanical micro switch in which a contact is made to be operated by the origin roller in the locus of rotation of the lighting prism plate or the rotary ring is arranged in the locus; and a prism/ring position driven means for supporting a prism/ring position detection roller contacting the outer circumference of the lighting prism plate or the outer circumference of the rotary ring and rotating together with the rotation of the lighting prism plate or the rotary ring while tracking the locus of rotation of the lighting prism plate or the rotary ring and for supporting the micro switch so as to track the positional relation between the contact of the micro switch and the origin roller.

Further, the solar lighting controller for controlling the solar lighting apparatus comprises a central processing unit including a solar position detector for detecting the height and azimuth of the sun at each point of time in a place where the solar lighting apparatus is set, and an arithmetic operation storage means such as a micro computer, or the like, wherein a solar position signal containing the height and azimuth of the sun at each point of time given from the solar position detector is given to the central processing unit and subjected to arithmetic processing in the central processing unit to thereby issue a necessary rotating instruction from the central processing unit to thereby perform rotating control to locate the lighting apparatus in an optimum position correspondingly to the position of the sun.

Further, the solar lighting controller may comprise a setter including an arithmetic operation control storage means such as a micro computer, or the like, and a time measurement function capable of measuring at least date and time, wherein solar position data every hour are read into the setter in connection with the time measurement function to thereby set the prism angle of the lighting prism plate driven as described above.

The solar lighting controller further comprises a sunlight lighting condition detector arranged so as to be opposite to the lighting prism plate, wherein: the output signal of the lighting condition detector is given to the central processing unit or the arithmetic operation storage means; arithmetic processing is performed in the central processing unit or the arithmetic operation storage means; and a corrected rotating instruction is issued from the central processing unit or the arithmetic operation storage means to thereby control the rotation of the lighting prism plate to obtain an optimum prism angle correspondingly to the position of the sun.

Further, in the solar lighting controller, a lighting prism plate driving method may be carried out so that the lighting prism plates are driven one by one alternatively and intermittently in a predetermined sequence so that optimum prism angles are obtained correspondingly to the position of the sun every hour.

Further, in the solar lighting controller, when one cycle of driving operation in the steps of intermittently driving the respective lighting prism plates is completed, a predetermined wait time may be provided before the driving operation of the preceding steps is repeated.

Further, in the solar lighting controller, driving elements such as motors, or the like, provided as constituent elements of the lighting prism plate driving means may be provided as common driving elements of a smaller number than the number of the lighting prism plates so that the common driving elements are used to be common to a plurality of lighting prism plates through switching means.

BRIEF DESCRIPTION OF THE DRAWINGS

FIG. 1A is a schematic front view showing the basic configuration thereof, FIGS. 1B and 1C are explanatory views showing the minimum height incident light ray outgoing angle $\theta L$ and the maximum height incident light ray outgoing angle $\theta H$, respectively, and FIG. 1D is an explanatory view showing a permissible incident angle range $\theta \alpha$;

FIG. 2 is a table showing experimental results (optical characteristic) in the specifications of lighting prism plates in Embodiment 1-1 of the present invention;

FIGS. 3A and 3B are front views of an important part in Embodiment 1-2 of the present invention;

FIG. 4 is a table showing optical characteristic in the configuration of FIG. 3A;

FIGS. 6A and 6B are tables showing conditions for Embodiment 2-1 of the present invention, FIG. 6A shows the shape of lighting prism plates, and FIG. 6B shows dispersion corresponding to the solar height in the case of FIG. 6A;

FIGS. 7A and 7B are tables showing conditions for Embodiment 2-2 of the present invention, FIG. 7A shows the shape of lighting prism plates, and FIG. 7B shows dispersion corresponding to the solar height in the case of FIG. 7A;

FIGS. 8A and 8B are tables showing conditions for Embodiment 2-3 of the present invention, FIG. 8A shows the shape of lighting prism plates, and FIG. 8B shows dispersion corresponding to the solar height in the case of FIG. 8A;

FIGS. 9A and 9B are tables showing conditions for Embodiment 2-4 of the present invention, FIG. 9A shows the shape of lighting prism plates, and FIG. 9B shows dispersion corresponding to the solar height in the case of FIG. 9A;

FIG. 10A shows the shape of lighting prism plates, and FIG. 10B shows dispersion corresponding to the solar height in the case of FIG. 10A;

FIG. 15 is a front view showing the schematic configuration of first and second lighting prism plates constituting a lighting portion in Embodiment 4 of the present invention;

FIGS. 16 and 17 are enlarged front views of an important part of a lighting prism plate in Embodiment 4 of the present invention;

FIG. 18 is a table showing comparison of apex angles of first and second lighting prism plates between the case where the lighting portion is constituted by a conventional lighting prism plate material (PMMA) and the case where the lighting portion is constituted by a lighting prism plate material (PC) in Embodiment 4 of the present invention;

FIGS. 32 to 34B show Embodiment 7 of the present invention as an embodiment of the lighting prism plate holder in the solar lighting apparatus, FIG. 32 is a plan view, FIG. 33 is a front view of FIG. 32, FIG. 34B is an enlarged front view of the portion XXXIV of FIG. 33;

FIG. 46A is an overall perspective view, FIG. 46B is a vertical sectional front view, and FIG. 46C is a horizontal sectional plan view;

FIG. 74A is a main part plan view showing a state before the position of the origin is detected, FIG. 74B is a main part plan view showing a state at the time of detection of the position of the origin, and FIG. 74C is a main part plan view showing a state after the position of the origin is detected;

FIG. 77A is a perspective view, FIG. 77B is a front view, and FIG. 77C is a sectional perspective view of the lighting prism plate;

FIG. 83A is a schematic front view showing an example of configuration of a solar lighting apparatus, inclusive of a driving circuit, to which a lighting prism plate driving method is applied, FIG. 83B is an enlarged front view of important part of a lighting prism plate, and FIG. 83C is a flow chart showing the driving method in the solar lighting apparatus;

FIGS. 84A and 84B are perspective views showing states at the time of detection of the position of the origin and after the detection of the position of the origin, respectively, and FIG. 84C is a perspective view showing the detailed configuration of the light sensor; FIG. 85A shows the case where the outer diameter of the lighting prism plate is increased because of thermal expansion, and FIG. 85B shows the case where the lighting prism plate contracts.

DETAILED DESCRIPTION OF THE PREFERRED EMBODIMENTS

Embodiment 1

Embodiment 1 of the present invention which concerns the conditions of an improvement in the lighting efficiency of lighting prism plates used in a solar lighting apparatus will be described below as Embodiments 1-1 and 1-2 with reference to FIGS. 1A to 1D, FIG. 2, FIGS. 3A and 3B, and FIG. 4.

(Embodiment 1-1)

Figure 1A:
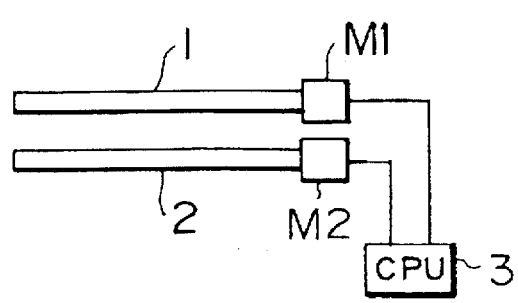
FIGS. 1A to 1D show Embodiment 1-1 of the present invention.

FIGS. 1A to 1D show Embodiment 1-1 having a basic configuration in which two flat lighting prism plates 1 and 2 as shown in FIG. 1A are arranged up and down at a predetermined distance so as to be able to be rotated by means of motors M1 and M2 driven on the basis of a signal from a central processing unit 3 (hereinafter referred to as "CPU") such as a microcomputer, or the like. The constitutional requirement of an optical system constituted by these lighting prism plates 1 and 2 is provided as follows.

Figure 1B:
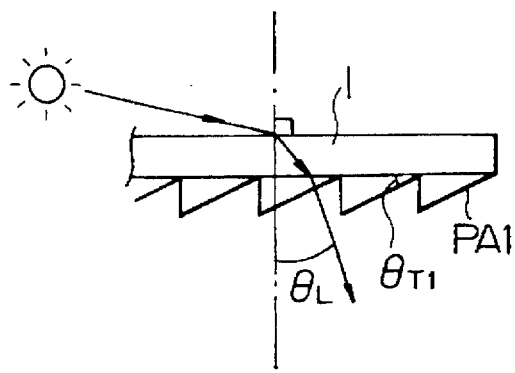
Figure 1C:
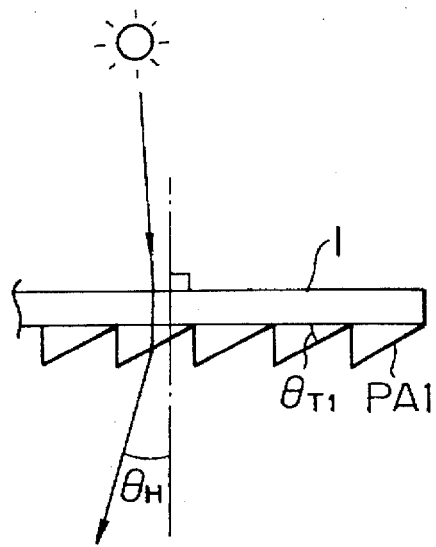
Figure 1D:
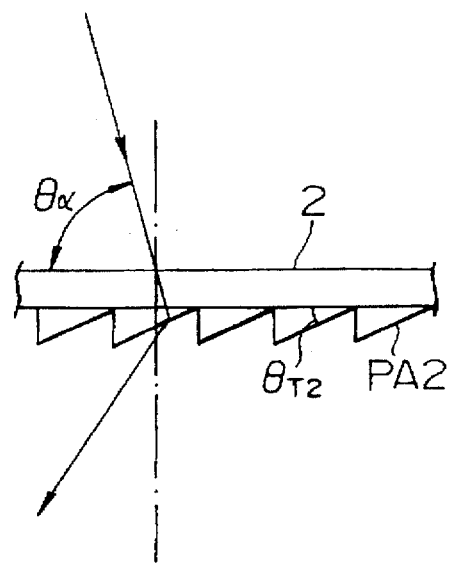

Although prism pits are not shown in each Of the lighting prism plates 1 and 2 of FIG. 1A for the sake of simplification, prism pits as shown in FIGS. 1B to 1D are provided on the second faces of the respective lighting prism plates 1 and 2 in order to form micro prism portions PA1 and PA2.

In FIGS. 1B to 1D, θT1 and θT2 are prism vertical angles of the lighting prism plates 1 and 2, respectively.

That is, the setting requirement of the optical system according to the present invention is given by the expression:

$$(|\theta_{H1}| + |\theta_{L1}|)/2 \geq (90° - \theta\alpha) \tag{1}$$

where θL represents an angle between outgoing light and the normal line of the first lighting prism plate 1 in the case of a first e.g. low, height of the sun (which is a target) as shown in FIG. 1B (an outgoing angle of lowest position incident light), θH represents an angle between outgoing light and the normal line of the first lighting prism plate 1 in the case of a second, e.g. high, height of the sun (which is a target) as shown in FIG. 1C (an outgoing angle of highest position incident light), and θα represents a permissible range of incident angles permitting the second lighting prism plate 2 to be controlled as shown in FIG. 1D.

Specifically, an ideal condition is given when the requirement is set so that the values of θH and θL satisfy the following expression.

$$|\theta H|=|\theta L| \tag{2}$$

In the solar lighting apparatus configured under the aforementioned constitutional requirements, in each of the cases of low and high heights of the sun as shown in FIGS. 1B and 1C, incident light is controlled to be arranged substantially perpendicularly to the prism pits by rotating the respective lighting prism plates 1 and 2 correspondingly to the height of the sun, so that the outgoing light from the first lighting prism plate 1 can be controlled to be entirely used as outgoing light from the second lighting prism plate 2 in order to obtain optimum room lighting.

In this occasion, lighting control may be made sufficiently even in the setting condition according to the expression (1), but lighting control can be made substantially more perfectly in the setting condition according to the expression (2).

In this occasion, it has been confirmed that light on the optical axis side compared with the light ray represented by the solid line in the drawings is fully reflected so as not to be transmitted by the lighting prism plates.

Further, prism rotating control can be made with good balance in refracting power between the lighting prism plates 1 and 2 and with no problem in practical use, so that the transmittance thereof is improved.

In the case where the condition according to the expression (2) is selected, as a condition to be satisfied, from the aforementioned conditions, lighting prism plate rotating control is easier compared with the case where the condition according to the expression (1) is selected.

FIG. 2 is a table showing specifications and optical characteristics of the lighting prism plates 1 and 2 constituting the solar lighting apparatus of Embodiment 1-1.

It is apparent from FIG. 2 that the lighting prism plates of such specifications can be adapted to a solar height range in which the height of the sun changes widely from 10° to 84°, and that a transmittance range corresponding to the solar height range is 55.4%±13%.

(Embodiment 1-2)

FIGS. 3A and 3B show the configuration of an embodiment of the present invention.

In the drawings, the reference numeral 1 designates a first lighting prism plate; PA1, a plurality of micro prism portions formed on the second face, as the outgoing or output side, of the first lighting prism plate 1; PB1, a plurality of micro prism portions formed on the first face, as the incident or output side, of the lighting prism plate 1; 2, a second lighting prism plate; PA2, a plurality of micro prism portions formed on the second face, as the outgoing side, of the second lighting prism plate 2; and PB2, a micro prism portion constituted by a plurality of micro prisms formed on the first face, as the incident side, of the lighting prism plate 2.

The configuration characteristic of this embodiment is in that the micro prism portions PB1 and PB2 are formed on the first faces of the lighting prism plates 1 and 2, respectively.

Upon the consideration of the functions of the micro prism portions formed on the first faces of the lighting prism plates as in this embodiment, it has been confirmed experimentally that when, for example, micro prism portions of 5° are provided on the first face of the first lighting prism plate 1, the transmittance increases because the incident angle with respect to the incident face decreases compared with the case where the first face of the first lighting prism plate 1 is provided as a plane having no micro prism formed thereon.

Though not shown in the drawings, the micro prism portions additionally provided on the first faces as described above may be formed on either one of the first and second lighting prism plates 1 and 2 so that the same effect as described above can be expected. That is, as a combination, there may be considered a structure in which the first face of the first lighting prism plate 1 is provided as a plane having no micro prism portions PB1 formed thereon and in which micro prism portions PB2 as shown in FIG. 3B are formed only on the first face of the second lighting prism plate 2, or a reverse structure in which micro prism portions PB1 are formed on the first face of the first lighting prism plate 1 and in which the first face of the second lighting prism plate 2 is provided as a plane having no micro prism portions PB2 formed thereon.

Being configured as described above, Embodiment 1 has excellent effects as follows.

(1) Outgoing light from the first lighting prism plate entirely goes out from the second lighting prism plate so that the light can be used effectively as a light source for room lighting.

In this occasion, although room lighting control may be made sufficiently even in the setting condition according to the expression (1), the control is more improved in the setting condition according to the expression (2) so that the control can be made substantially perfect.

(2) Because there is good balance in refracting power between the respective lighting prism plates, the lighting prism plates are adapted to the height change of the sun throughout the year so that the lighting prism plates can be controlled to be rotated in pursuit of the solar light in a solar height range having no practical hindrance.

As a result, the transmittance of the lighting apparatus increases, so that the lighting efficiency increases.

(3) Further, because reflection on the surfaces of the lighting prism plates decreases, the transmittance can be increased more greatly, that is, the lighting efficiency can be improved more greatly.

Embodiment 2

Embodiment 2 of the present invention which concerns the material for the lighting prism plates used in the solar lighting apparatus will be described below as Embodiments 2-1 to 2-4.

Prior to the description about Embodiments 2-1 to 2-4, first, the relation between the shape of the lighting prism plates (which may be hereinafter only referred to as "prisms") and dispersion is defined as follows for the sake of convenience in the comparative description of the respective embodiments.

Figure 5:
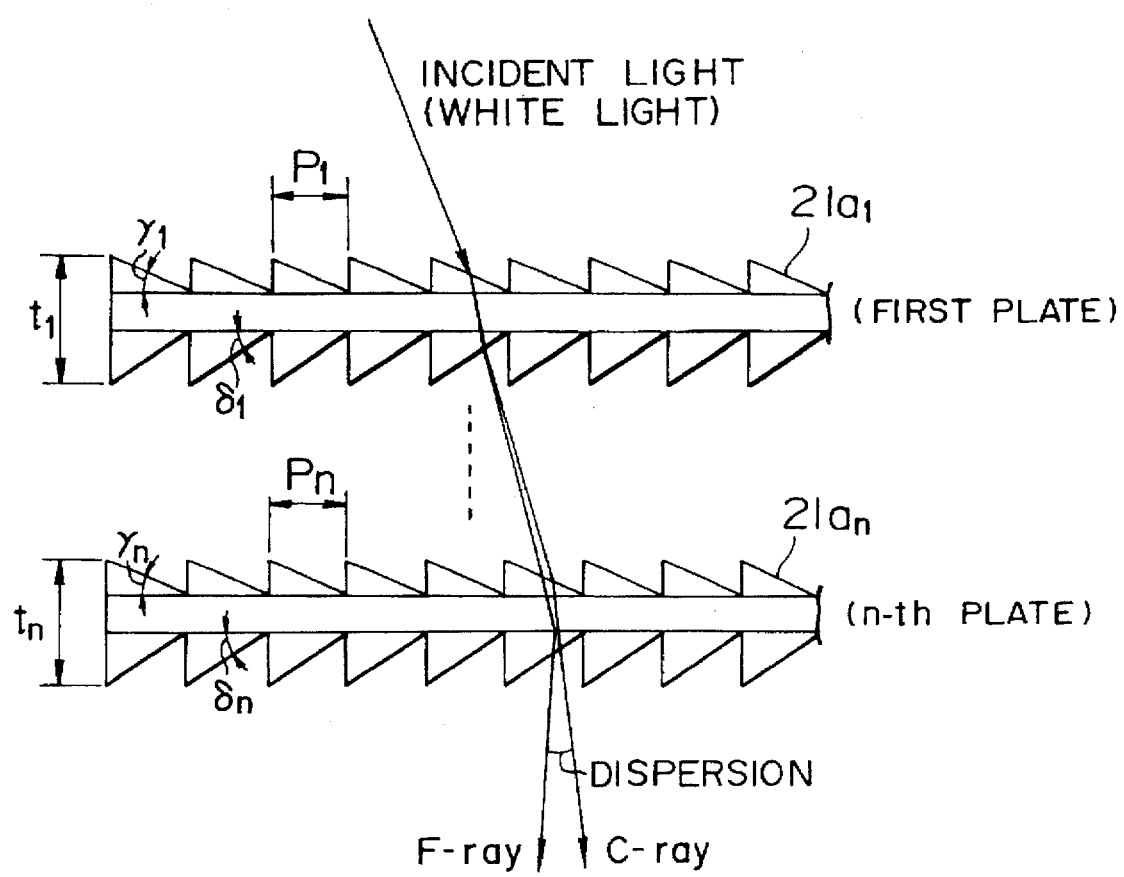
FIG. 5 is a front view showing the basic configuration of a lighting apparatus having a plurality of lighting prism plates arranged, which view is used for explanation of Embodiments 2-1 to 2-4 of the present invention and a comparative example.

As shown in FIG. 5, the prism angle on the incident side of each of n prism $21a_1$ to $21a_n$ is represented by γ; the prism angle on the outgoing side is represented by δ; the pitch between prism edges is represented by p; the thickness of each of the prisms is represented by the distance t. Specifically, the incident angles, outgoing angles, pitches and plate thicknesses of the prisms arranged in the first, second, . . . and n-th stages are expressed by affixing numerals corresponding to the numbers of the prisms to the aforementioned symbols respectively.

The magnitude of dispersion is expressed by an angle of a gap between outgoing light rays F and C as shown in FIG. 5. Here, the light ray F represents blue light having a relatively short wavelength of 486.1 nm, and the light ray C represents red light having a relatively long wavelength of 656.3 nm.

(Comparative Example)

The condition of color dispersion created in the case of a lighting apparatus formed by arranging prisms of the same material as a plurality of stages will be described as a comparative example.

Figures 10A, 10B, 11:
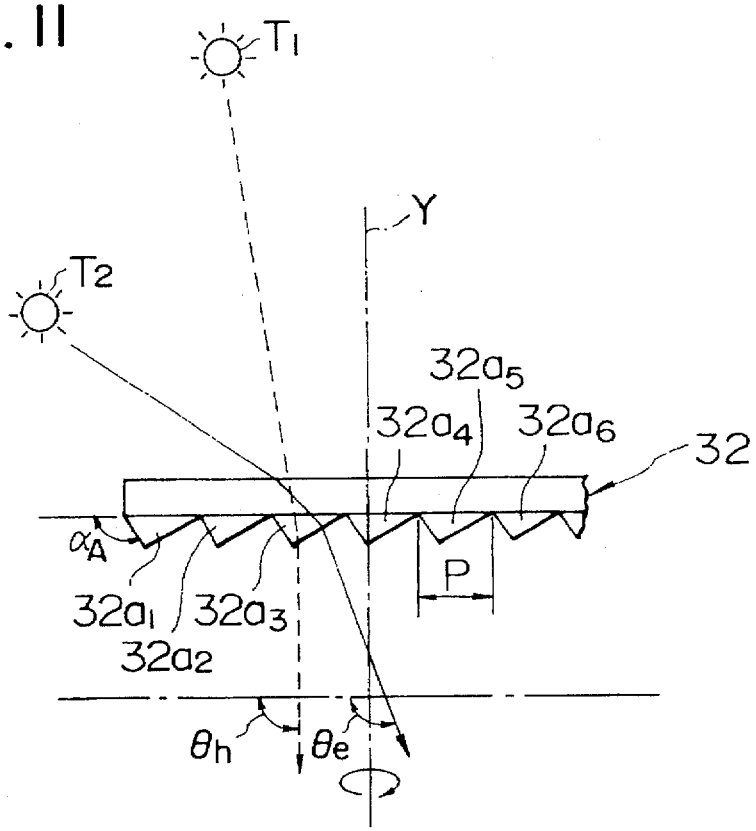
FIGS. 10A and 10B are tables showing conditions for a comparative example.
FIG. 11 is a front view of an important part in Embodiment 3-1 of the present invention.

Here, the shapes of prisms using polycarbonate (hereinafter abbreviated to "PC") as the prism material are shown in FIG. 10A, and dispersion corresponding to the height of the sun in the case of use of the prisms is shown in FIG. 10B.

In this system, the prism angles of the first and second prisms are controlled correspondingly to the change of the height of the sun, so that dispersion of 2.3° is created at maximum as shown in FIG. 10B.

(Embodiment 2-1)

FIG. 6B shows dispersion corresponding to the height of the sun in the case of using a first prism of polymethyl methacrylate (hereinafter abbreviated to "PMMA") and a second prism of PC which have the shapes shown in FIG. 6A respectively.

Also in this system, the prism angles of the first and second prisms are controlled correspondingly to the change in the height of the sun in the same manner as in the comparative example.

In Embodiment 2-1, maximum dispersion is 2.0° as shown in FIG. 6B, so that it is apparent that dispersion generally decreases compared with the comparative example. This embodiment is effective particularly in the case where the height of the sun is high.

(Embodiment 2-2)

FIG. 7B shows dispersion corresponding to the height of the sun in the case of using a first prism of PC, a second prism of PMMA and a third prism of PC, which have the shapes shown in FIG. 7A respectively.

In this embodiment, the first, second and third prisms are rotated correspondingly to the height of the sun to thereby perform lighting control.

As a result, maximum dispersion is 1.5° as shown in FIG. 7B, so that it is apparent that dispersion particularly in the case of a low height of the sun decreases compared with the comparative example.

(Embodiment 2-3)

FIG. 8B shows dispersion corresponding to the height of the sun in the case of using a first prism of PMMA, a second prism of PC and a third prism of PC, which have the shapes shown in FIG. 8A respectively.

Also in this embodiment, the first, second and third prisms are rotated correspondingly to the height of the sun to thereby perform lighting control in the same manner as in Embodiment 2-2.

As a result, maximum dispersion is 1.2° as shown in FIG. 8B, so that this apparatus has such a characteristic that dispersion is small particularly in the case of a high height of the sun.

(Embodiment 2-4)

FIG. 9B shows dispersion corresponding to the height of the sun in the case of using a first prism of PC, a second prism of PC, a third prism of PMMA and a fourth prism of PC, which have the shapes shown in FIG. 9A respectively.

In this embodiment, the first prism and the prisms other than the first prism are rotated correspondingly to the height of the sun to thereby perform lighting control.

In this embodiment, maximum dispersion is 1.5° as shown in FIG. 9B, so that this apparatus has such a characteristic that dispersion is very small particularly in the case of a low height of the sun.

Being configured as described above, Embodiment 2 has excellent effects as follows.

(1) As is clear from the aforementioned experimental result, it has been confirmed that dispersion in each of the embodiments decreases correspondingly to the height of the sun compared with the comparative example formed by arranging prisms of the same material in a plurality of stages. Accordingly, final dispersion between outgoing light rays can be decreased greatly.

(2) Accordingly, light after lighting can be carried efficiently through optical duct or optical fiber as long as the present invention is applied, so that the actual profit thereof is large.

Embodiment 3

Embodiment 3 of the present invention which concerns increase of the total transmittance of lighting prism plates used in a solar lighting apparatus will be described below specifically as Embodiments 3-1 to 3-3.

(Embodiment 3-1)

FIG. 11 shows Embodiment 3-1 of the present invention in which a lighting prism plate 32 having a plurality of micro prism portions $32a_1$, $32a_2$, $32a_3$, ... formed on the lower face portion of a flat lighting prism plate is designed so that a driving shaft Y provided in the center portion of the lighting prism plate 32 is rotated independently by means of a motor (not shown). Alternatively, the lighting prism plate 32 may be driven by another means such as, for example, a torque transmission means for transmitting the driving force of the motor to the outer circumference portion of the lighting prism plate 32.

This motor is designed to rotate at an appropriate speed correspondingly to the movement of the sun in accordance with an instruction given from a CPU (not shown).

A lighting portion equipped with lighting prism plates 32 configured as described above is arranged on the roof of a house shown in FIG. 78, which will be described later, to thereby constitute a lighting apparatus.

Incidentally, each of the lighting prism plates 32 according to the present invention is configured so that the angle αA of the inoperative face of each micro prism portion satisfies the following expressions.

$$90° < \alpha A \leq \theta_e \quad (3)$$

$$\theta_h \leq \alpha A \leq \theta_e \quad (4)$$

Of these two expressions, the expression (3) is particularly important so that at least this condition $90° \leq \theta_e$ is required to be satisfied. Here, $\theta_e$ represents the outgoing angle at the lowest height of the sun, $\theta_h$ represents the outgoing angle at the highest height of the sun, and P shown in FIG. 11 represents the pitch of the micro prism portions.

The configuration characteristic of the present invention is in that the angle αA of the inoperative face in each of the micro prism portions formed on the lower surface portion of the lighting prism plate 32 is set to be larger than 90° in the case of the prior art so that the probability in which transmitted solar light rays will be blocked by the inoperative face is lowered as shown in FIG. 11 even in the case where the sun is located in a position $T_2$ of relatively low height.

(Embodiment 3-2)

Figure 12:
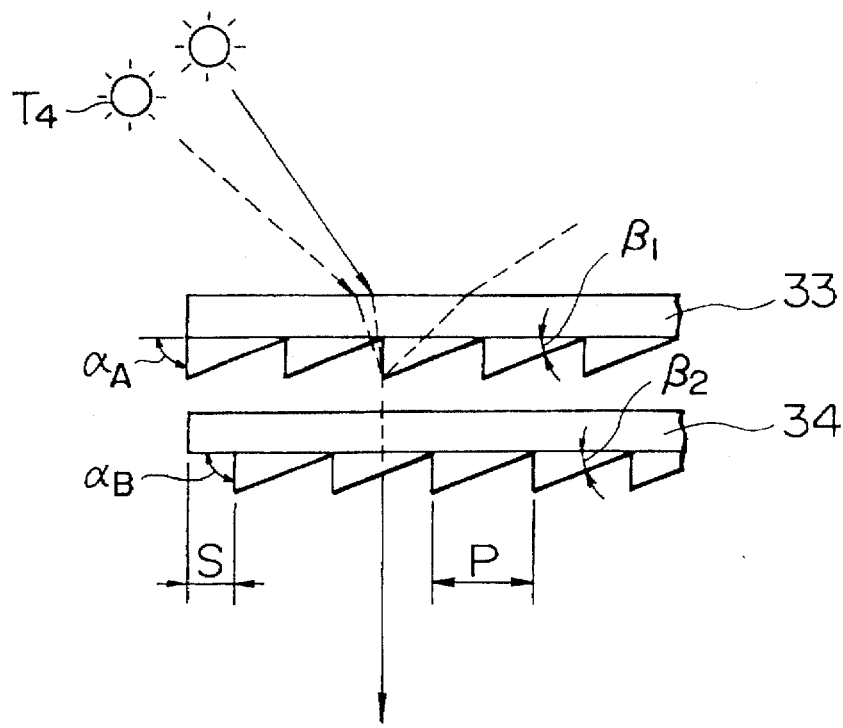
FIG. 12 is a front view of an important part in Embodiment 3-2 of the present invention.

FIG. 12 shows Embodiment 3-2 of the present invention.

The lighting apparatus of this type is generally formed by piling a plurality of lighting prism plates one on another in the up/down direction. FIG. 12 shows a configuration in which an idea is applied to the way of piling in this occasion.

That is, in FIG. 12, the reference numerals 33 and 34 designate first and second lighting prism plates arranged up and down, respectively. Each of prism portions of the lighting prism plates 33 and 34 is formed so that the angle of the inoperative face thereof is 90°, which is as much as the case of the prior art. The configuration characteristic of this embodiment is such that the second lighting prism plate is arranged relatively to the first lighting prism plate so that a distance of displacement S is provided between an inoperative face end portion of the first lighting prism plate and an inoperative face end portion of the second lighting prism plate opposite to the first lighting prism plate, to thereby make the two inoperative face end portions dissonant.

The distance of displacement S is preferably selected to satisfy the expression 0<S<P (in which P represents the pitch of the respective prism portions) to thereby make the transmittance largest. In this occasion, the increase of the transmittance in this means can be made largest as long as the distance of displacement S in this embodiment is selected to be an optimum value in accordance with the aforementioned conditional expression in pursuit of outgoing light rays.

If a third lighting prism plate (not shown) is arranged under the lighting prism plate 34, the third lighting prism plate is ought to be arranged so as to be equipped with a displacement portion having a length corresponding to the distance of displacement S between the second and third lighting prism plates.

Figure 14:
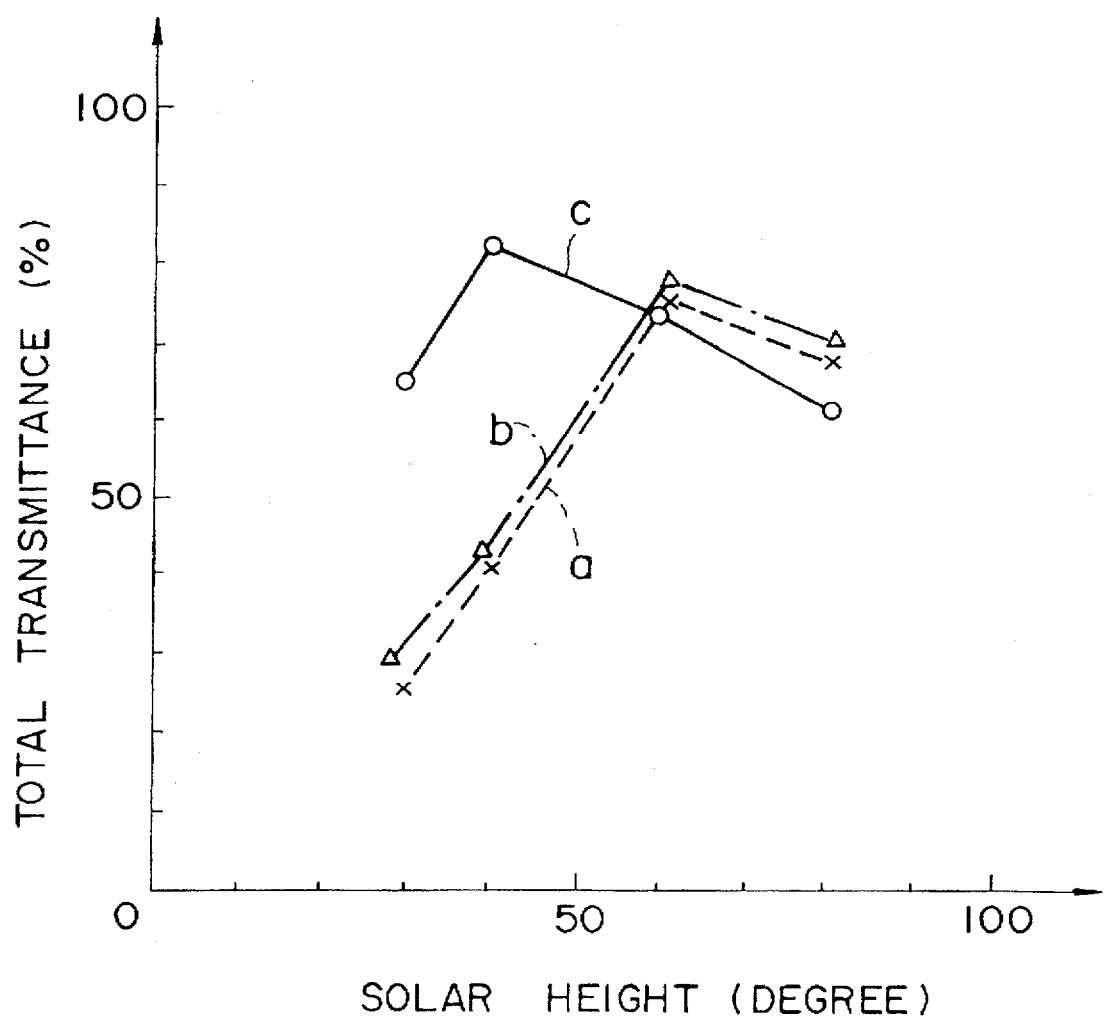
FIG. 14 is a characteristic graph of total transmittance-solar height for comparison in characteristic between the prior art and Embodiments 3-2 and 3-3 of the present invention.

An experiment of the transmittance has been made under the condition in which: the pitch P in each of the lighting prism plates 33 and 34 is 1 mm; the distance of displacement S is 0.3 mm; each of the apex angles $\beta_1$ and $\beta_2$ is 45°; and each of $\alpha A$ and $\alpha B$ is 90° in FIG. 12. As a result of the experiment, a characteristic graph (b) expressed by the dot-and-dash line in FIG. 14 is obtained.

In this occasion, the transmittance is obtained in the case where the respective lighting prism plates are rotated so that outgoing light entirely goes out perpendicularly (in the direction of the optical axis).

Compared with a characteristic graph (a) of the prior art in the case of the displacement distance S=0, it is apparent that the transmittance is improved slightly.

That is, when the sun is in the position obliquely right up with respect to the position $T_4$ of the sun, the incident light passes through the respective lighting prisms 33 and 34 as indicated with the solid line in FIG. 12.

When the sun comes in the position $T_4$ lower in height than the above case, the incident light passes through the lighting prism 33 at the second micro prism portion from the left end thereof first and then the light is blocked so as to be reflected on the inoperative face of the third micro prism portion from the left end of the same lighting prism 33 as indicated by the broken line in FIG. 12. Thus, there is yet a problem to be solved in that sometimes the outgoing light cannot be transmitted.

(Embodiment 3-3)

Figure 13:
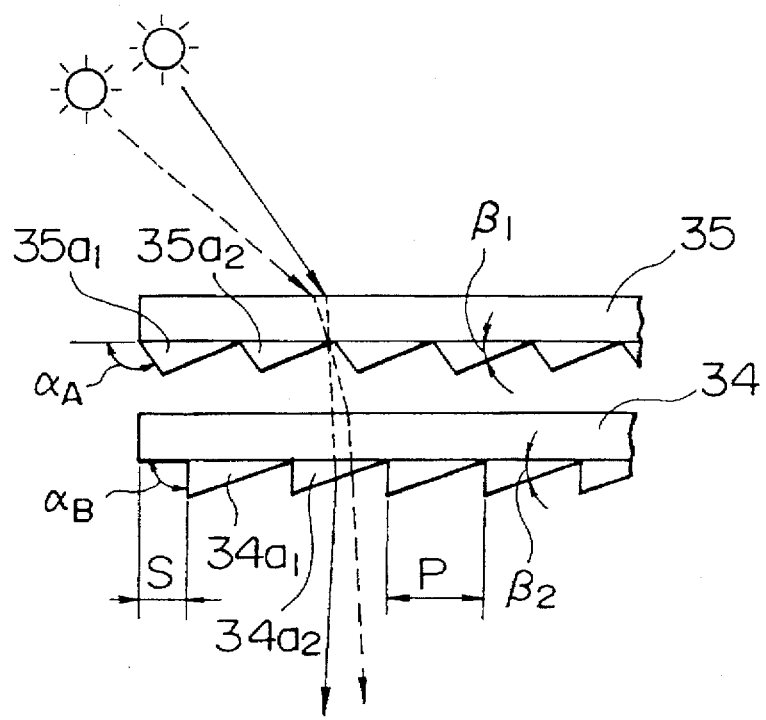
FIG. 13 is a front view of an important part in Embodiment 3-3 of the present invention.

FIG. 13 shows Embodiment 3-3 of the present invention.

The configuration characteristic of this embodiment is in that the uppermost (first) lighting prism plate 35 is designed in the same manner as the lighting prism plate 32 shown in FIG. 11 so that the inoperative face angle $\alpha A$ thereof satisfies the following conditional expressions in order to eliminate the problem in the aforementioned Embodiment 3-2.

$$90° < \alpha A \leq \theta_e \quad (5)$$

$$\theta_h \leq \alpha A \leq \theta_e \quad (6)$$

In this occasion, the expression (5) is an important conditional expression but the expression (6) need not always be satisfied.

Although this embodiment shows the case where the inoperative face angle $\alpha B$ of the second lighting prism plate 34 is selected to be 90° in the same manner as in Embodiment 3-2, the angle $\alpha B$ is preferably selected to satisfy the aforementioned expressions (5) and (6).

As an experimental example for this embodiment, an experiment of the transmission condition of the solar light has been made in the case of pitch P=1 mm, displacement distance S=0.3 mm, $\alpha A$=110°, $\alpha B$=90°, and $\beta_1 = \beta_2 = 45°$. A result of the experiment is expressed by the solid line (c) in FIG. 14.

Also in this embodiment, the transmittance is obtained in the case where the respective lighting prism plates are rotated so that outgoing light entirely goes out perpendicularly (in the direction of the optical axis).

As shown in the curve (c) of FIG. 14, it has been confirmed that the characteristic is improved more greatly than both the prior art of the curve (a) and Embodiment 3-2 of the curve (b), and that the total transmittance is improved remarkably particularly in a low height range of the sun.

Incidentally, in the respective characteristic graphs (a) to (c) of FIG. 14, data are arranged while the light reflected by the inoperative faces is regarded as 0 for the sake of simplification under the consideration that the reflected light is not effective.

Because Embodiment 3 is configured as described above, Embodiment 3 has excellent effects as follows.

(1) The respective inoperative faces $\alpha A$ and $\alpha B$ (hereunder generally referred to "$\alpha$") formed on the lower surfaces of the lighting prism plates are formed so as to satisfy at the least the expression $90° < \alpha \leq \theta_e$ so that the rate of transmitted light blocked by the inoperative faces is lowered, the total transmittance increases so that the lighting efficiency is improved.

(2) In the case of a method in which a plurality of lighting prism plates are piled one on another in the up/down direction, the lighting prism plates are piled with the distance of displacement relative to each other so that a function which is similar to but smaller in the degree thereof than the function shown in the paragraph (1) can be performed.

(3) If the plurality of lighting prism plates are formed to have the shape of the lighting prism plate shown in the paragraph (1) and each of the light prism plates is provided with the distance of displacement shown in the paragraph (2), the total transmittance can be improved more greatly, that is, the lighting efficiency can be improved more greatly by the synergism of the respective functions of (1) and (2). Accordingly, the present invention has a very wide range of applications to a lighting apparatus for a solar system house.

Embodiment 4

Embodiment 4 of the present invention concerns conditions of material for increasing an incident light range of a lighting prism plate used in a solar lighting apparatus. Referring now to FIGS. 19 through 22, the principle of configuration of the present invention will be described.

Figure 19:
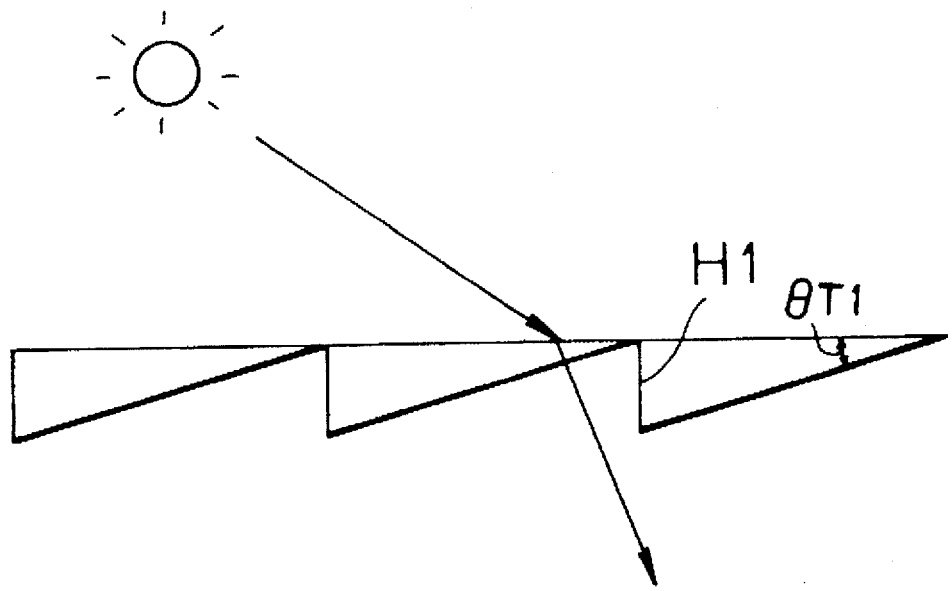
FIG. 19 is an explanatory view showing the condition of sunlight transmitted by a lighting prism plate in Embodiment 4 of the present invention in the case where the apex angle of the lighting prism plate is θT1.
Figure 20:
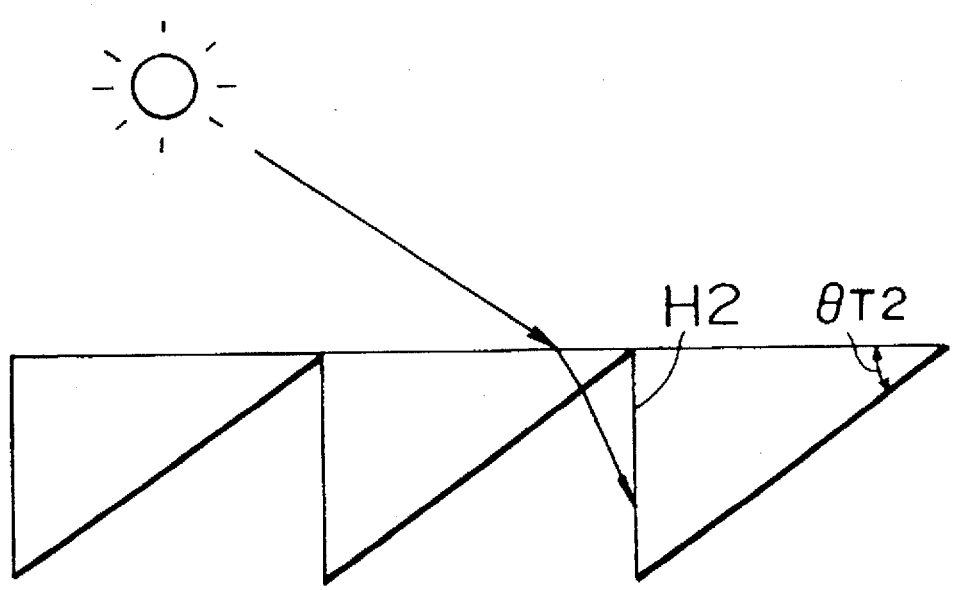
FIG. 20 is an explanatory view showing the condition of sunlight transmitted by a lighting prism plate in Embodiment 4 of the present invention in the case where the apex angle of the lighting prism plate is θT2.

FIGS. 19 and 20 are explanatory views showing the conditions of transmission of solar light in the first and second lighting prism plates having apex angles $\theta T1$ and $\theta T2$ respectively.

As shown in FIGS. 19 and 20, the angle of the inoperative face increases from H1 to H2 to thereby block the light rays' way correspondingly in the case where the apex angle of the lighting prism plate is θT2 which is larger than θT1.

That is, there is shown the fact that the transmittance of the solar light decreases as the apex angle of the prisms increases. This fact is caused by the fact that when the apex angle of the prisms is large, the inoperative faces thereof are widened to thereby block the light rays' way so that light incident to the inoperative faces cannot be transmitted and cannot be controlled.

Figure 21:
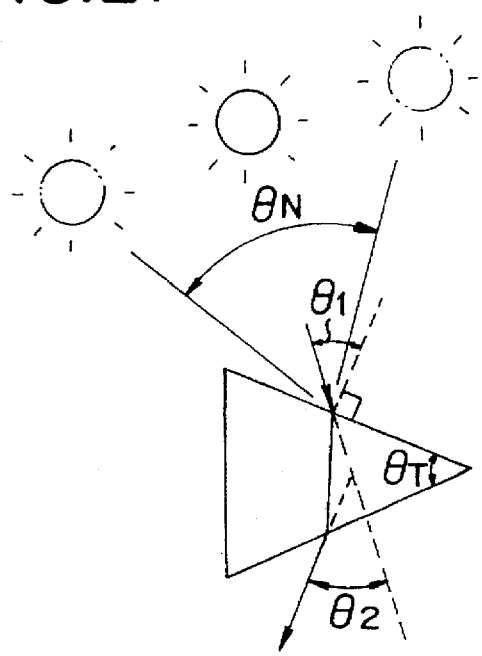
FIG. 21 is a characteristic view showing relations between incident angle, deflection angle (intensity of refracting power), etc. at entrance/exit of sunlight to/from a lighting prism plate in Embodiment 4 of the present invention.

FIG. 21 shows relations between incident angle $θ_1$, deflection angle $θ_2$ (intensity of refracting power), etc. in the case where the solar light enters a prism and goes out from the prism. In FIG. 21, θT presents the apex angle of the prism, and $θ_N$ represents a range of the incident angle.

Figure 22:
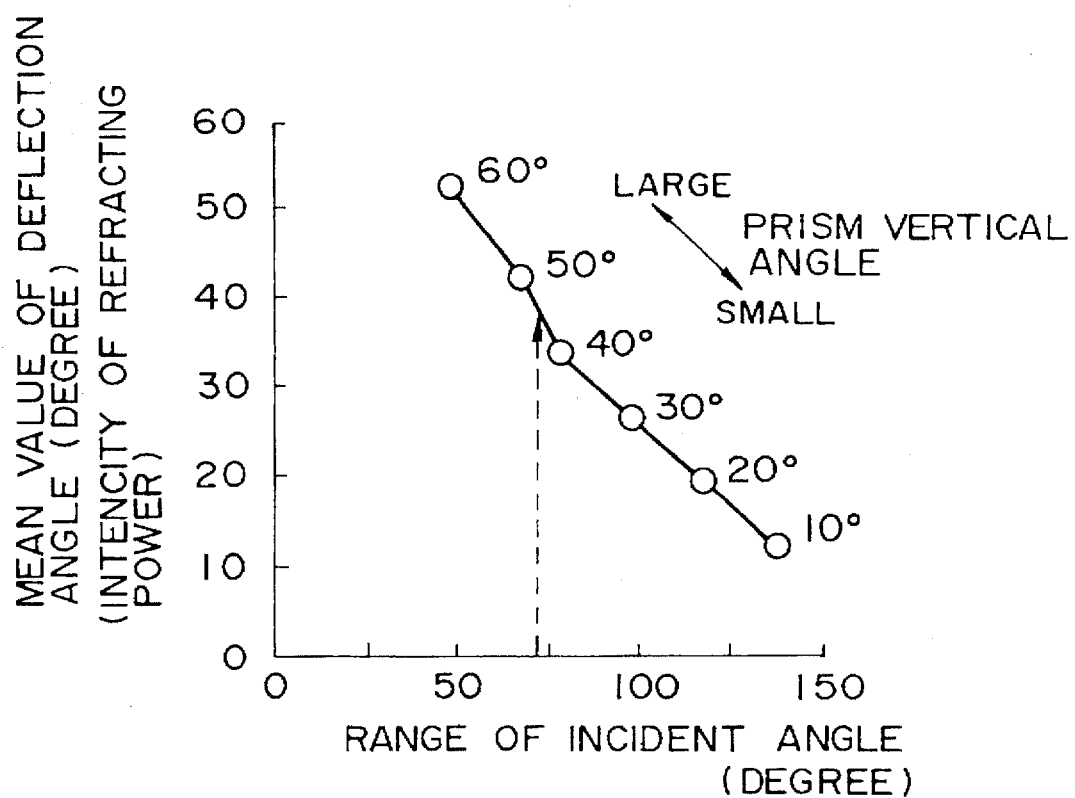
FIG. 22 is a characteristic graph showing relations between incident angle range and deflection angle (mean value) with the apex angle of the lighting prism plate as a parameter in the case where sunlight enters into the lighting prism plate and exits therefrom in Embodiment 4 of the present invention.

FIG. 22 shows the mean value (degrees) of deflection angles corresponding to the incident angle range (degrees) of the prism with the apex angle of the prism as a parameter.

As is obvious from FIG. 22, the refracting power of the prism having a small apex angle, for example, of 10° decreases to about 12° but the incident angle range can be controlled by the change of the apex angle of the prism so as to be adapted to light rays given from a wide height range of the sun of about 138°.

Accordingly, it is apparent from the point of view of widening the incident angle range that it is preferable to make the apex angle of the prism as small as possible and to make the refracting power (deflection angle) as large as possible.

Next, Embodiment 4 using the aforementioned principle will be described below with reference to FIGS. 15 through 18 which are partly enlarged front views and a schematic configuration table.

In FIGS. 15 to 18, a first lighting prism plate 51 arranged in the upper side of a lighting portion and a second lighting prism plate 52 arranged in the lower side of the lighting portion so as to be at a predetermined distance from the first lighting prism plate 51 are formed by using a high refractive material, respectively.

In this occasion, the apex angle αA of the first lighting prism plate 51 is selected to be smaller than the apex angle αB of the second lighting prism plate 52, as shown in FIGS. 16 and 17, on the basis of the result of the aforementioned consideration using FIGS. 19 to 22.

For example, a combination of αA of 42° and αB of 51.48° may be considered.

In this occasion, a high refractive material such as polycarbonate (hereinafter abbreviated to "PC"), or the like, excellent in machining property, weather proofness and impact resistance is preferably used as the material for each lighting prism plate.

Further, in FIG. 15, the reference numerals 53 and 54 designate motors, respectively, driven on the basis of a signal given from a CPU 55. The lighting prism plates 51 and 52 are rotated by means of the motors 53 and 54, respectively, so that optimum prism angles of the lighting prism plates 51 and 52 are obtained correspondingly to the height and azimuth of the sun.

Because each of the lighting prism plates 51 and 52 in the present invention is formed of a high refractive material, the refracting index of the incident angle of the sun at the lighting portion is made large so that the aforementioned pursuit is made optimum correspondingly to the change of the incident angle attendant on the movement of the sun throughout the year conjointly with the rotation of the lighting prism plates 51 and 52.

Further, because in the solar lighting apparatus of the present invention, the apex angle αA of the first lighting prism plate 51 is selected to be smaller than the apex angle αB of the second lighting prism plate 52 as described above, the blocking of the light rays' way by the inoperative faces of the first lighting prism plate 51 is made small, to thereby improve the transmittance of the prisms as it has been considered by reference to FIGS. 19 through 22.

If the apex angle αA of the first lighting prism plate 51 is small, the sunlight rays can be controlled in wide incident range, while the refracting power of light rays by the prism is reduced. The apex angle αA of the first lighting prism plate is therefore selected to be in a relatively small value from the point of view of the lighting efficiency throughout the year in spite of sacrifice of refracting power. The refracting power sacrificed as described above can be compensated for by increasing the apex angle αB of the lighting prism plate.

FIG. 18 is a table showing the comparison in the values of the apex angles of the respective lighting prism plates between the case of conventional prisms of acrylic material (PMMA) having a relatively low refracting index and the case of prisms of PC which is a high refractive material for achieving efficient solar lighting throughout the year.

It is apparent from this table that when PC is used as the lighting prism plates in the lighting portion, the apex angles of both first and second lighting prism plates are made small and the lighting efficiency is improved compared with the conventional material (PMMA).

The configuration using a high refractive material in the lighting portion as in Embodiment 4 has excellent effects as follows.

(1) Because the refracting power of the solar light incident to the lighting portion increases, a wide range of incident light can be taken into the house.

Accordingly, long-term efficient lighting can be made throughout the year.

(2) Because two or more lighting prism plates of high refractive material are arranged in the lighting portion to thereby pursue the solar light, both the solar lighting time and the transmittance increase to thereby increase the lighting efficiency more greatly compared with the case of no pursuit.

(3) Because not only the mass production of lighting prism plates can be made easier, but also the prism pitch can be made smaller when a high refractive material excellent in machining property and weather-proofness, such as polycarbonate, or the like, is used as the material for the lighting prism plates, the size and weight of the lighting portion can be reduced and the life of the lighting portion in outdoor use can be increased.

(4) Because polycarbonate is resistant against impact, the strength of the lighting portion can be increased when polycarbonate is used.

Embodiment 5

Embodiment 5 of the present invention which concerns prevention of reflection on surfaces of lighting prism plates used in a solar lighting apparatus will be described with reference to FIGS. 23 through 26.

Figure 23:
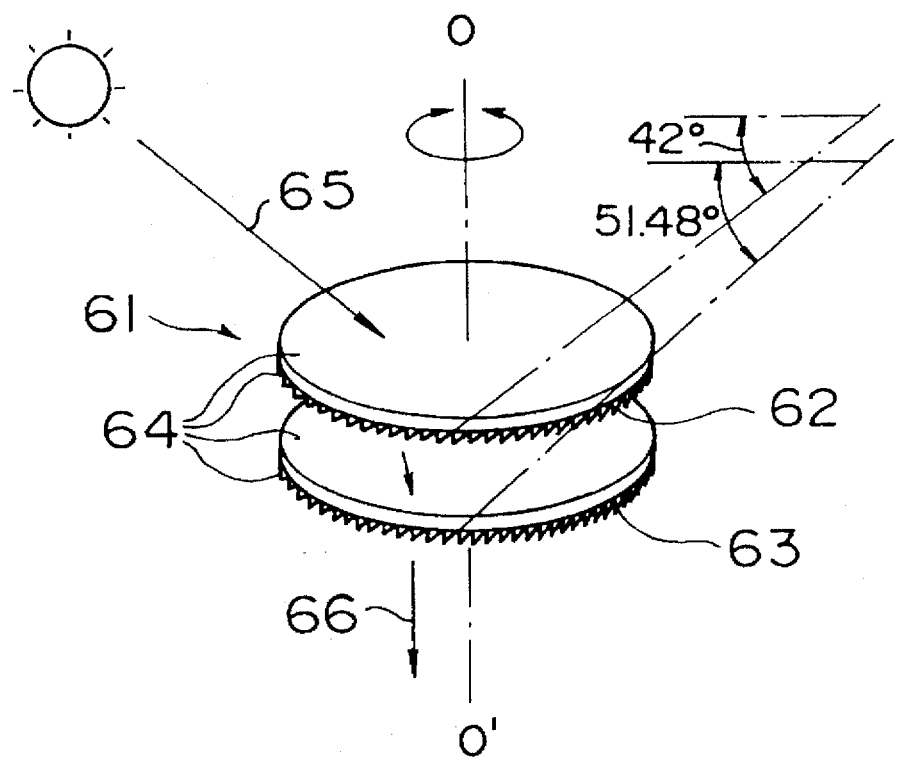
FIG. 23 is a schematic explanatory view of a solar lighting apparatus showing Embodiment 5 of the present invention.
Figure 24:
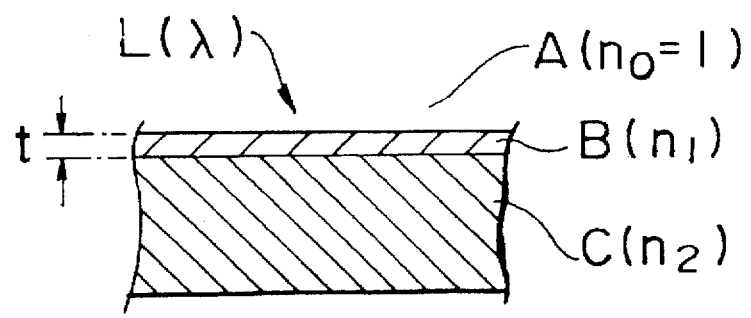
FIG. 24 is an explanatory view concerning reflection of light in Embodiment 5 of the present invention.

FIG. 23 is a schematic explanatory view of the lighting apparatus. FIG. 24 is an explanatory view which concerns reflection of light.

Figure 25:
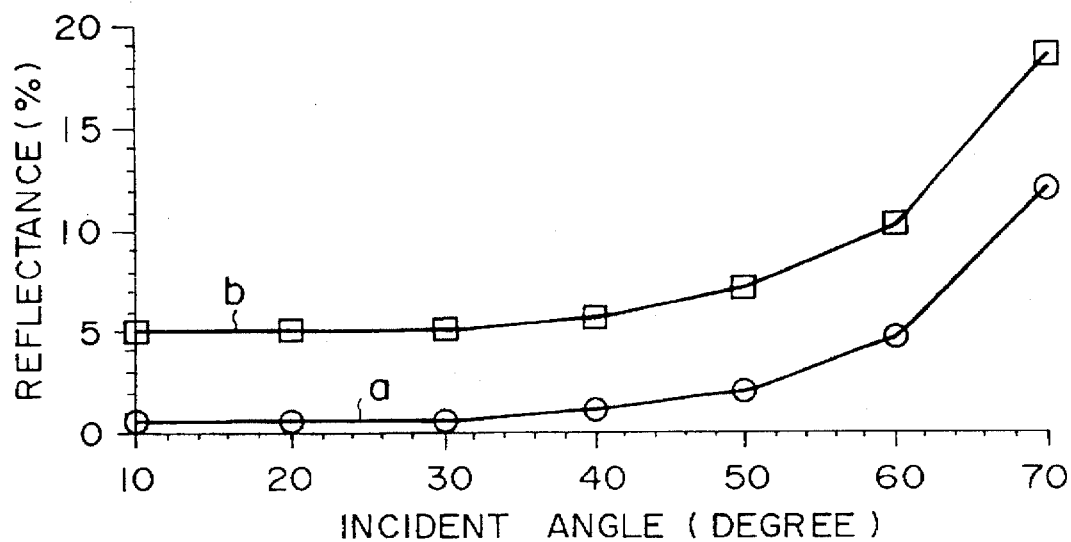
FIG. 25 is a graph of results of calculation of surface reflectance due to surface reflection simulation in Embodiment 5 of the present invention.

FIG. 25 is a graph of surface reflectances calculated by surface reflection simulation.

Figure 26:
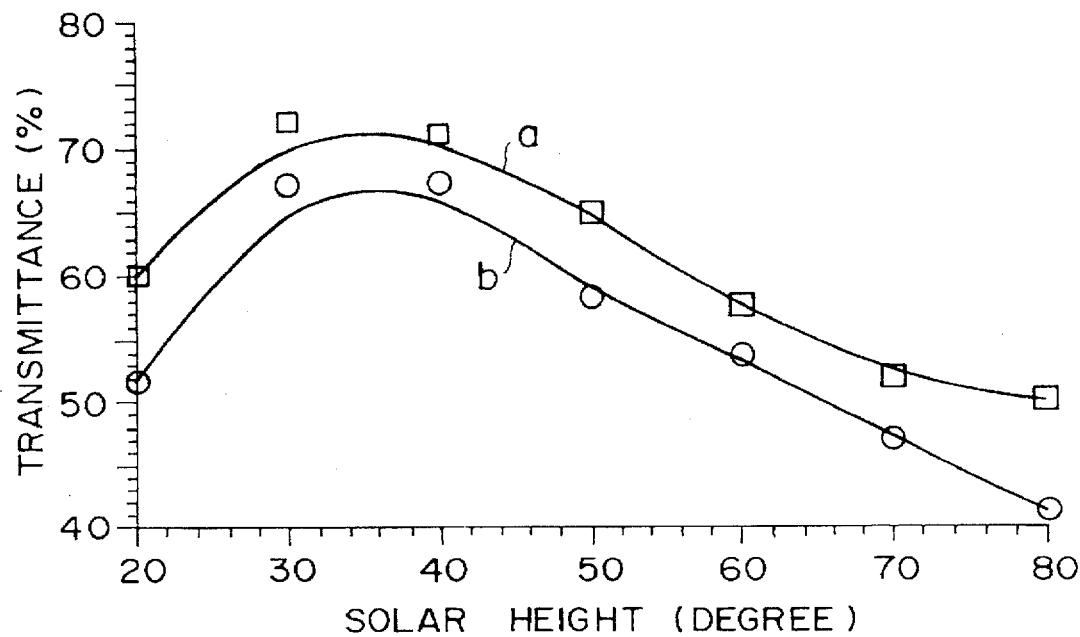
FIG. 26 is a graph of results of measurement of transmittance of the lighting prism plate in Embodiment 5 of the present invention.

FIG. 26 is a graph of measured transmittances of the lighting prism plates.

In FIG. 23, a lighting portion 61 includes a first lighting prism plate 62, and a second lighting prism plate 63. The lighting prism plates 62 and 63 are both made of polycarbonate (abbreviated to "PC"). The lighting prism plates 62 and 63 have upper and lower surfaces covered with fluorine-contained reflection-proof films 64, respectively, and are designed so as to be able to rotate around a vertical center axis line O–O' independently. The light 65 from the sun is turned downward in the direction of the arrow 66 by the respective rotations of the first and second lighting prism plates 62 and 63 even in the case where the height of the sun changes.

That is, the lighting apparatus according to the present invention is a lighting apparatus for collecting light rays from the sun to use the light rays for lighting, heating, etc. The lighting apparatus has, in the lighting portion 61, lighting elements subjected to a reflection preventing process for preventing the surface reflection of the light rays. The lighting elements are at least two lighting plates, such as the first and second lighting prism plates 62 and 63, which can rotate horizontally independently. The reflection preventing process includes application of at least a single layer coating to each lighting element with the fluorine-contained reflection prevention film 64 to a predetermined thickness.

Here, light reflection which forms the foundation of the present invention will be described. In FIG. 24, when generally light of wavelength γ advances in air A (refracting index $n_0=1$) in the direction of the arrow and strikes on a substrate C (refracting index $n_2$) coated with thin film B (refracting index $n_1$), the thickness t of the thin film B to make the reflection preventing effect largest is given by the expression $$t = \gamma/4n_1 \quad (7)$$

and it is known that reflection is made smallest as the following expression (8) is satisfied more perfectly.

$$n_1 - n_0 = n_2 - n_1 \quad (8)$$

Accordingly, as long as a material satisfying these expressions is selected, a desired reflection preventing effect is obtained.

The present invention is designed to utilize such a reflection preventing effect. Conditions for the aforementioned lighting apparatus, simulation of surface reflection and measured results of the transmittances of the lighting prism plates will be described below.

(a) Conditions

The first lighting prism plate has angles 0°/42°, that is, the upper face of the first lighting prism plate is a plane and the prism angle of the lower face thereof is 42° (see FIG. 23). The second lighting prism plate has angles 0°/51.48°. The reflection preventing film (see FIG. 24) B is fluorine-contained reflection preventing film "CYTOP" (made by Asahi Glass Co., Ltd.) and has a refracting index of 1.34. Because d rays (γ=588 nm) are used instead of the solar light, the film thickness t is calculated as $t = \gamma/4n_1 = 588/4 \times 1.34 \approx 110$ nm in accordance with the expression (7). The reason why d rays of γ=588 nm are used in the calculation of the film thickness $t = \gamma/4n_1$ is in that light of a wavelength high in visibility is selected as a representative from visible light but this reason has no relation with laser light. The wavelength of He—Ne laser light is 633 nm and is used in an experiment for measuring surface reflection. Strictly, the calculated value and the measured value which are obtained by using different wavelengths are compared with each other but these values are considered as approximately equal values.

(b) Simulation of Surface Reflection

FIG. 25 shows calculated reflectances of PC surfaces. FIG. 25 shows a condition in which the reflectance of the surface coated with the reflection preventing film B as shown in the graph (a) of FIG. 25 is decreased by about 5% per one interface regardless of the incident angle compared with the reflectance of the surface having no reflection preventing film B as shown in the graph (b) of FIG. 25.

(c) Measured Transmittances of Lighting Prism Plates

FIG. 26 shows measured results of output energy relative to incident energy in the lighting apparatus of FIG. 23 in the case where the first or second lighting prism plate or both the first and second lighting prism plates are rotated to change the incident angle correspondingly to the change of the height of the sun so that light rays are controlled to turn downward in the direction of the arrow 66.

The transmittance of the plate coated with the reflection preventing film as shown in the graph (a) of FIG. 25 is improved by about 6% compared with the transmittance of the plate coated with no reflection preventing film as shown in the graph (b) of FIG. 25.

Light rays used in this occasion are He—Ne laser light (633 nm).

(d) In comparison between the case where PC ($n_2=1.583$) is used as the lighting prism plate and the case where polymethyl methacrylate (abbreviated to PMMA, $n_2=1.492$) is used as the lighting prism plate, the following results are given by the expression (8).

Case of PC $n_2 - n_1 = 1.583 - 1.34 = 0.243$

Case of PMMA $n_2 - n_1 = 1.492 - 1.34 = 0.152$

Because the value of PC is nearer to $n_1 - n_0 = 1.34 - 1 = 0.34$, the reflection preventing effect of PC is larger than that of PMMA. The reflectance of PMMA obtained by calculation in the paragraph (b) is decreased only by 3.5%.

Because the fluorine-contained reflection preventing film (amorphous polymer) can be applied easily in a short time by means of spin coating or dip coating different from the conventional vapor deposition method, the aforementioned prevention of reflection, that is, the increase of the transmittance is obtained at a relatively low cost.

Embodiment 6

Embodiment 6 of the present invention which concerns a lighting prism plate driver/holder for appropriately driving/holding a lighting prism plate used in a solar lighting apparatus will be described specifically as Embodiments 6-1 to 6-4 shown in FIGS. 27 to 31.

Figure 78:
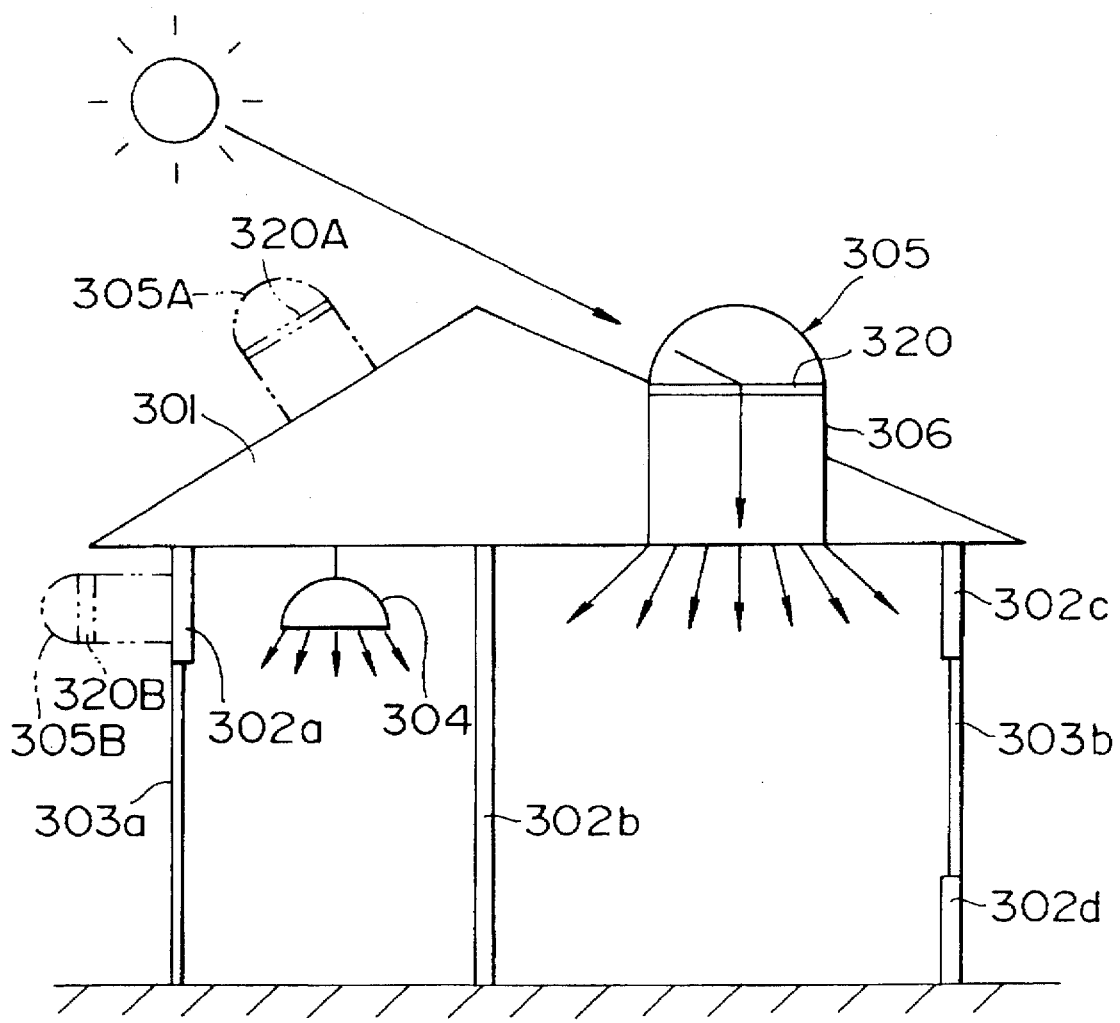
FIG. 78 is a view showing the configurations of the solar lighting apparatuses according to a prior art and according to a substitute technique of Embodiment 6 of the present invention.
Figure 79A:
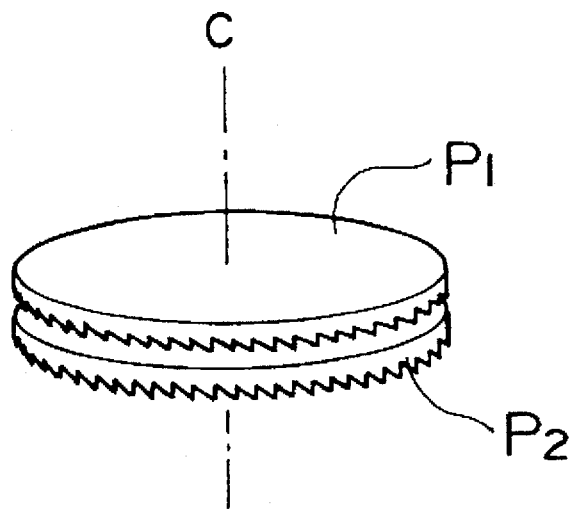
FIGS. 79A and 79B are views showing an example of configuration of a conventional solar lighting apparatus.
Figure 79B:
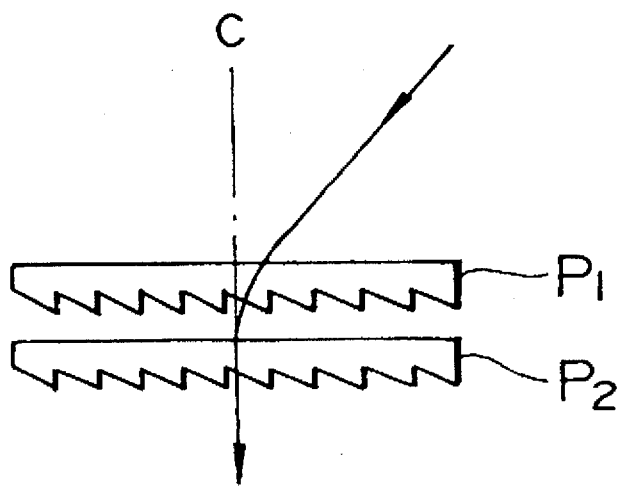
Figure 80:
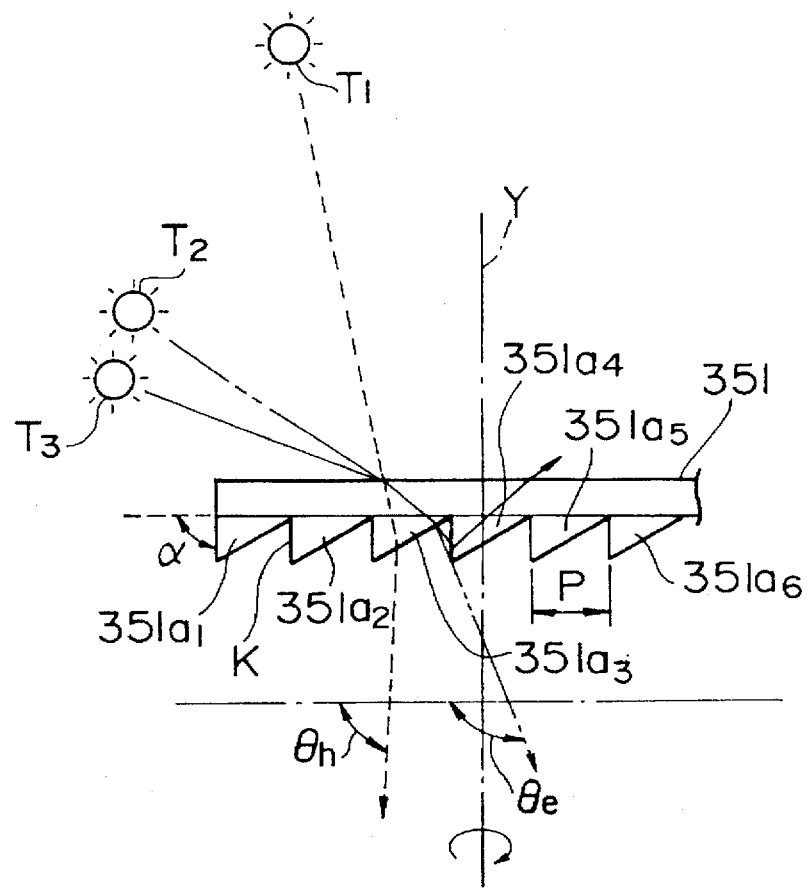
FIG. 80 is a front view of an important part of a conventional apparatus for explaining the configuration of prism plates and problems thereon.
Figure 81:
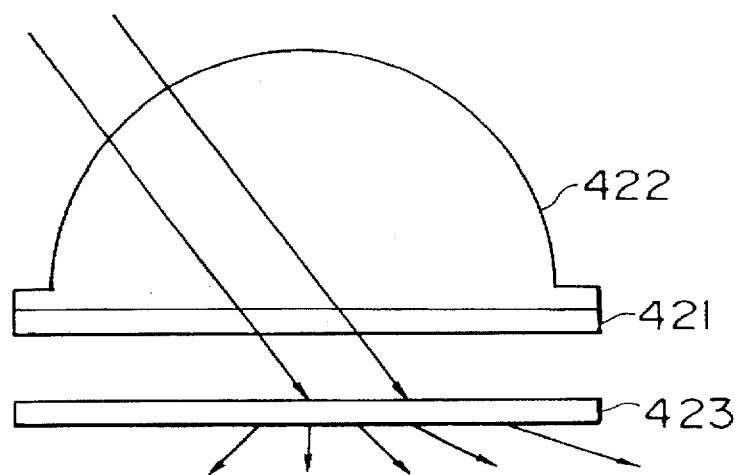
FIG. 81 is a front view showing the configuration of a conventional skylight apparatus.

The lighting prism plate driver/holder of the present invention is applied to the solar lighting apparatus of FIG. 78 described preliminarily in the prior art.

(Embodiment 6-1)

Figure 27:
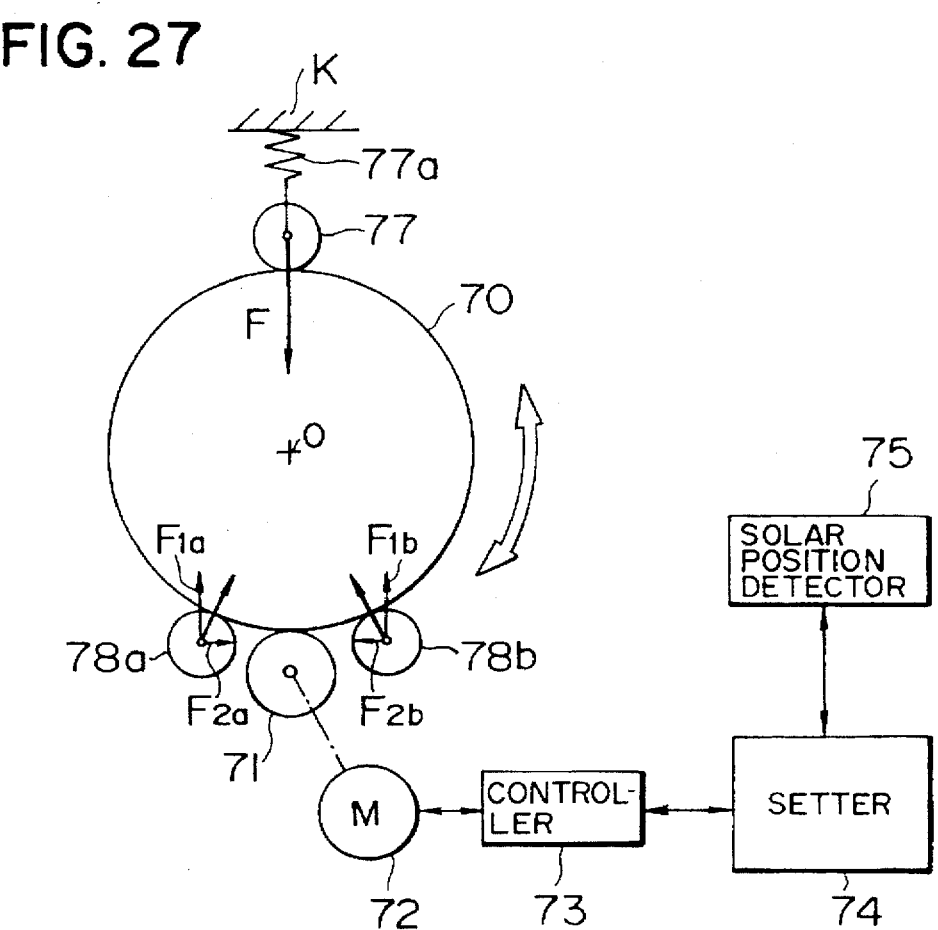
FIG. 27 is a plan view showing a lighting prism plate driver/holder in Embodiment 6-1 of the present invention.

FIG. 27 is a plan view of the lighting prism plate driver/holder showing Embodiment 6-1 of the present invention.

In FIG. 27, the reference numeral 70 designates a lighting prism plate such as a flat plate prism; and 71, a driving roller which receives torque of a motor 72 such as a stepping motor, for example, as shown in FIG. 27, directly or indirectly through a worm gear (not shown) so as to be driven. Though not shown, gears are formed on the outer circumference portion of the lighting prism plate 70 and on the outer circumference portion of the driving roller 71, respectively. The lighting prism plate 70 and the driving roller 71 are arranged so that the two gears engage with each other. Further, O represents a position as the nearly center position of the rotation of the lighting prism plate 70.

The reference numeral 73 designates a controller for the motor 72. When, for example, the motor 72 is a stepping motor, the controller gives an in-phase control pulse signal. The reference numeral 74 designates a setter for giving a control command to the controller 73. This setter 74 is constituted, for example, by a CPU. In this setter, there are inputted data for making the prism angle of the lighting prism plate 70 an optimum prism angle correspondingly to the height and azimuth of the sun on each date and hour.

The reference numeral 75 designates a solar position detector such as an optical axis sensor or/and light quantity sensor, etc. for detecting the conditions such as height, azimuth, etc. of the sun. The solar position detector 75 is designed so that the detection output thereof is given to the setter 74. Accordingly, the driving roller 71 is rotated through the motor 72 on the basis of a driving instruction given by the setter 74, so that the rotating control of the lighting prism plate 70 by the torque of the motor 72 is always performed to optimize solar lighting on the date and hour.

The reference numeral 77 designates a pressure roller which gives pressing force to the lighting prism plate 70 from one side (from the upper side in FIG. 27). Therefore, the pressure roller 77 is arranged in a position opposite to the driving roller 71 so that pressing force is given to the lighting prism plate 70 by means of a spring 77a suspended from a fixed portion K. The spring 77a belonging to the pressure roller 77 may be constituted by a so-called cantilever spring or may be constituted by a center impeller spring. Incidentally, there is no gear formed on the outer circumference of the pressure roller 77.

The reference numerals 78a and 78b designate first and second driven rollers, respectively. These driven rollers 78a and 78b are arranged in positions not only being horizontally opposite to each other as shown in FIG. 27, but also being opposite to the pressure roller 77 so as to be in contact with the lighting prism plate 70 to optimize the positional relation to the driving roller 71 (for example, opposite side positions with respect to the driving roller 71 as shown in FIG. 27). The first and second driven rollers are fixed to supporting portions (not shown) so as to be rotatable being driven (dragged) by the rotation of the lighting prism plate 70.

Incidentally, there is no gear formed also on the outer circumferences of the driven rollers 78a and 78b. Further, the contact positions where the pressure roller 77 and the driven rollers 78a and 78b are in contact with the lighting prism plate 70 are made to have sufficient room to spare so as to cope with the distortion of the lighting prism plate 70 in the production thereof and the deformation such as expansion, contraction, etc., due to the peripheral temperature at the setting place, etc., so that the lighting prism plate 70 can be held smoothly (besides this embodiment, this applies to the following embodiments).

Although in the aforementioned configuration the pressure roller 77 provides pressing force in the direction of the center of the lighting prism plate 70, the pressing force F is canceled by the one-side partial forces $F_{1a}$ or $F_{1b}$ of the driven rollers 78a and 78b and the other-side partial forces $F_{2a}$ and $F_{2b}$ of the driven rollers 78a and 78b are canceled by each other to thereby support the lighting prism plate. Accordingly, the driving roller 71 engages with the gear formed on the outer circumference portion of the lighting prism plate 70 without surplus force, so that torque can be transmitted to the lighting prism plate 70 to rotate the lighting prism plate 70. Even in the case where more or less backlash occurs when the lighting prism plate 70 rotates, the backlash is absorbed by the spring 77a of the pressure roller 77 so that the lighting prism plate 70 can be held flexibly.

This embodiment which shows the most basic structure of the present invention has the configuration characteristic in that the number of pressure rollers is smallest. In this embodiment, however, the alignment of the lighting prism plate 70 and the driving roller 71 gets out of order easily because of the delicate position of the pressure roller 77 and because of the delicate direction of force applied to the center of the lighting prism plate, when backlash occurs in the lighting prism plate 70. Therefore, the following embodiments are improved in this point.

(Embodiment 6-2)

Figure 28:
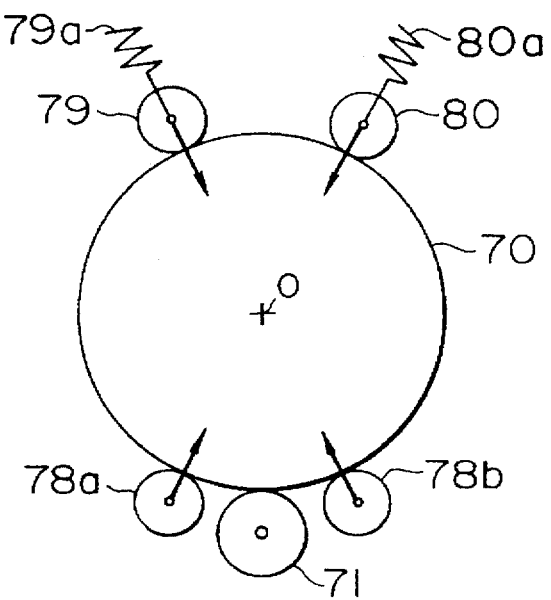
FIG. 28 is a plan view showing an important part of the lighting prism plate driver/holder in Embodiment 6-2 of the present invention.

FIG. 28 is a plan view of a lighting prism plate driver/holder showing Embodiment 6-2 of the present invention. In FIG. 28, like numerals in each of FIG. 27 refer to like parts in each of Embodiment 6-1, and the description of the parts will be omitted. Though not shown, means for driving the driving roller 71 is assumed to be provided in this embodiment as in Embodiment 6-1.

The reference numerals 79 and 80 designate first and second pressure rollers, respectively. The first and second rollers 79 and 80 are arranged in positions (upper portion of the lighting prism plate 70 in FIG. 28) being opposite to the first and second driven rollers 78a and 78b, respectively, so that pressing force is given to the lighting prism plate 70 by the elastic force of springs 79a and 80a supported to fixed portions (not shown).

This embodiment has the configuration characteristic in that the four rollers consisting of two driven rollers 78a and 78b and two pressure rollers 79 and 80 are balanced to hold the lighting prism plate 70 so that the pressing force of the former and the bearing force of the latter are canceled by each other as represented by the arrows. Accordingly, even in the case where backlash occurs in the lighting prism plate 70, the alignment of the lighting prism plate 70 and the driving roller 71 is kept more optimum compared with Embodiment 6-1.

Incidentally, in this embodiment, it is necessary that the pressing forces of the two pressure rollers 79 and 80 against the lighting prism plate 70 are made uniform.

(Embodiment 6-3)

Figure 29:
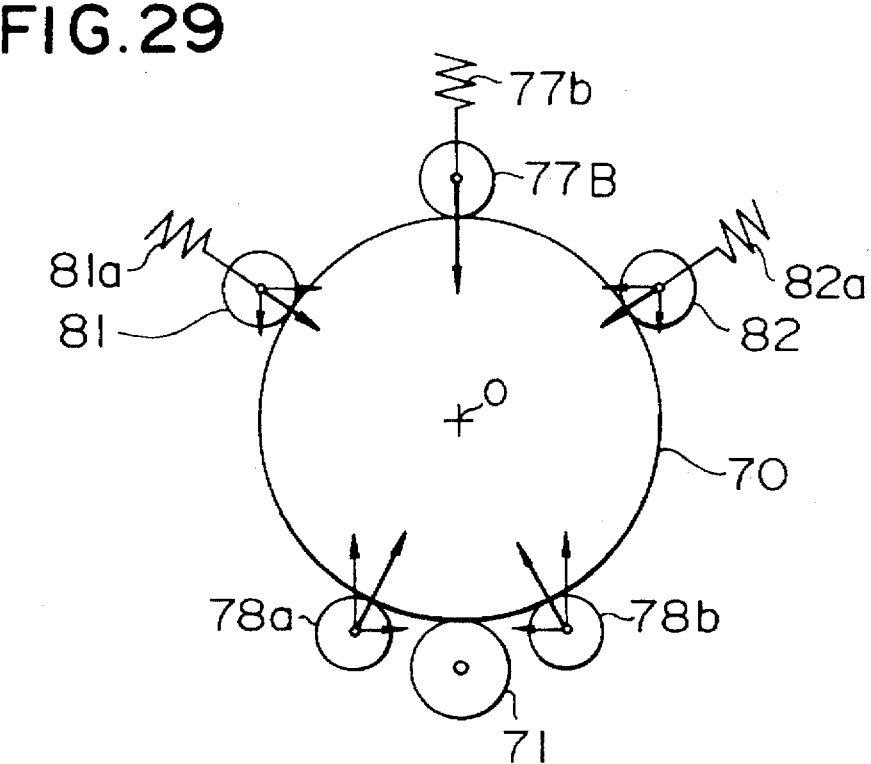
FIG. 29 is a plan view showing an important part of the lighting prism plate driver/holder in Embodiment 6-3 of the present invention.

FIG. 29 shows a plan view of a lighting prism plate driver/holder showing Embodiment 6-3 of the present invention. In FIG. 29, like numerals in each of FIGS. 27 and 28 refer to like parts in each of Embodiments 6-2 and 6-1, and the description of the parts will be omitted. Though not shown, means for driving the driving roller 71 is assumed to be provided in this embodiment as in Embodiment 6-1.

The reference numeral 77B designates a main pressure roller, which gives main pressing force to the lighting prism plate 70 by means of a spring 77b supported to a fixed portion (not shown).

The reference numerals 81 and 82 designate first and second auxiliary pressure rollers, respectively. These auxiliary pressure rollers 81 and 82 have functions for assisting the pressing force of the main pressure roller 77B against the lighting prism plate 70 from laterally symmetrical positions. The auxiliary pressure rollers 81 and 82 are arranged in positions shown in FIG. 29 so that the auxiliary pressing force is given to the lighting prism plate 70 through springs 81a and 82a supported to fixed porions (not shown).

Although FIG. 29 shows the case where the diameter of each of the auxiliary pressure rollers 81 and 82 and the spring pressure thereof are substantially equal to the diameter of the main pressure roller 77B and the pressure of the spring 77b, respectively, it is a matter of course from the respective functions of the pressure rollers that the diameter of each of the auxiliary pressure rollers 81 and 82 may be made different from that of the main pressure roller 77B and that the pressure of each of the springs 81a and 82a may be made different from that of the spring 77b.

This embodiment has the configuration characteristic in that the two driven rollers 78a and 78b arranged in the side opposite to the main and auxiliary pressure rollers 77B, 81 and 82 bear the share of the pressing forces given by the main and auxiliary pressure rollers 77B, 81 and 82 as represented by the arrows, to thereby cancel the pressing forces in order to hold the lighting prism plate 70.

That is, in this embodiment, even in the case where backlash occurs in the lighting prism plate 70, the lighting prism plate 70 is held more stably by the main and auxiliary pressure rollers 77B, 81 and 82 and the driven rollers 78a and 78b compared with Embodiments 6-1 and 6-2 because not only the pressure of the spring 77b but also the pressure of the springs 81a and 82a act on the lighting prism plate 70.

Accordingly, even in the case where backlash occurs in the lighting prism plate 70, the alignment of the lighting prism plate 70 and the driving roller 71 is kept better so that the lighting prism plate 70 can be driven stably.

(Embodiment 6-4)

Figure 30:
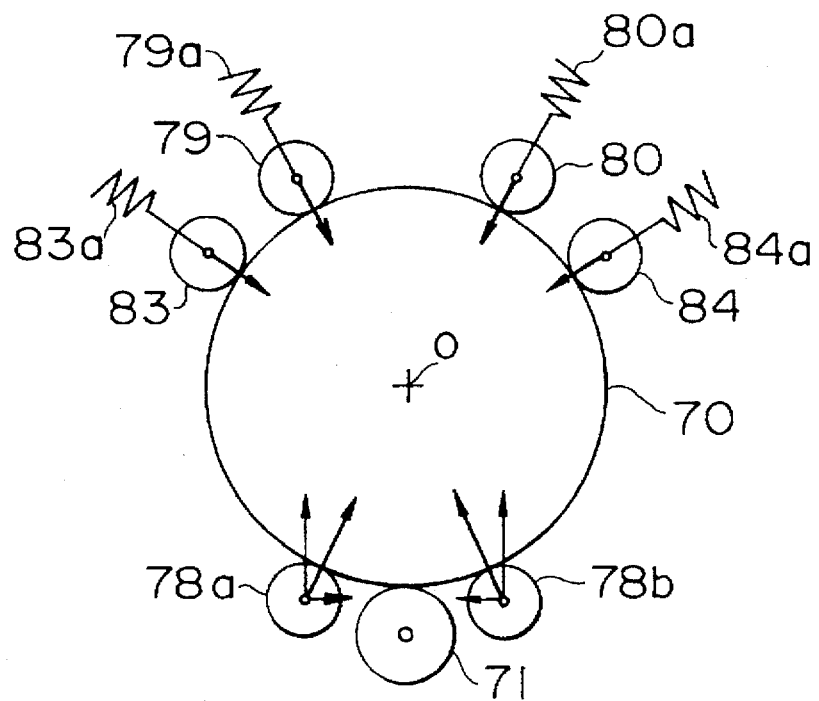
FIG. 30 is a plan view showing an important part of the lighting prism plate driver/holder in Embodiment 6-4 of the present invention.

FIG. 30 is a plan view of a lighting prism plate driver/holder showing Embodiment 6-4 of the present invention. In FIG. 30, like numerals in each of FIGS. 27 to 29 refer to like parts in each of Embodiments 6-1 to 6-3, and the description of the parts will be omitted. Though not shown, means for driving the driving roller 71 is assumed to be provided in this embodiment as in Embodiment 6-1.

This embodiment has the configuration characteristic in that the two driven rollers 78a and 78b arranged in the side opposite to four pressure rollers (first to fourth) 79, 80, 83 and 84 bear the share of the pressing forces given by the four pressure rollers 79, 80, 83 and 84 as represented by the arrows to thereby cancel the pressing force in order to hold the lighting prism plate 70.

In this occasion, the third and fourth pressure rollers 83 and 84 may be preferably arranged in positions equivalent to the positions of the first and second auxiliary pressure rollers 81 and 82 in Embodiment 6-3.

In FIG. 30, the reference numerals 83a and 84a designate springs, respectively. These springs 83a and 84a belong to the third and fourth pressure rollers 83 and 84, respectively, and supported to fixed portions (not shown) for giving pressing force to the lighting prism plate 70.

In this embodiment, because the alignment of the lighting prism plate 70 and the driving roller 71 is kept better by the increase of the number of the pressure rollers even in the case where backlash occurs in the lighting prism plate 70, the lighting prism plate 70 can be held and driven more stably.

The present invention is not limited to the aforementioned configurations of Embodiments 6-1 through 6-4, and various modifications thereof may be made as follows.

Although the respective embodiments have been described, for example, upon the case where the driven rollers are constituted by a pair of driven rollers 78a and 78b, the present invention can be applied to the case where two pairs of driven rollers are provided by adding a new pair of driven rollers to the pair of driven rollers 78a and 78b.

Although Embodiments 6-2 and 6-4 have been described upon the case where the pressure rollers of the same structure are provided, the present invention can be also applied to the case where in order to apply pressing force the pressure rollers are classified into main pressure rollers and auxiliary pressure rollers as described above in Embodiment 6-3 and, to this end, a main pressure roller 77B may be added as described above in Embodiment 6-3.

Further, as described above in Embodiments 6-1 and 6-3, the driving roller 71 is preferably arranged in a position being opposite to the pressure roller 77 against the lighting prism plate 70 or in a position being opposite to the main pressure roller 77B or, as described above in Embodiments 6-2 and 6-4, the driving roller 71 is preferably arranged in a position being opposite to the center axis of the pressure rollers 79 and 80. This driving roller 71 may be, however, arranged in a position slightly distant from the aforementioned position as long as positions balanced to bear the pressing forces of the pressure rollers arranged opposite to the driven rollers are set by selecting the positional relation between the driving roller 71 and the driven rollers 78a and 78b which are arranged so as to be symmetric with respect to the driving roller 71.

Although each of Embodiments 6-1 to 6-4 has shown the configuration that a gear is formed directly on the outer circumference of the lighting prism plate so as to engage with a gear formed on the outer circumference of the driving roller to thereby rotate the lighting prism plate on the basis of rotational torque given by the driving roller, this configuration may be changed as follows.

Figure 31:
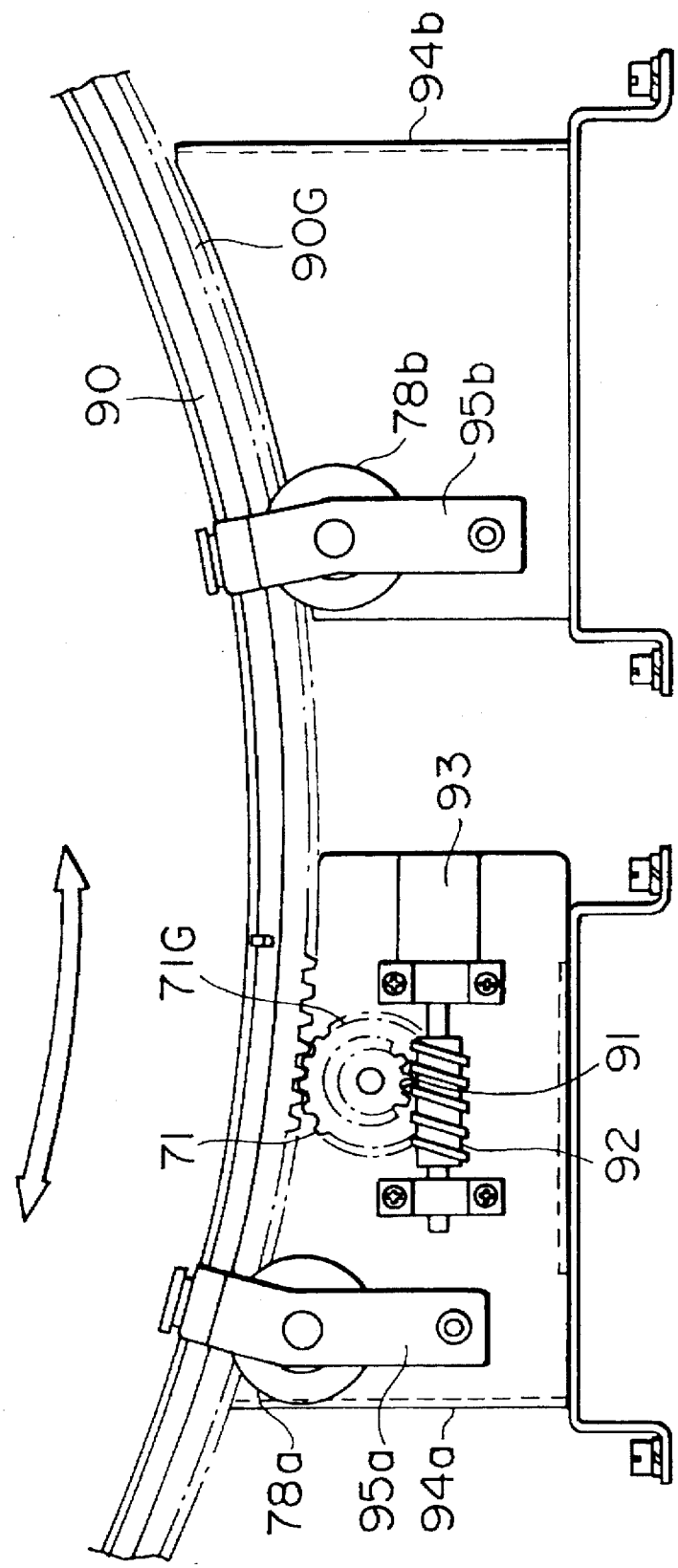
FIG. 31 is a front view of an important part showing the lighting prism plate driver/holder, showing another modified embodiment concerning Embodiments 6-1 to 6-4 of the present invention.

That is, as shown in FIG. 31, a rotary ring 90 may be provided in a concentrical position with respect to a lighting prism plate (not shown) so as to be unitedly connected to the lighting prism plate. The rotary ring 90 is provided with a gear 90G formed on the outer circumference of the rotary ring 90. There are provided: a driving roller 71 provided with a gear 71G engaging with the gear 90G; a worm 92 which engages with a worm wheel 91 provided concentrically with respect to the driving roller 71; and a motor 93 for giving rotational force to the worm 92 (which corresponds to the motor 72 of FIG. 27). Further, driven rollers 78a and 78b are arranged in opposite sides of the driving roller 71 so as to be supported to fixing portions (not shown) through supporters 94a and 94b and rotary ring stopper plates 95a and 95b. Thus, this apparatus may be configured so that the lighting prism plate is supported through the rotary ring 90. Incidentally, a coupler (not shown) may be provided between the motor 93 and the worm 92 as occasion demands.

Although the aforementioned embodiment has shown a torque transmission means of the type in which gears are formed both on the lighting prism plate and on the driving roller so as to engage with each other, this type torque transmission means may be replaced by a torque transmission means of the belt-drive type or a torque transmission means of the type similar to a film frame feeder in which a plurality of projections are provided at regular intervals on the outer circumference of one device whereas a plurality of holes are provided at regular intervals in the other device so as to be fitted to the plurality of projections to thereby transmit the driving force of the one device.

The aforementioned embodiment has shown the case where the lighting prism plate is arranged and held horizontally so as to be rotatable. In accordance with the setting conditions of the solar lighting apparatus in a building to which the apparatus is to be applied, the solar lighting apparatus 305 having the lighting prism plate 320 arranged horizontally as represented by the solid line of FIG. 78 may be replaced, for example, by a solar lighting apparatus 305A having a lighting prism plate 320A arranged obliquely with respect to the roof 301 of a building or by a solar lighting apparatus 305B having a lighting prism plate 320B arranged vertically on the portion of a wall 302a as represented by the two-dot-and-dash line of FIG. 78. In these cases, the lighting prism plate 320A or 320B is required to be held rotatably. It is a matter of course that the present invention can be applied to the lighting prism plate 320A or 320B in these cases.

Although each of the aforementioned embodiments has shown the configuration of a driver/holder in the case of one lighting prism plate for the sake of simplification, it is to be understood that if a plurality of lighting prism plates are used, the configuration shown in each of the aforementioned embodiments is prepared for each of the lighting prism plates.

The solar lighting apparatus having the lighting prism plate driver/holder as described above in Embodiment 6 has excellent effects as follows.

(1) Because not only pressing force is given from one side of the lighting prism plate by at least one pressure roller supported by elastic means but also at least one pair of driven rollers are provided on the other side to receive the pressing force so that the lighting prism plate is rotated by a driving roller while held in good balance, the predetermined rotation of the lighting prism plate can be made while the lighting prism plate is held smoothly correspondingly to the distortion of the lighting prism plate caused by the production thereof, the deformation of the lighting prism plate caused by the expansion or contraction thereof due to temperature in use, and so on.

That is, because the lighting prism plate is held idly to make provision for the deformation, or the like, the alignment of the lighting prism plate and the driving roller is held stably so that there is no hindrance to the predetermined rotation of the lighting prism plate corresponding to the movement of the sun.

(2) Because the configuration is such that no rotary shaft is provided in the center of the lighting prism plate, no shadow of the rotary shaft and its bearing portion as inevitably created on the lighting prism plate in the case of the configuration that the lighting prism plate is held/driven by a rotary shaft can be generated so that there is no influence on the lighting prism plate for lighting.

(3) Because the degree of freedom in the arrangement of rollers can be increased by increasing the number of pressure rollers, the respective rollers can be arranged so that the shadow is reduced as extremely as possible in the case where the lighting prism plate is assembled into a skylight.

Embodiment 7

Embodiment 7 of the present invention which concerns a lighting prism plate holder for indirectly holding a lighting prism plate in a solar lighting apparatus will be described below specifically with reference to FIGS. 32 through 35.

Figure 32:
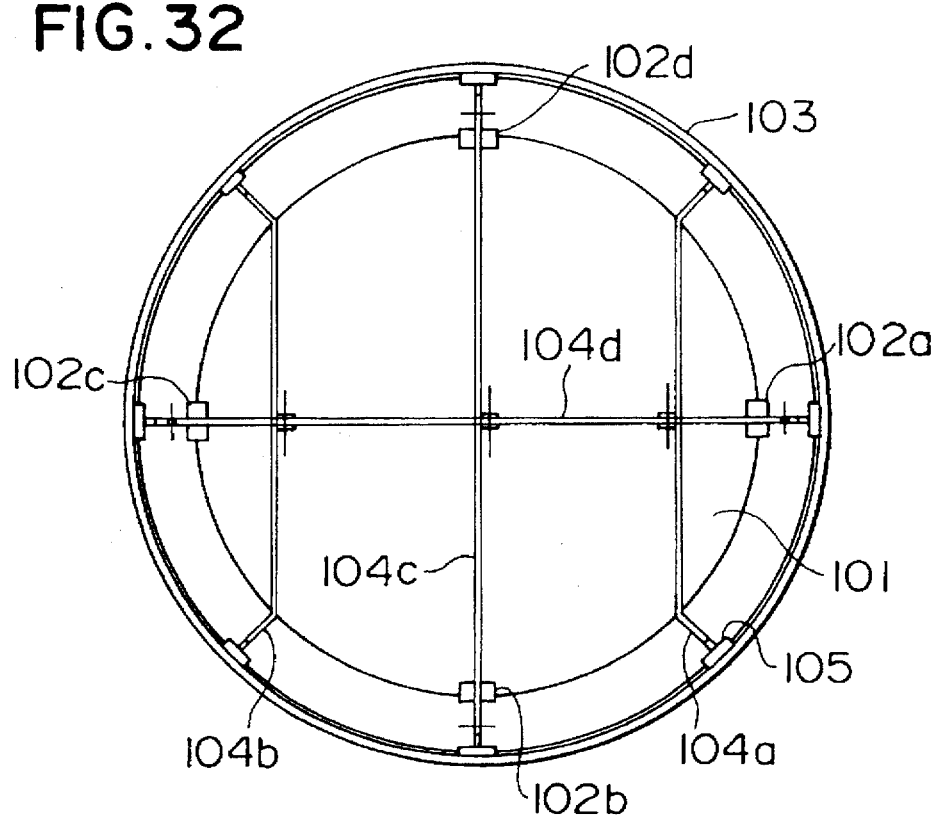
Figure 33:
Figure 34A:
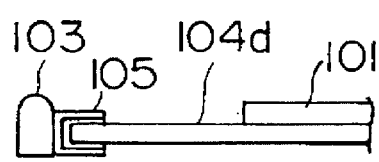
FIG. 34A is an enlarged front view of an end portion of FIG. 33.
Figure 34B:
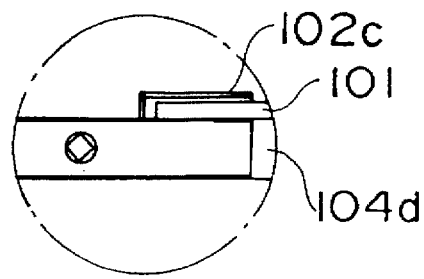

FIG. 32 is a plan view of a lighting prism plate holder in a solar lighting apparatus. FIG. 33 is a front view of FIG. 32. FIG. 34A is an enlarged front view of the end portion of FIG. 33. FIG. 34B is an enlarged front view of the portion XXXIVB of FIG. 33.

As shown in FIGS. 32 through 34B, the lighting prism plate holder includes: a pair of circular lighting prism plates 101, for example, constituted by the aforementioned lighting prism plate; a metal rotary ring 103 which is disposed concentrically so as to surround at least one of the lighting prism plates 101 and which is provided with a gear formed on the outer circumference thereof; a plurality of holding plates 104a to 104d which have end portions inserted into the inner circumference portion of the metal rotary ring 103 and which are arranged so as to intersect each other in order to hold the lighting prism plate 101; a plurality of stoppage fittings 102a to 102d mounted in the positions of intersection between the holding plates 104c to 104d and the outer edge portion of the lighting prism plate 101 and having hood portions which are formed so that the lighting prism plate 101 can be locked while it is allowed to be thermally expanded; and insertion fittings 105 for idly inserting respective end portions of the holding plates 104a to 104d into the metal rotary ring 103.

Incidentally, the lighting prism plate rotation driver may be configured as shown in FIG. 31 which shows a modified example of Embodiment 6.

Figure 35:
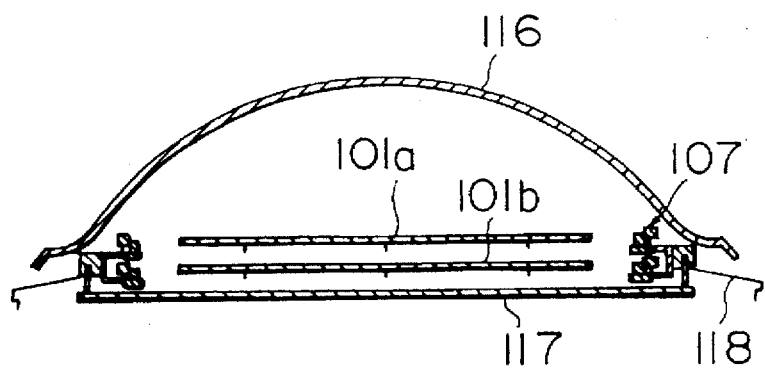
FIG. 35 is a sectional front view of the solar lighting apparatus in Embodiment 7 of the present invention.

FIG. 35 is a vertically sectional front view of the solar lighting apparatus according to the present invention shown in FIG. 32. In FIG. 35, the reference numeral 116 designates a transparent cover; 117, a light distribution plate; and 118, a draining frame.

Incidentally, the reference numerals 101a and 101b designate lighting prism plates each of which corresponds to the lighting prism plate heretofore designated by the reference numeral 101.

In the aforementioned configuration, the apparatus according to the present invention operates as follows.
(1) Apparatus of Embodiment 7-1 (see FIGS. 32 and 33)

(1) Because the plurality of holding plates 104a to 104d are connected so as to intersect each other in order to hold the lighting prism plate 101 with respect to the rotary ring 103, the connection of the holding plates is stable.

(2) The reason why the transparent holding plates are used is that influence on lighting can be avoided. The material for the holding plates is preferably selected from the group of acryl and polycarbonate.

(3) The reason why the holding plates of resin are used is that the lighting prism plate is made of resin and, therefore, the coefficient of thermal expansion of the holding plates can be made equal to the coefficient of thermal expansion of the lighting prism plate in order to reduce influence of stress on the lighting prism plate.
(2) Apparatus of Embodiment 7-2 (see FIG. 34A)

Because there is a difference in expansion or contraction due to thermal expansion between the metal rotary ring 103 and the holding plates 104a to 104d, the holding plates 104a to 104d are idly inserted into the metal rotary ring 103 through the insertion fittings 105 so that the difference due to the thermal change is absorbed. Incidentally, the insertion fittings 105 are fixed to the metal rotary ring 103 by means of screws, or the like.
(3) Apparatus of Embodiment 7-3 (see FIG. 34B)

The lighting prism plate 101 is held by the holding plates 104a to 104d and inserted into gaps of the stoppage fittings 102a to 102d so that appropriate gaps are provided between the end surface of the lighting prism plate 101 and the stoppage fittings 102a to 102d to thereby absorb the difference between the coefficients of thermal expansion. The stoppage fittings 102a to 102d are fixed to the holding plates 104c and 104d by means of screws.

Embodiment 8

Embodiment 8 concerns a solar lighting apparatus of the skylight type.

Figure 36:
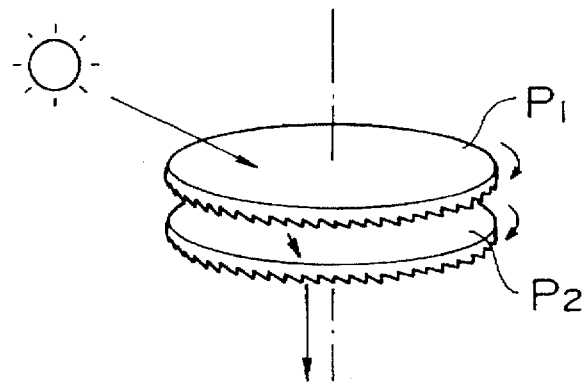
FIGS. 36 and 37 are perspective views of an important part showing the theory of the solar lighting apparatus according to Embodiments 8-1 to 8-3, respectively.
Figure 37:
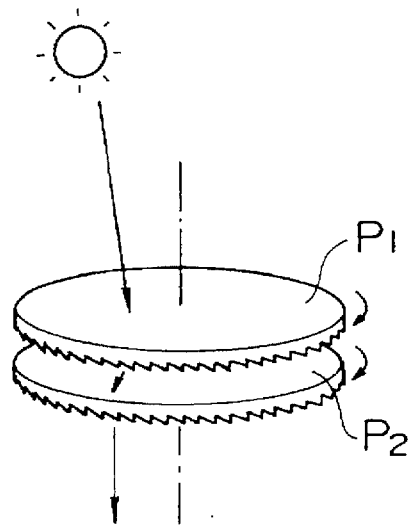

First, FIGS. 36 and 37 show theoretical views of the skylight type solar lighting apparatus.

In the apparatus shown in FIGS. 36 and 37, two lighting prism plates P1 and P2 are controlled to pursue the sun by using a total of four times of refraction so that direct rays of the sun are led to the vertical direction constantly. With respect to this control, each of the lighting prism plates P1 and P2 is controlled to be rotated at an optimum speed on a horizontal plane by a driving mechanism (not shown) correspondingly to the change of the height and azimuth of the sun.

In FIGS. 36 and 37, a plurality of triangular micro prism portions are formed on the lower face portion of each of the lighting prism plates P1 and P2 so that the plurality of triangular micro prism portions have functions of controlling light refraction. FIG. 36 shows a low height of the sun whereas FIG. 37 shows a high height of the sun. In the case of the lowest height of the sun, it is necessary to refract light rays greatly, so that the two lighting prism plates P1 and P2 are used in positions where pits (hereinafter referred to as "prism pits") between micro prism portions thereof are arranged in the same direction. In this occasion, the path of light rays transmitted through the two lighting prism plates P1 and P2 can be changed greatly because refracting power is added up by the respective lighting prism plates P1 and P2.

It has been confirmed in the following experimental equipment that the direction of direct rays of the sun can be controlled in a solar height range of from 10° to 80° by rotating the thus configured two lighting prism plates P1 and P2 correspondingly to the height and azimuth of the sun.

Figures 38A, 38B:
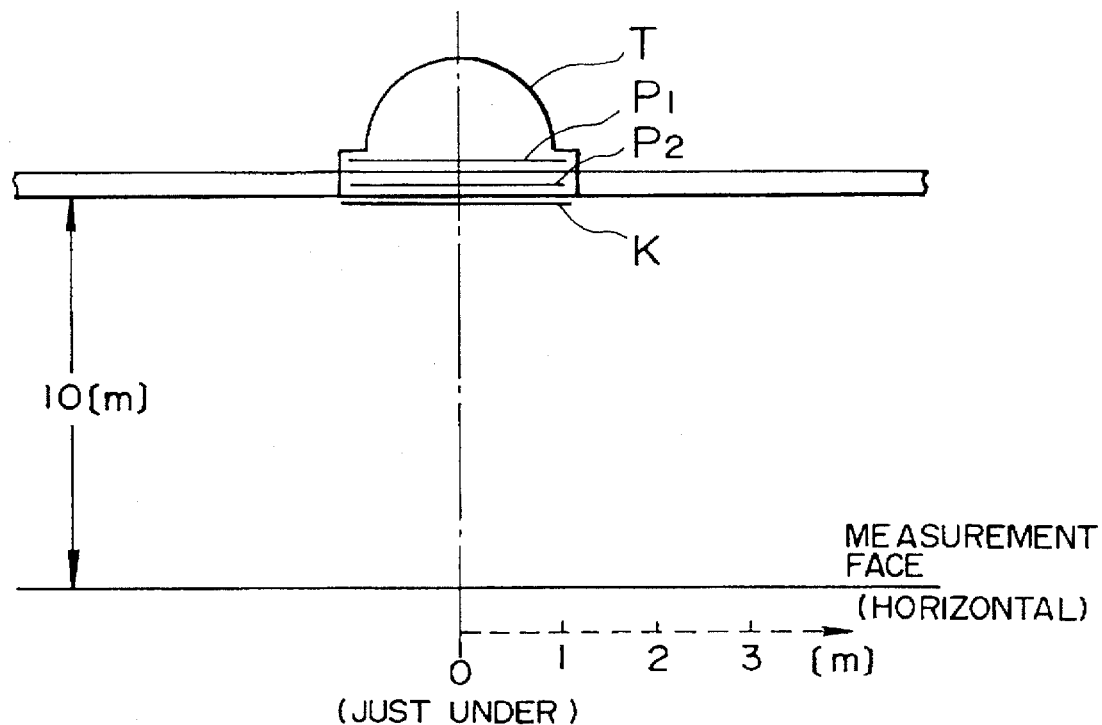
FIG. 38A is a front view showing an experimental equipment for performing a fundamental experiment on the configuration of Embodiment 8-1 of the present invention.
FIG. 38B is a table showing results of the experiment.

FIG. 38A shows an experimental equipment for confirming the theory of FIGS. 36 and 37. In FIG. 38A, the reference symbols P1 and P2 designate first and second lighting prism plates, respectively; K, a dispersion plate arranged on the outgoing side; and T, a transparent cover.

As for the lighting prism plates P1 and P2, data of optimum prism angles at which prism pits between prisms P1 and P2 face the sunlight correspondingly to the solar position preliminarily stored in a CPU (not shown) are taken out correspondingly to the kaleidoscopic change of the height and azimuth of the sun, and a motor (not shown) is driven on the basis of the data to control the quantity of rotation of each prism P1 and P2 so that the sunlight is controlled so as to always give lighting directly underward. The dispersion plate K is used for dispersing rainbow light to white light because outgoing light from the lighting prism plates P1 and P2 has a spectrum of rainbow colors.

Here, lighting can be set freely from spotlight lighting to wide-range uniform lighting correspondingly to the kind of the dispersion plate. For example, in the case of spotlight lighting, a matted dispersion plate or a fine mat PMMA plate made by Mitsubishi Rayon Co., Ltd. is preferably used. For example, in the case of dispersive radiation, a 422 milky-white PMMA plate made by Mitsubishi Rayon co., Ltd., or the like, is preferably used.

In the configuration of FIG. 38A, results of measurement under the following conditions (1) to (4) in the case where a 600φ lighting prism plate (of PC) is used as each of the lighting prism plates P1 and P2 and where a fine mat PPMA plate (made by Mitsubishi Rayon Co., Ltd.) is used as the dispersion plate K are as shown in a table of FIG. 38B.

(1) Weather: fine
(2) Time: about noon
(3) Measurement of Illumination: Minolta Illuminometer
(4) Direct Sunlight: about 90,000 [1×] (normal line face)

Accordingly, the following analysis is made from the table of FIG. 38B.

It is apparent from comparison between the measurement conditions (1) and (2) in the table that higher intensity of illumination than ten times as much as that in the case of a conventional skylight having no lighting prism plate is obtained in the case of a skylight according to the present invention by controlling the sunlight so as to always give lighting directly underward.

It is further apparent from comparison between the measurement conditions (2) and (3), or in other words, from comparison between the case of a conventional skylight having no lighting prism plate and the case of a skylight (no direct sunlight) according to the present invention, in the table that the skylight type solar lighting apparatus according to the present invention can secure intensity of illumination as high as that of the conventional skylight even in the case of no direct sunlight caused by cloudy weather.

Because each of the lighting prism plates is made of transparent PC resin, ultraviolet rays harmful to the human body are cut off. Further, the airconditioning load in the summer is little because the PC resin transmits near infrared rays but cuts off infrared rays larger than about 2 [µm].

Next, a theory and an example of configuration in the case where a special material is used for the light distribution plate in order to improve light distribution characteristic in the present invention will be described below.

As a first experimental equipment for improvement in light distribution characteristic, there is shown an example in which instantaneous lighting glass (tradename: UMU, hereinafter referred to as "first light distribution plate") 120 made by Nippon Sheet Glass Co., Ltd. is used as a material which is such that the solar lighting characteristic obtained from the skylight type lighting apparatus is changed by one light distribution plate as shown in FIG. 39.

This first light distribution plate 120 is formed by putting a liquid crystal sheet between two sheets of float plate glass and controlling light transmission characteristic of glass by using the property in which liquid crystal molecules are oriented in a predetermined direction by application of AC voltage. In this occasion, it has been confirmed experimentally that the first light distribution plate 120 becomes opaque at voltage 0 [V] and becomes transparent at voltage 100 [V].

Figure 39:
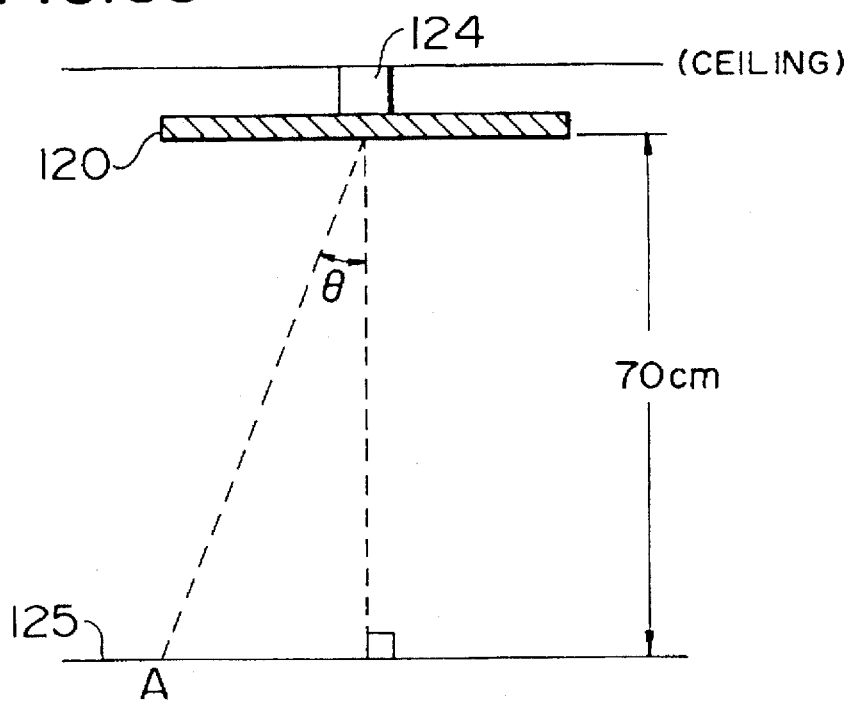
FIG. 39 is a front view showing an experimental equipment for performing a fundamental experiment on the configuration of Embodiment 8-2 of the present invention.
Figure 40:
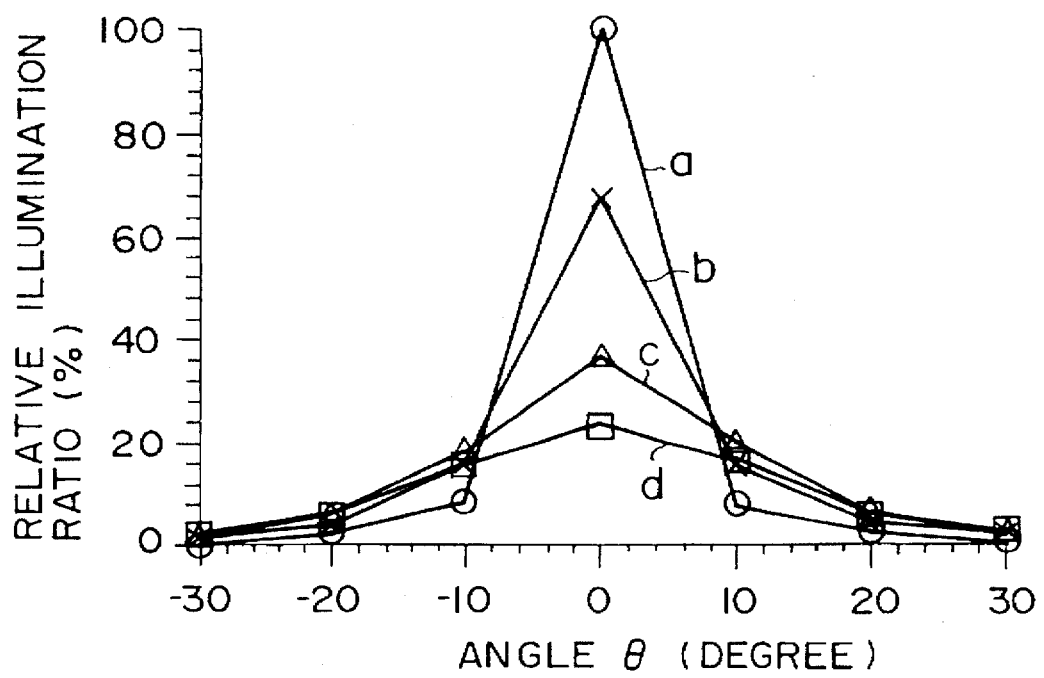
FIG. 40 is a characteristic graph showing results of the experiment by the experimental equipment of FIG. 39 for performing a fundamental experiment on the configuration of Embodiment 8-2 of the present invention.

In this occasion, intensity of illumination is measured in the arrangement shown in FIG. 39 with use of an artificial light source (100 [W] halogen pin spotlight: Uchida SR-J1) 124 as a substitute for the sunlight. Incidentally, the reference numeral 125 designates a measurement face which is arranged at a distance of 70 [cm] from the first light distribution plate 120. Further, the reference symbol A designates a point of measurement; and θ, an angle from the direction directly under the light source. FIG. 40 shows the change of light distribution characteristic corresponding to the voltage applied to the first light distribution plate 120 in the case where an experiment is made by the first experimental equipment.

In FIG. 40, the ordinate expresses a value (relative illumination ratio) obtained by dividing intensity of illumination at each measurement point by intensity of illumination just under the light source in the case where the first light distribution plate 120 is supplied with a voltage of 100 [V] and is transparent.

The abscissa expresses an angle from the direction directly under the light source to the measurement point, which angle corresponds to θ in FIG. 39.

In FIG. 40, the curve (a) expresses the change of light distribution characteristic in the case where the first light distribution plate 120 is supplied with an applied voltage of 100 [V].

Similarly, the curves (b), (c) and (d) express the change of light distribution characteristic in the case where the voltage applied to the first light distribution plate 120 is changed to 30 [V], 20 [V] and 0 [V], respectively. It is apparent from FIG. 40 that the quantity of light and light distribution characteristic can be changed by changing the voltage applied to the first light distribution plate 120 constituted by instantaneous lighting glass.

Figure 41:
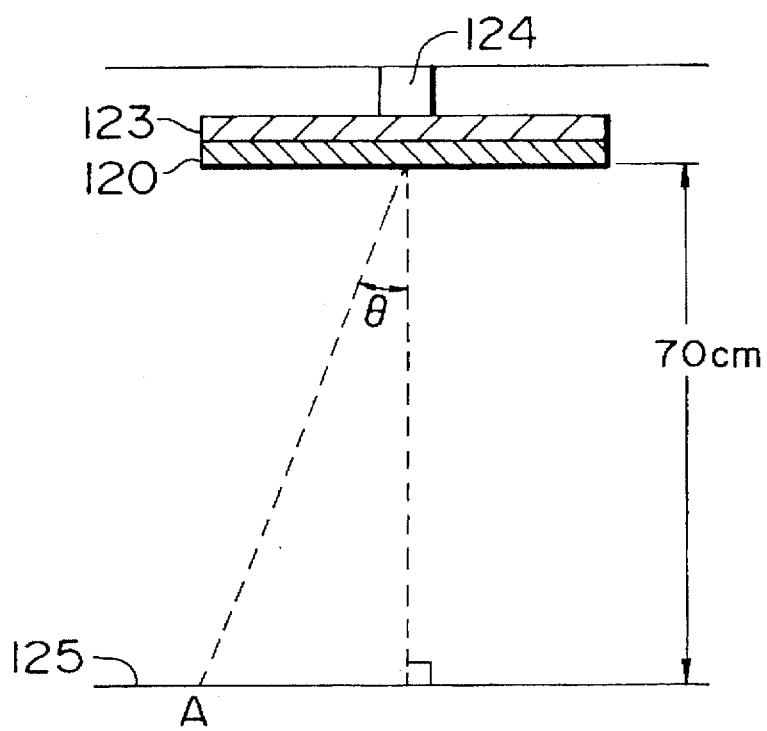
FIG. 41 is a front view showing an experimental equipment for performing a fundamental experiment on the configuration of Embodiment 8-3 of the present invention.

A second experimental equipment is configured as shown in FIG. 41. In the second experimental equipment, intensity of illumination is measured in the condition in which a second light distribution plate (for example, tradename 12M made by Asahi Chemical Industry Co., Ltd.) 123 is further arranged just above the first light distribution plate 120 so as to be adjacent thereto.

Like numerals in each of FIGS. 41 and 39 refer to like parts. For example, the second light distribution plate 123 is provided with a patterned plastic plate formed thereon.

Figure 42:
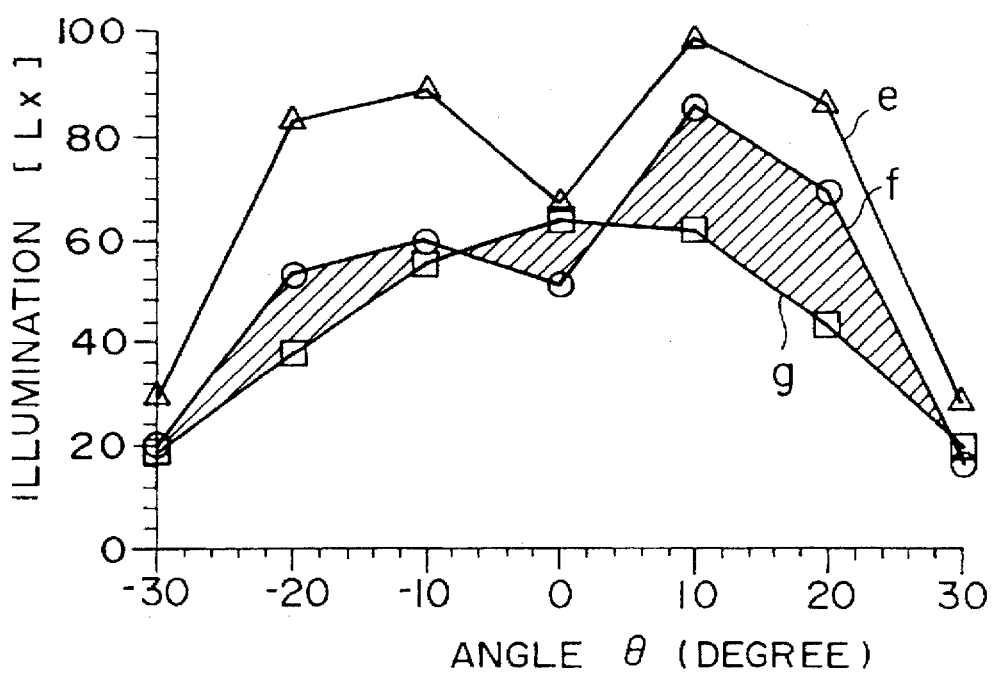
FIG. 42 is a characteristic graph showing results of the experiment by the equipment of FIG. 41 for performing a fundamental experiment on the configuration of Embodiment 8-3 of the present invention.

FIG. 42 shows experimental results in the second experimental equipment. In FIG. 42, the curve (e) expresses light distribution characteristic in the case where only the second light distribution plate 123 is arranged without arrangement of the first light distribution plate 120. In this case, there is given specific light distribution characteristic which is such that the portion just under the light source is made dark. The curve (f) expresses light distribution characteristic in the case where the first light distribution plate 120 arranged just under the second light distribution plate 123 is supplied with a voltage of 100 [V] and is made transparent. In this case, intensity of illumination is lowered almost parallelly compared with the case of provision of only the second light distribution plate 123, because of loss caused by transmission of light through the first light distribution plate 120. Further, in the case of the curve (f), the light distribution characteristic of the second light distribution plate 123 in which the portion just under the light source becomes dark is shown directly.

Next, when the voltage applied to the first light distribution plate 120 is changed to 0 [V], the light distribution characteristic is changed as shown in the curve (g). In this case, the light distribution characteristic of the second light distribution plate 123 disappears, that is, there is shown the condition of the ordinary light distribution characteristic that the portion just under the light source is brightest and that the portion farther therefrom becomes darker.

Because the specific characteristic of the second light distribution plate 123 is controlled by the first light distribution plate 120 in the manner as described above, it is to be understood that lighting can be controlled in a range surrounded by the oblique line in FIG. 42 in the case of a combination of the first and second light distribution plates 120 and 123.

Next, Embodiments 8-1 to 8-3 to which the theory of the skylight type lighting apparatus of the present invention, obtained in the respective experimental examples in FIGS. 38A, 39 and 41 is applied will be described below with reference to FIGS. 43, 44 and 45.

(Embodiment 8-1)

Figure 43:
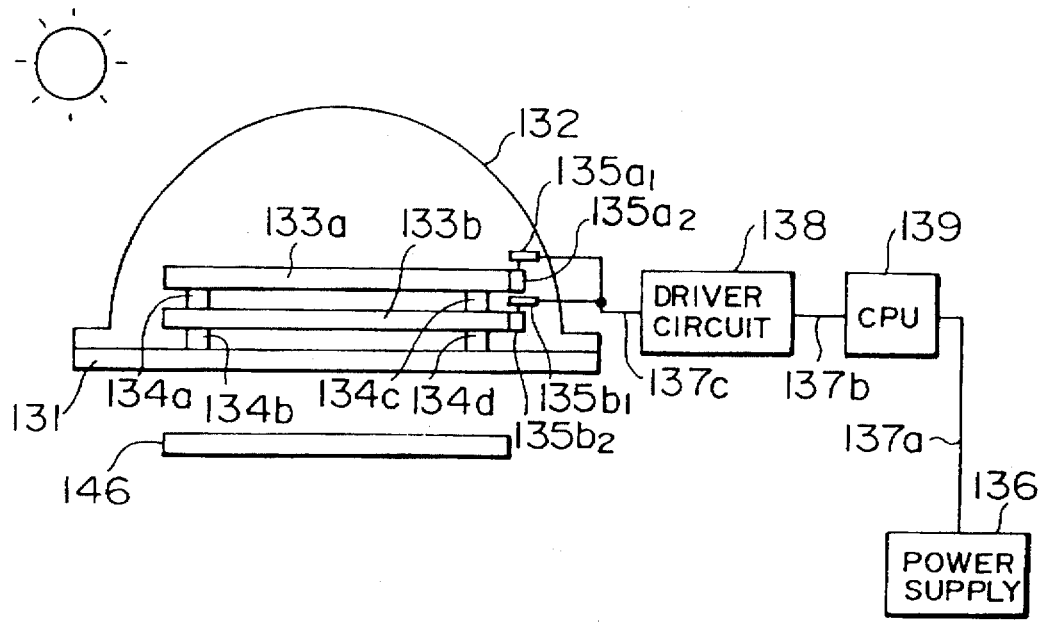
FIG. 43 is a front view showing the configuration of Embodiment 8-1 of the present invention.

FIG. 43 shows Embodiment 8-1 of the present invention. In FIG. 43, the reference numeral 131 designates a skylight frame; 132, a transparent cover; 133a, a first lighting prism plate; and 133b, a second lighting prism plate. The lighting prism plates 133a and 133b are arranged within the transparent cover 132. Incidentally, though not shown, assume that a plurality of triangular micro prism portions as shown in FIGS. 36 and 37 are formed in the lower face portion of each of the lighting prism plates 133a and 133b.

The reference numerals 134a, 134b, 134c and 134d designate shaft bearings for slidably supporting the lighting prism plates 133a and 133b.

The reference numerals 135a1 and 135b1 designate motors for rotating the lighting prism plates 133a and 133b, respectively. The motors 135a1 and 135b1 are designed so that the driving forces of the motors 135a1 and 135b1 are transmitted through gears 135a2 and 135b2 to gear portions (not shown) formed on the outer circumference of the lighting prism plates 133a and 133b, respectively.

The reference numeral 136 designates a power supply; 137a to 137c, conductive wire; 138, a driver circuit for driving the motor 135a1 and 135b1; and 139, a CPU. Data of rotational speed of the lighting prism plates 133a and 133b optimized correspondingly to the orbit such as height, azimuth, etc. of the sun are given to the motors 135a1 and 135b1 through the driving circuit 138 by the CPU 139. The reference numeral 146 designates a dispersion plate arranged in the outgoing portion.

In the above configuration, the sunlight can give lighting indoor because each of the lighting prism plates 133a and 133b is rotated at a proper speed on the basis of a signal from the CPU 139 while following the height and direction of the sun.

(Embodiment 8-2)

Figure 44:
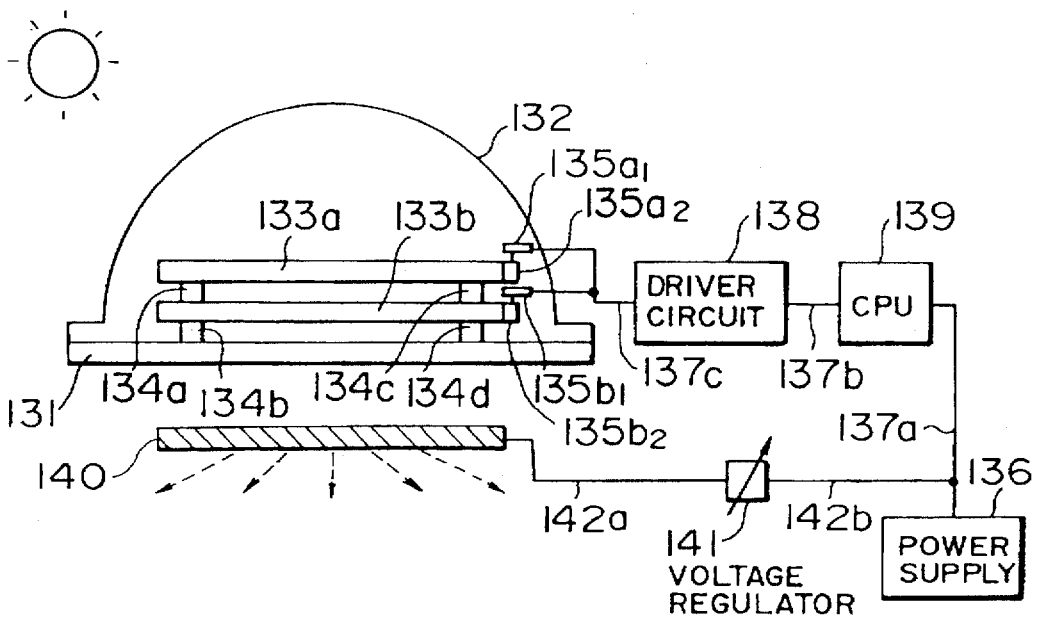
FIG. 44 is a front view showing the configuration of Embodiment 8-2 of the present invention.

FIG. 44 shows Embodiment 8-2 of the present invention. In FIG. 44, constitutional parts corresponding to those in Embodiment 8-1 shown in FIG. 43 are referenced correspondingly.

The reference numeral 140 designates a first light distribution plate arranged in the outgoing side as a substitute for the dispersion plate 146 in Embodiment 8-1. The light distribution plate 140 is formed, for example, of instantaneous lighting glass (tradename: UMU) as described above. The reference numeral 141 designates a voltage regulator; and 142a and 142b, conductive wire for connecting the first light distribution plate 140 and the voltage regulator 141 to the power supply 136, respectively. Here, the voltage applied to the first distribution plate 140 is regulated by the voltage regulator 141.

Accordingly, also in this embodiment, data corresponding to the change of the position (height, azimuth) of the sun are given to the motors 135a1 and 135b1 through the driving circuit 138 by the CPU 139 in the same manner as in Embodiment 8-1, so that the prism angles of the lighting prism plates 133a and 133b are controlled to be optimized through the gears 135a2 and 135b2 to thereby make the sunlight taken indoor effectively.

In this embodiment, the first light distribution plate 140 is arranged in the outgoing side of the lighting apparatus. Because the first light distribution plate 140 is designed so that light distribution characteristic can be changed as shown in FIG. 40 when the voltage applied to the first distribution plate 140 is regulated by the voltage regulator 141, this embodiment is characterized in that expression of room lighting can be changed.

(Embodiment 8-3)

Figure 45:
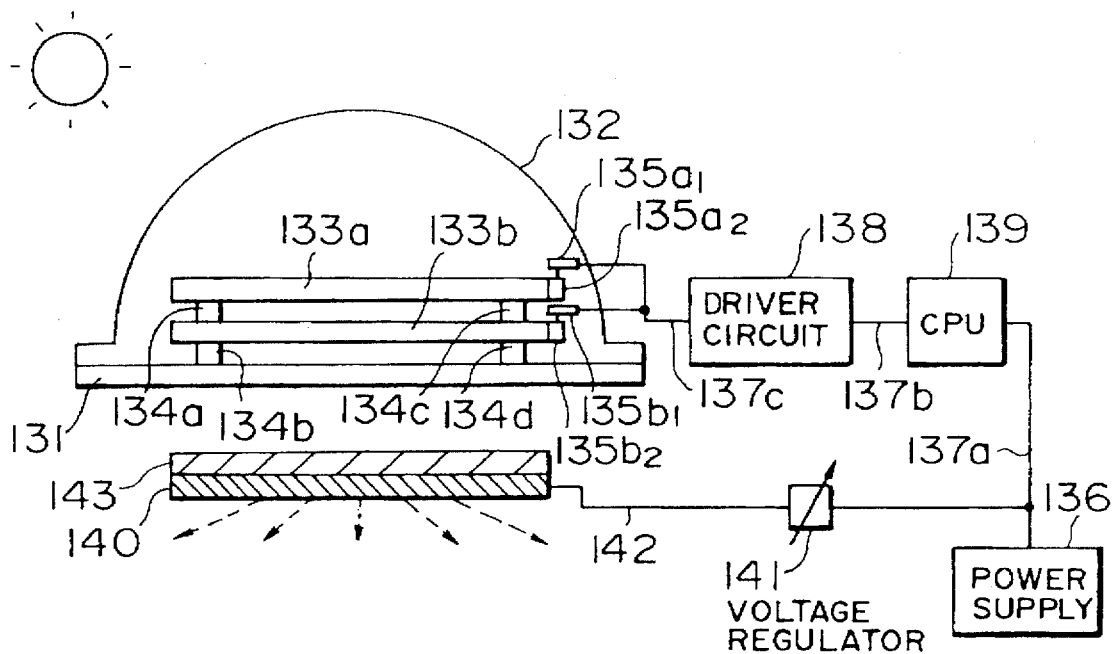
FIG. 45 is a front view showing the configuration of Embodiment 8-3 of the present invention.

FIG. 45 shows Embodiment 8-3 of the present invention. In FIG. 45, constitutional parts corresponding to those in Embodiment 8-2 shown in FIG. 44 are referenced correspondingly.

The reference numeral 143 designates a second light distribution plate which is constituted, for example, by a patterned plastic plate and which is arranged, for example, just above the first light distribution plate 140.

That is, this embodiment is characterized in that the first and second light distribution plates 140 and 143 make up an outgoing direction control means. Substantially, not only the sunlight is taken indoor efficiently correspondingly to the position of the sun in the same manner as in Embodiment 8-2 but also room light distribution characteristic is controlled so that expression of lighting is changed by the combination of light distribution characteristics of the two light distribution plates.

Accordingly, in the case of lighting expression control in this embodiment, light transmission characteristic is changed when the voltage to be applied to the first light distribution plate 140 is selected by the voltage regulator 141. Thus, there is obtained light distribution characteristic which is such that the light distribution characteristic of the second light distribution plate 143 formed of a patterned plastic plate, or the like, appears or disappears.

Because the skylight type solar lighting apparatus of Embodiment 8 is configured as described above, there are obtained excellent effects as follows.
(1) Because the lighting means for taking light in correspondingly to the position of the sunlight is provided for a skylight so that not only conventional sky light naturally taken into the house but also solar light can be taken indoor correspondingly to the change of the position of the sun, a large quantity of light is taken into the house having the skylight arranged thereon compared with the conventional case.

Further, the method used in the present invention is a light ray control method which can be put into the conventional shape of the skylight. That is, because the method is a simple method in which each lighting prism plate is rotated on one plane, the present invention is adapted to the purposes of the present invention of reduction in size, weight, cost, etc. Electric power to be controlled can be reduced because the lighting prism plate can be rotated at a very low rotational speed.
(2) When the outgoing direction control means is provided in the outgoing side of the aforementioned lighting apparatus so as to be able to select the outgoing direction, there is obtained an effect as follows.

Because light distribution characteristic can be changed continuously without interchange of the light distribution plate, the field in which the skylight type lighting apparatus according to the present invention is used can be widened greatly.

If a first light distribution plate such as instantaneous lighting glass (tradename: UMU) in which light transmission can be controlled by controlling orientation of liquid crystal is used as the outgoing direction control means, the light distribution characteristic can be controlled easily by only a combination of the first light distribution plate and the voltage regulator for applying the voltage to the first light distribution plate. Accordingly, the light distribution characteristic can be controlled by the arrangement of only one light distribution plate.

Accordingly, the conventional work for interchanging the light distribution plate into a new one in order to change the light distribution characteristic is not required, that is, the preparation of light distribution plates different in light distribution characteristic as spare parts is not required.

Further, by combination arrangement which is such that not only the first light distribution plate in which light transmission can be controlled is arranged in the outgoing side but also the second light distribution plate is arranged, for example, just above the first light distribution plate, the light distribution characteristics of the two light distribution plates are multiplied by each other so that expression of lighting can be made richer.

Further, if several kinds of light distribution plates having specific light distribution characteristics are used in combination, a larger number of lighting patterns can be generated.

Embodiment 9

Embodiment 9 of the present invention which concerns an optical axis sensor used in a solar lighting controller (which will be described later in and after Embodiment 10) will be described below with reference to FIGS. 46A to 49.

Figure 46A:
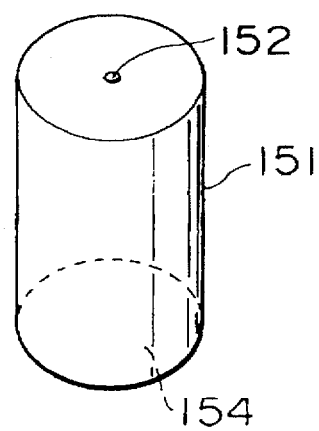
FIGS. 46A to 46C show Embodiment 9-1 of the present invention.
Figure 46B:
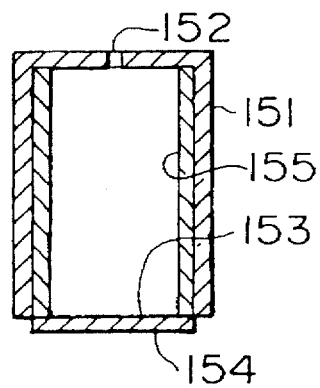
Figure 46C:
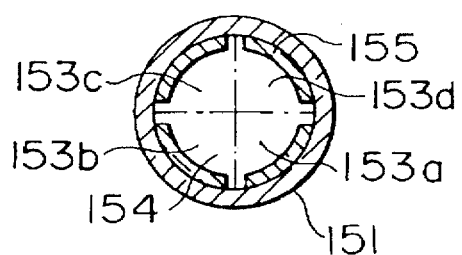

FIGS. 46A to 46C show Embodiment 9-1 of the optical axis sensor. FIG. 46A is an overall perspective view. FIG. 46B is a vertical sectional front view. FIG. 46C is a horizontal sectional view of FIG. 46B.

Figure 47:
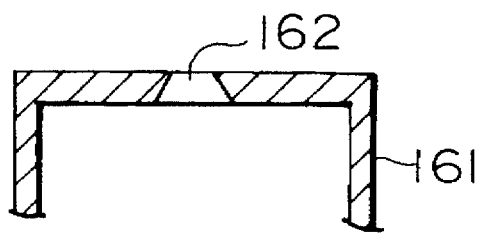
FIG. 47 is a vertical sectional front view showing an important part of the light sensor in Embodiment 9-2 of the present invention.

FIG. 47 is a vertical sectional front view showing an important part of Embodiment 9-2 of the optical axis sensor.

Figure 48:
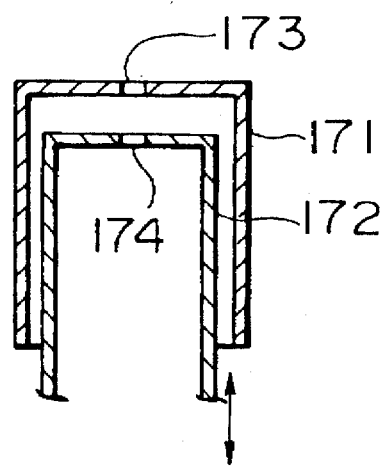
FIG. 48 is a vertical sectional front view showing an important part of the light sensor in Embodiment 9-3 of the present invention.

FIG. 48 is a vertical sectional front view showing an important part of Embodiment 9-3 of the optical axis sensor.

Figure 49:
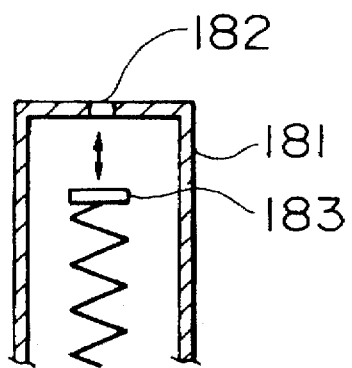
FIG. 49 is a vertical sectional front view showing an important part of the light sensor in Embodiment 9-4 of the present invention.

FIG. 49 is a vertical sectional front view showing an important part of Embodiment 9-4 of the optical axis sensor.

In each of Embodiments 9-1 to 9-4 of the optical axis sensor according to the present invention, there is shown an optical axis sensor in which a cylinder 151 of a metal such as aluminum used as a light shielder is provided with a hole 152 formed in the blocked top face of the cylinder 151 as shown in FIGS. 46A and 46B so that light is led from the hole 152 into the cylinder 151 and radiated to the bottom region 153 of the cylinder 151 to thereby determine the optical axis.

(Embodiment 9-1)

Embodiment 9-1 shown in FIGS. 46A to 46C is configured so that the region 153 is partitioned into a plurality of regions and enclosed with light-conductive resin 155 divided into a plurality of parts correspondingly to the plurality of regions 153 so that a line connecting the hole 152 of the optical axis sensor and the center of the optical axis sensor is surrounded by the resin 155 and that light is transmitted to the respective regions of the optical sensor 154 through the light-conductive resin 155 so that the optical axis is determined on the basis of output values of the respective regions of the optical sensor 154.

The light-conductive resin 155 serves to conduct light with little reflection (with small reflectance). The respective regions of the light-conductive resin 155 serve to conduct incident light split downward respectively and independently.

That is, in the configuration as shown in FIGS. 46A to 46C, light can be made to enter the cylinder 151 only through the hole 152 so that light cannot enter the cylinder 151 from the periphery. In this occasion, an angle allowing light to enter the cylinder 151 is determined physically on the basis of the diameter and thickness of the hole.

Next, the region to which light is radiated is now assumed to be partitioned into four. When the direction of incident light is near the perpendicular direction, light strikes directly on the four split regions 153*a* to 153*d*. If the output values obtained from the four split regions 153*a* to 153*d* in this occasion are all equal, it is found that the direction of incident light is the perpendicular direction. If the output values from the optical sensor 154 are different in this occasion, the angle is found on the basis of the ratio of the output values. Further, intensity of light can be detected on the basis of the quantities of light radiated to the regions 153*a* to 153*d*.

(Embodiment 9-2)

Embodiment 9-2 shown in FIG. 47 is configured so that the diameter or thickness of the hole is changed or the shape of the hole is changed to a conical shape.

That is, in order to widen the incident angle range, the diameter of the hole 162 in the blocked top face of the metal cylinder 161 may be increased or the thickness of the hole may be reduced or the shape of the hole may be widened downward like a cone as shown in FIG. 47.

Incidentally, the optical axis and intensity of light are detected in the same manner as in Embodiment 9-1.

(Embodiment 9-3)

Embodiment 9-3 shown in FIG. 48 is configured so that a metal inner cylinder 172 is telescopically inserted into a metal outer cylinder 171 and that light is led into the inner cylinder 172 from holes 173 and 174 provided in blocked top faces of the cylinders 171 and 172, respectively.

That is, the hole thickness is substantially changed by moving the outer cylinder 171 of FIG. 48 up and down. The angle allowing light to enter the inner cylinder 172 is limited so that the number of optical axes (intensity of light in the optical axis) and the angle of the optical axis are determined on the basis of difference between outputs in this occasion.

(Embodiment 9-4)

Embodiment 9-4 shown in FIG. 49 is configured so that light is led into a metal cylinder 181 from a hole 182 provided in the blocked top face of the metal cylinder 181 and that a region 183 having an optical sensor provided therein is inserted into the cylinder 181 so as to be able to be adjusted vertically.

That is, the portion onto which light is radiated in FIG. 49 is moved up and down. Accordingly, the angle allowing light to enter the cylinder can be controlled on the basis of the distance between the hole and the region onto which light is radiated.

Accordingly, also in this embodiment, the angle of the optical axis and the intensity of light with respect to the optical axis can be detected in the same manner as in Embodiment 9-3.

The optical axis sensor of Embodiment 9 configured as described above has effects as follows.

(1) The optical axis sensor can be made a low-cost optical axis sensor.
(2) The incident angle can be widened in spite of a simple structure.
(3) Accordingly, the optical axis sensor is greatly useful as an optical axis sensor adapted to a solar lighting controller.

Embodiment 10

Embodiment 10 of the present invention which concerns a solar lighting controller for improving the lighting efficiency of a solar lighting apparatus regardless of the position where the solar lighting apparatus is set will be described below specifically on the basis of Embodiments 10-1 to 10-3 shown in FIGS. 50 to 55.

The basic characteristic of the present invention is in that a solar position detector is provided for detecting the position of the sun at each point of time in the position where the solar lighting apparatus is set.

(Embodiment 10-1)

Figure 50:
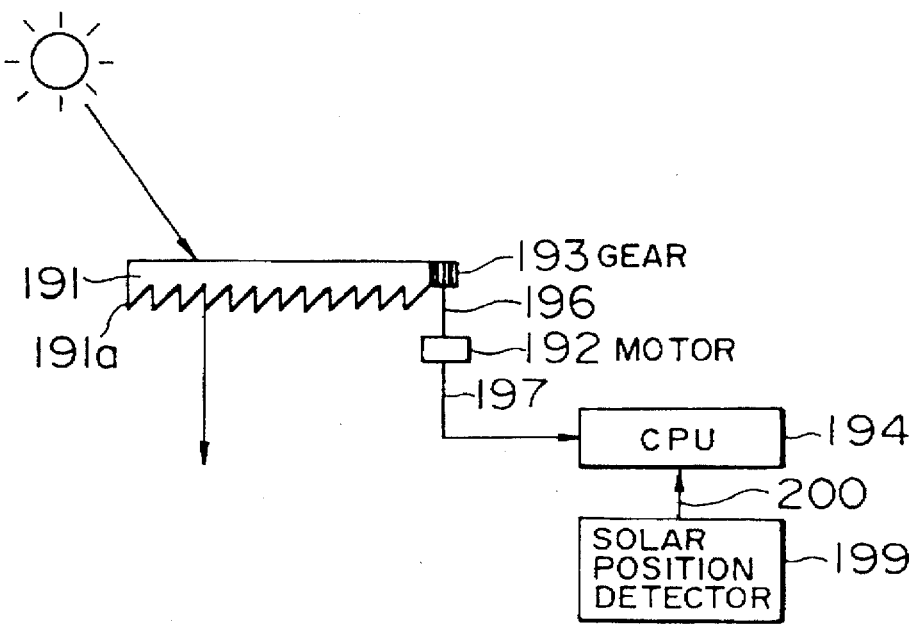
FIG. 50 is a schematic configuration view inclusive of a control circuit in Embodiment 10-1 of the present invention.
Figure 82:
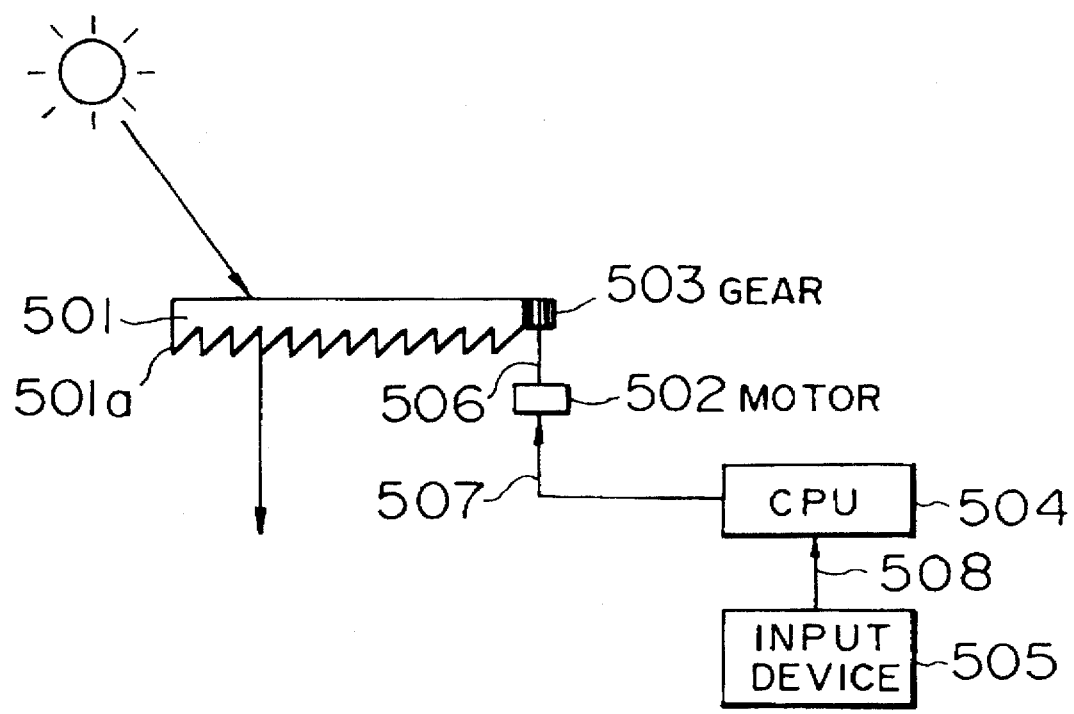
FIG. 82 is a schematic configuration view of a conventional solar lighting apparatus inclusive of a control circuit.
Figure 83A:
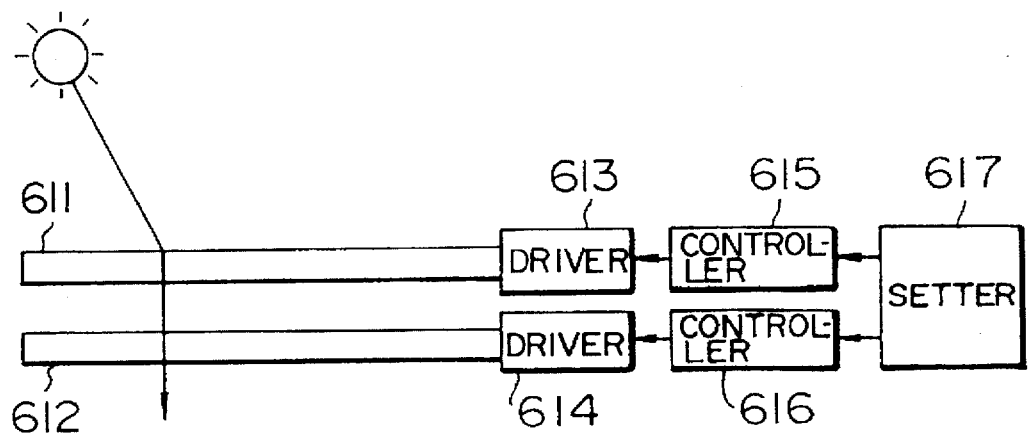
FIGS. 83A to 83C are views showing a conventional apparatus.
Figure 83B:
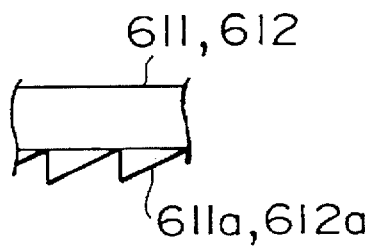
Figure 83C:
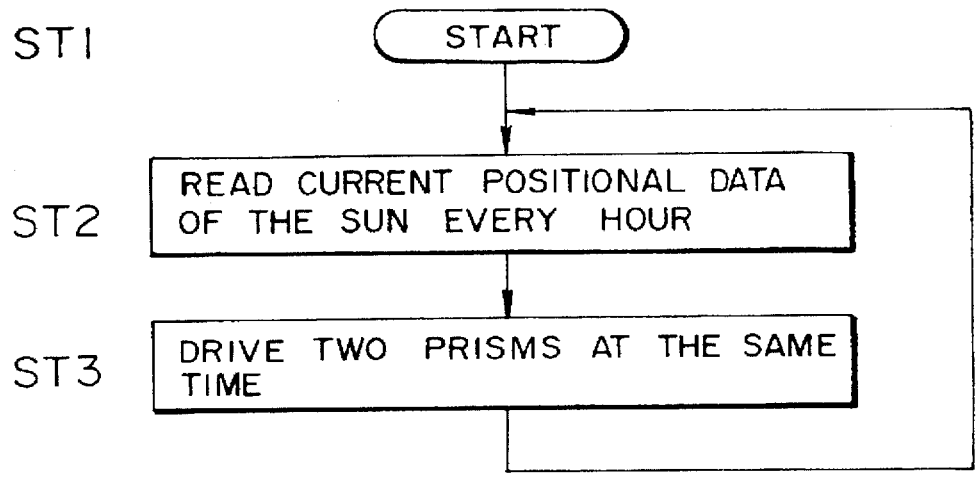
Figure 84A:
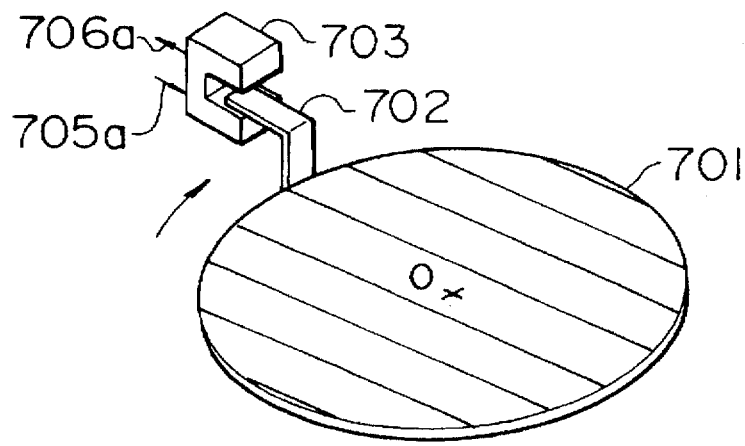
FIGS. 84A to 84C are views showing an example of a conventional apparatus.
Figure 84B:
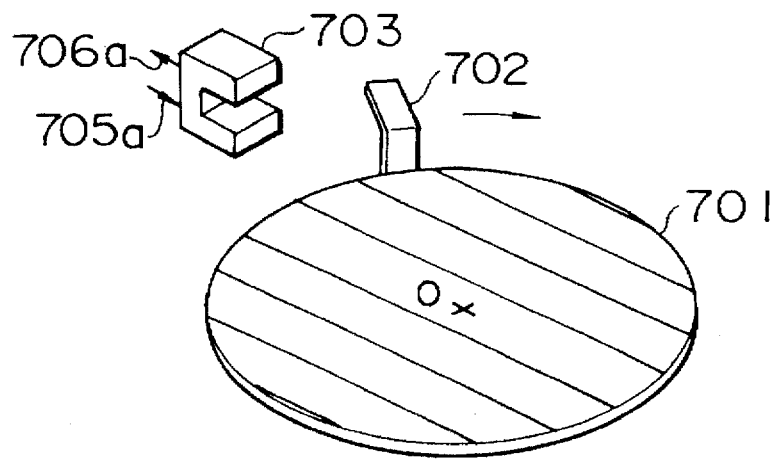
Figure 84C:
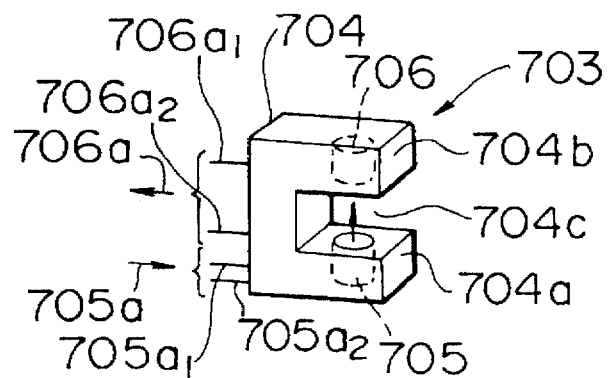
Figure 85A:
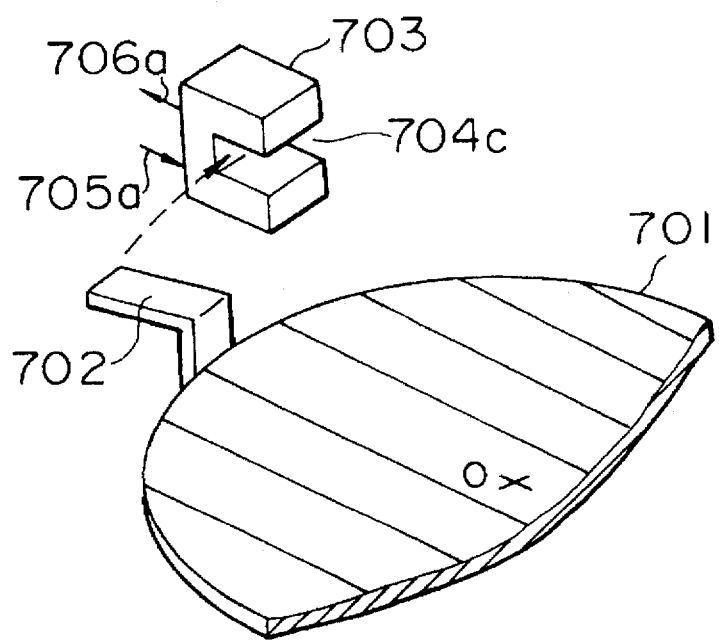
FIGS. 85A and 85B are views showing a conventional apparatus.
Figure 85B:
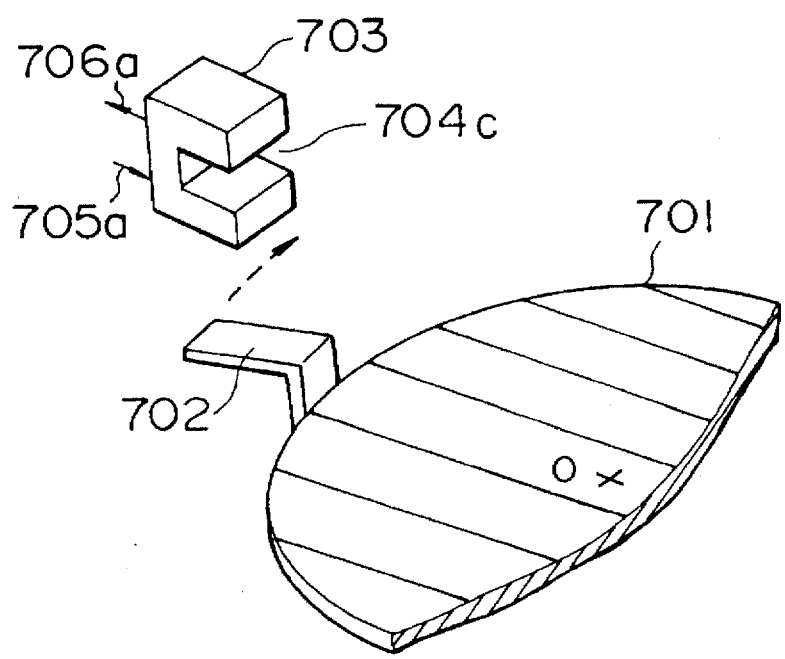

FIG. 50 shows Embodiment 10-1 of the present invention. In FIG. 50, the reference numeral 191 designates a lighting prism plate which serves as a lighting portion. A plurality of triangular micro prism portions 191a are formed in the lower face portion of the lighting prism plate 191. Though not shown, teeth which engage with a gear 193 (which will be described later) are formed on the outer circumference portion of the lighting prism plate 191. The reference numeral 192 designates a motor; and 193, a gear using the driving force of the motor to rotate the lighting prism plate 191. The reference numeral 194 designates a CPU; 196, a connection shaft for connecting the gear 193 and the motor 192; and 197 and 200, conductive wires, respectively. The aforementioned parts 191 to 200 are of the same structure as in the conventional apparatus of FIG. 82.

Figure 51:
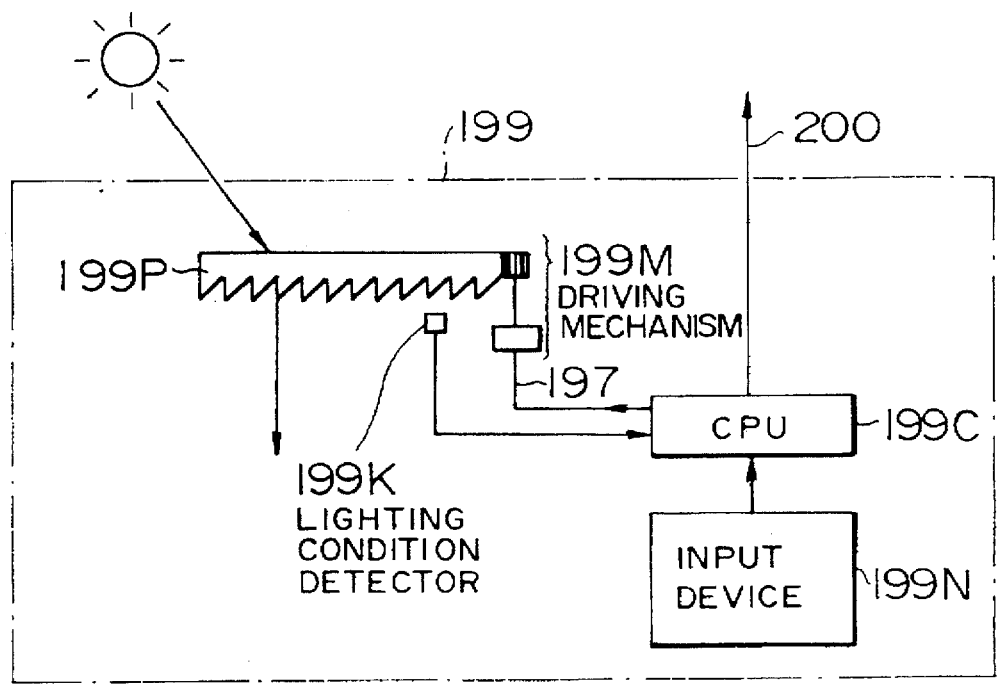
FIG. 51 is a schematic configuration view showing the configuration of a solar position detector used in the apparatus of Embodiment 10-1 of the present invention.

The reference numeral 199 designates a solar position detector which is set for detecting the position of the sun at each point of time in the position where the solar lighting apparatus 199 is set. For example, in the solar position detector 199, one lighting prism plate 199P or a plurality of lighting prism plates 199P which can rotate horizontally and independently are arranged in the lighting portion as shown in FIG. 51, and the solar position detector 199 has a lighting condition detector 199K such as an optical axis sensor, a light quantity sensor, or the like, arranged to face the lighting prism plate 199P, and a central processing unit 199C. The solar lighting detector 199 is configured so that incident light at each point of time is received from the sun while the prism angle of the lighting prism plate 199P is controlled to be rotated through a driving mechanism 199M correspondingly to the position of the sun and that the output signal from the lighting condition detector 199K is subjected to an arithmetic operation in the CPU 199C. Incidentally, the reference numeral 199N designates an input device for the CPU 199C.

Returning to FIG. 50, the reference numeral 200 designates conductive wire for giving the output signal of the solar position detector 199 to the CPU 194.

In the aforementioned configuration, the signal obtained by detecting the position of the sun at each point of time in the set position is given to the CPU 194 from the solar position detector 199, so that the CPU 194 gives a rotating instruction to the motor 192 on the basis of this signal to rotate the lighting prism plate 191 through the motor 192 and the gear 193.

Accordingly, the rotation of the lighting prism plate 191 is controlled in pursuit of the sun constantly so that the prism angle thereof is optimized, so that the quantity of light taken indoor can be optimized.

(Embodiment 10-2)

Figure 52:
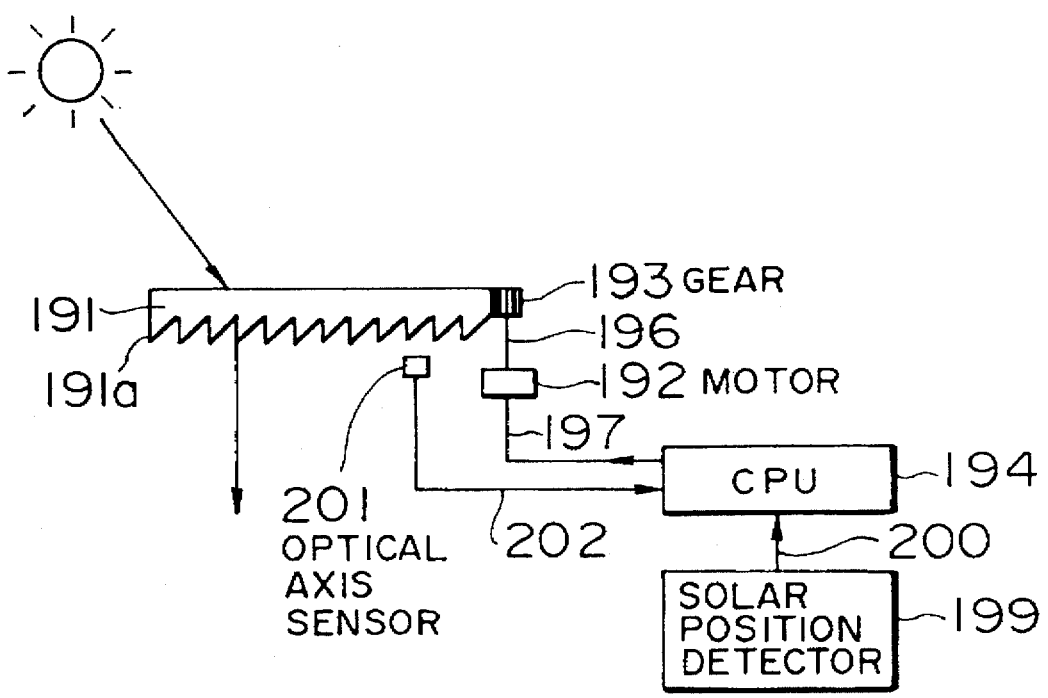
FIG. 52 is a schematic configuration view inclusive of a control circuit in Embodiment 10-2 of the present invention.

FIG. 52 shows Embodiment 10-2 of the present invention. Embodiment 10-2 of FIG. 52 has the almost same structure as Embodiment 10-1 of FIG. 50, so that the description of parts of the same structure will be omitted because corresponding parts are referenced correspondingly.

The configuration characteristic of this embodiment is in that in addition to the configuration of Embodiment 10-1, an optical axis sensor 201 is arranged to face the lighting prism plate 191 and that conductive wire 202 is provided to transmit the output signal of the optical axis sensor 201 to the CPU 194.

Figure 53:
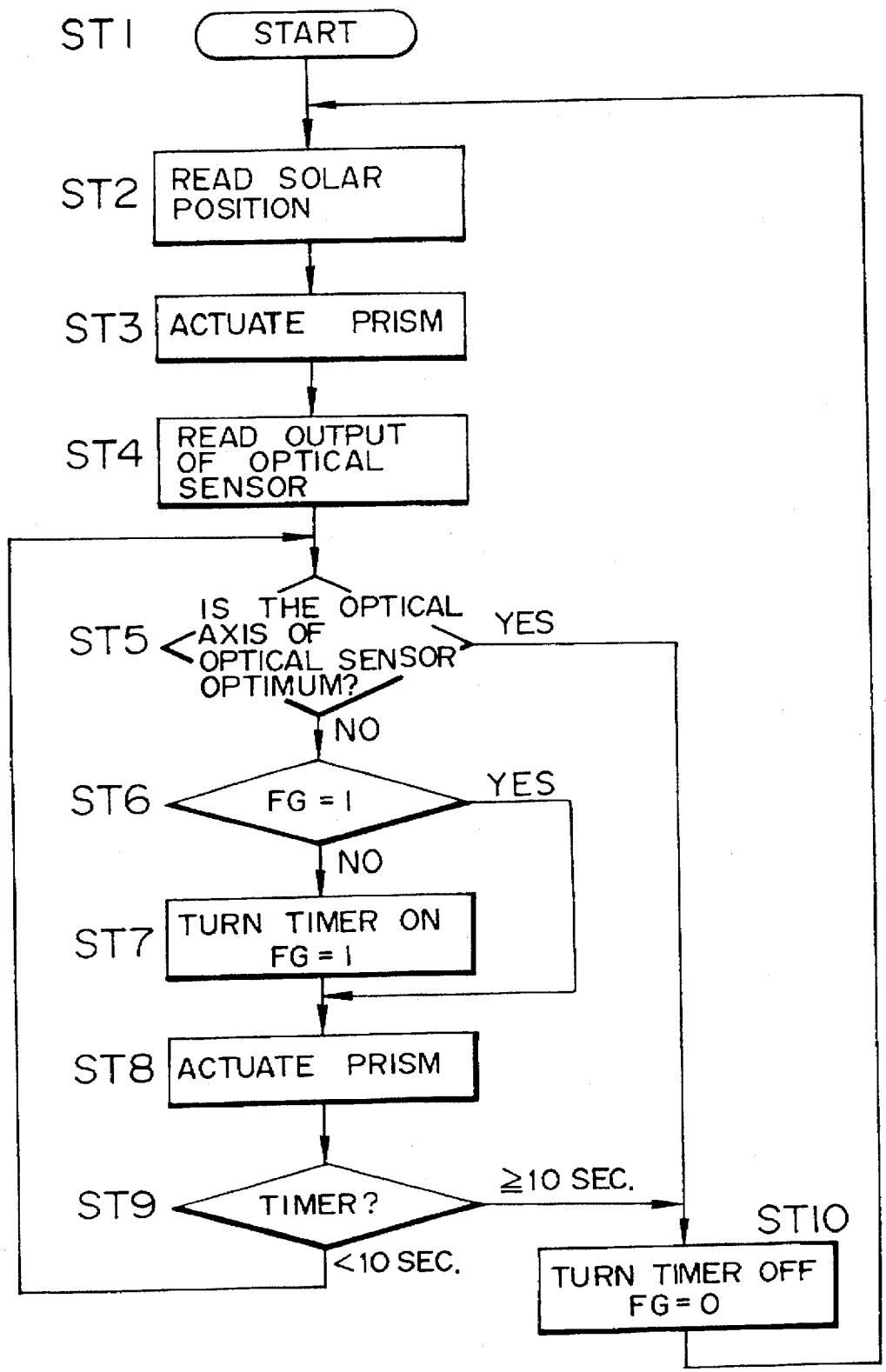
FIG. 53 is a flow chart showing the operation of Embodiment 10-2 of the present invention.

The operation of this embodiment is carried out as shown in steps ST1 to ST10 of FIG. 53 which is a flow chart.

In this manner, in this embodiment, the output signal of the optical axis sensor 201 at each point of time is given to the CPU 194 so that optical axis control of the lighting prism plate 191 as executed through the CPU 194 is corrected continuously on the basis of the output signal of the solar position detector 199. Accordingly, this embodiment is improved in the quantity of light taken indoor compared with Embodiment 10-1.

(Embodiment 10-3)

Figure 54:
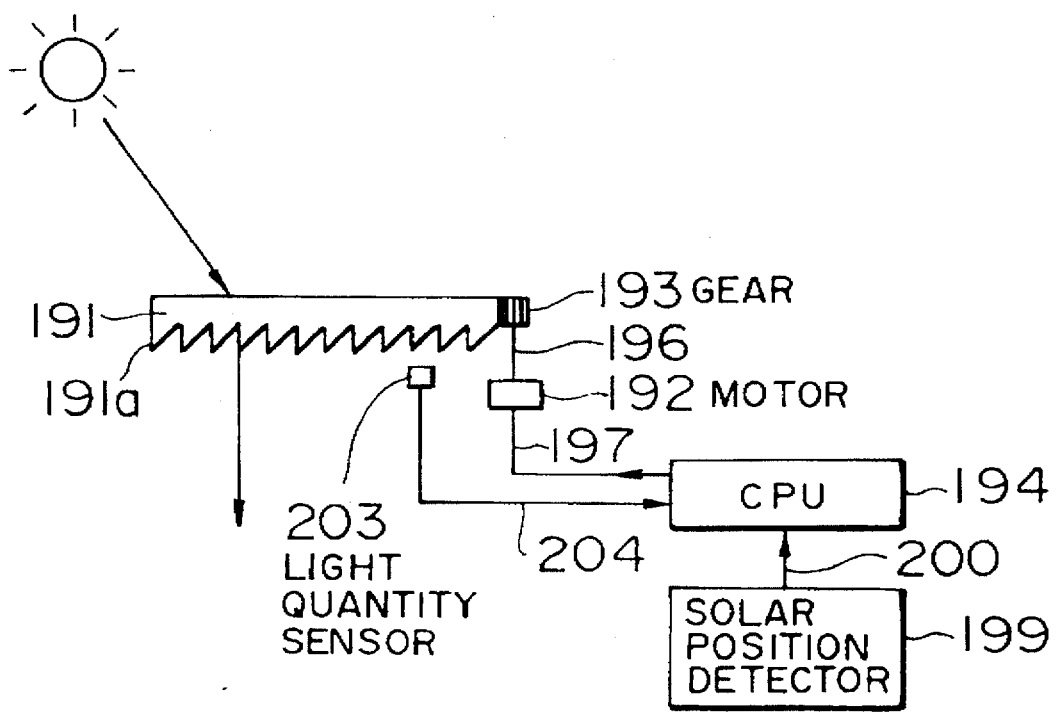
FIG. 54 is a schematic configuration view inclusive of a control circuit in Embodiment 10-3 of the present invention.
Figure 55:
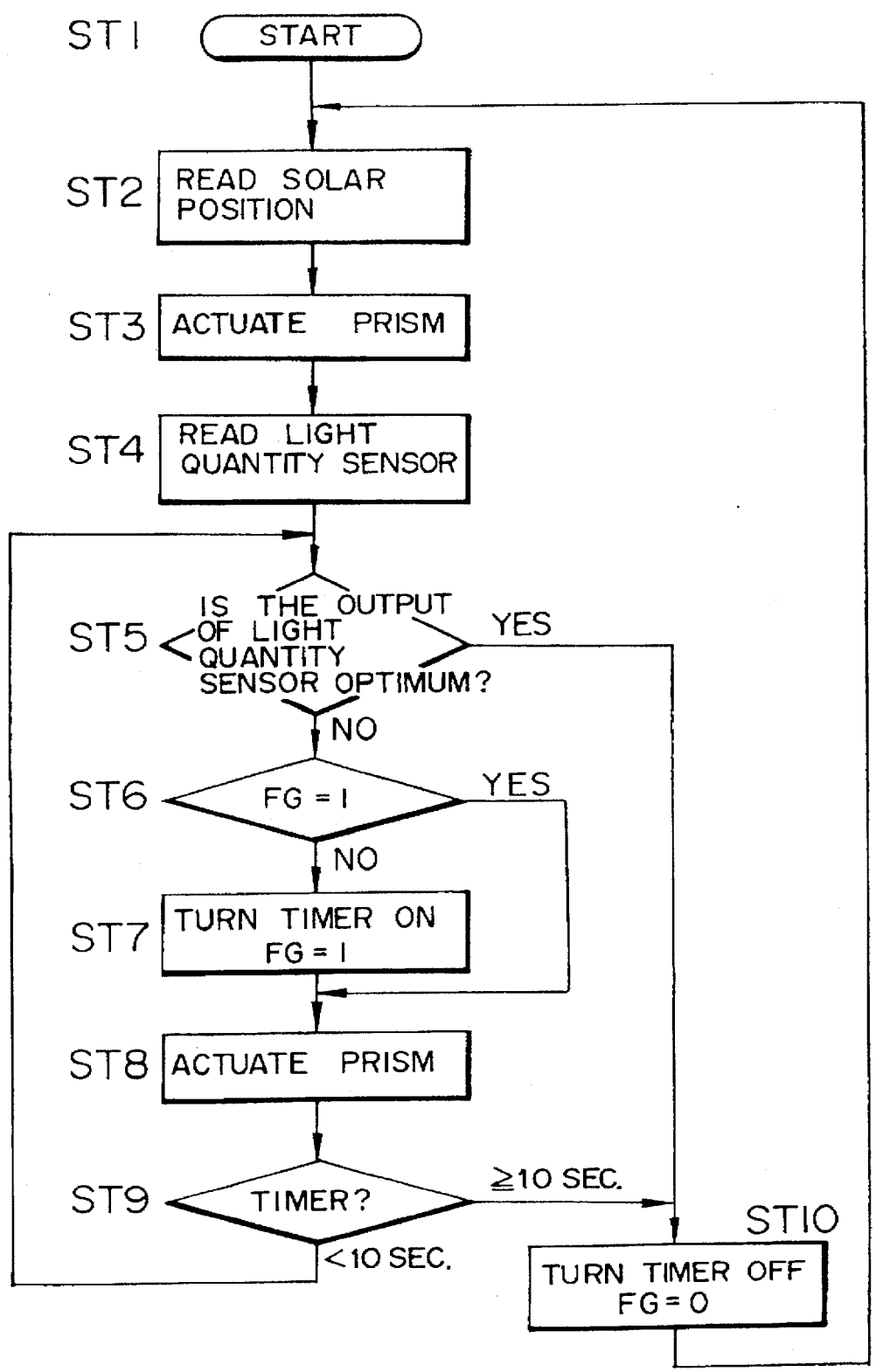
FIG. 55 is a flow chart showing the operation of Embodiment 10-3 of the present invention.

FIG. 54 shows Embodiment 10-3 of the present invention.

Like numerals in each of FIGS. 54 and 52 refer to like parts. The description of parts of the same structure as in Embodiment 10-2 will be omitted.

The configuration characteristic of the present invention is in that a light quantity sensor 203 instead of the optical axis sensor 201 in Embodiment 10-2 is arranged to face the lighting prism plate 191 and that conductive wire 204 is provided for transmitting the output signal of the light quantity sensor 203 to the CPU 194.

In this embodiment, lighting control in Embodiment 10-1 is modified so that a rotating instruction for the lighting prism plate 191 is intended to be corrected through the CPU 194 on the basis of the light quantity signal given to the CPU 194 from the light quantity sensor 203 at each point of time. That is, the operation of this embodiment is carried out as shown in steps ST1 to ST10 in the flow chart of FIG. 55. In the steps, the output signal of the light quantity sensor 203 is read by the CPU 194 in step ST4, and checking is made in step ST5 as to whether the quantity of light which has been taken in from the lighting prism plate 191 while controlled through the CPU 194 on the basis of the detection signal of the solar position detector 199 is an optimum quantity of light corresponding to the position of the sun or not, by which the quantity of light is controlled to be optimized (ST5 to ST10). The point of difference between this embodiment and Embodiment 10-2 is in that the quantity of light is used as a correcting control detection quantity in this embodiment.

Although each of the aforementioned embodiments has been described upon the case where one lighting prism plate is provided in the lighting portion for the sake of simplification, it is to be understood that the present invention can be applied to the case where a plurality of lighting prism plates, for example, two lighting prism plates, or the like, are arranged in the lighting portion and that the optical axis direction control is made better in the case of a plurality of lighting prism plates.

Although the configuration of FIG. 51 has been shown as an example of the configuration of the solar position detector 199 in each of the aforementioned embodiments, it is a matter of course that other configurations than the configuration of FIG. 51 may be used as long as the position of the sun at each point of time can be detected.

In the case where the configuration of FIG. 51 is used, the lighting prism plate 199P, the driving mechanism 199M, the CPU 199C and the lighting condition detector 199K in the configuration of FIG. 51 are common to Embodiments 10-1 to 10-3. Accordingly, these parts of common configuration can be partly or wholly omitted by applying an ingenious idea to the programming process in the CPU 94.

The solar lighting controller of Embodiment 10 configured as described above has excellent effects as follows.

(1) Because the solar position detector is provided in addition to the lighting apparatus and the CPU so that the position of the sun at each point of time can be detected by the solar position detector in the place where the solar lighting apparatus is set, optimum indoor lighting can be performed in pursuit of the sun correspondingly to each point of time in the set place by using the result of the arithmetic operation of the CPU on the basis of the detection signal.

(2) Further, in the configuration of the lighting apparatus in which one lighting prism plate or a plurality of lighting prism plates are arranged so as to be able to rotate horizontally, the quantity of light taken indoor in pursuit of the sun can be made optimum continuously because the solar position detector gives the central processing unit the signal of solar position such as height, azimuth, etc. of the sun at each point of time in the set place so that the central processing unit makes an arithmetic operation on the basis of the output signal of the solar position detector and issues a rotating instruction to control the prism angle of the lighting prism plate appropriately.

(3) Further, when the lighting condition detector such as an optical axis sensor, a light quantity sensor, etc. is arranged in addition to the solar position detector so that the rotating control for the lighting prism plate is corrected correspondingly to the optical axis or the quantity of light at each point of time, the indoor lighting condition is improved more greatly.

(4) Further, in the configuration in which the lighting condition detector is provided as shown in the paragraph (3), above the correction of the rotating control is performed appropriately even in the case where lowering of lighting accuracy is caused by the deterioration of the physical property of the lighting prism plate due to long-term use, because the quantity of light or the optical axis at each point of time is detected continuously.

Embodiment 11

Embodiment 11 of the present invention which concerns means for detecting the direction and angle of the optical axis and cloudy weather as adapted to the solar lighting controller will be described below specifically on the basis of Embodiments 11-1 and 11-2 shown in FIGS. 56 to 65.

(Embodiment 11-1)

First, Embodiment 11-1 of the present invention will be described with reference to FIGS. 56 through 61.

Figure 56:
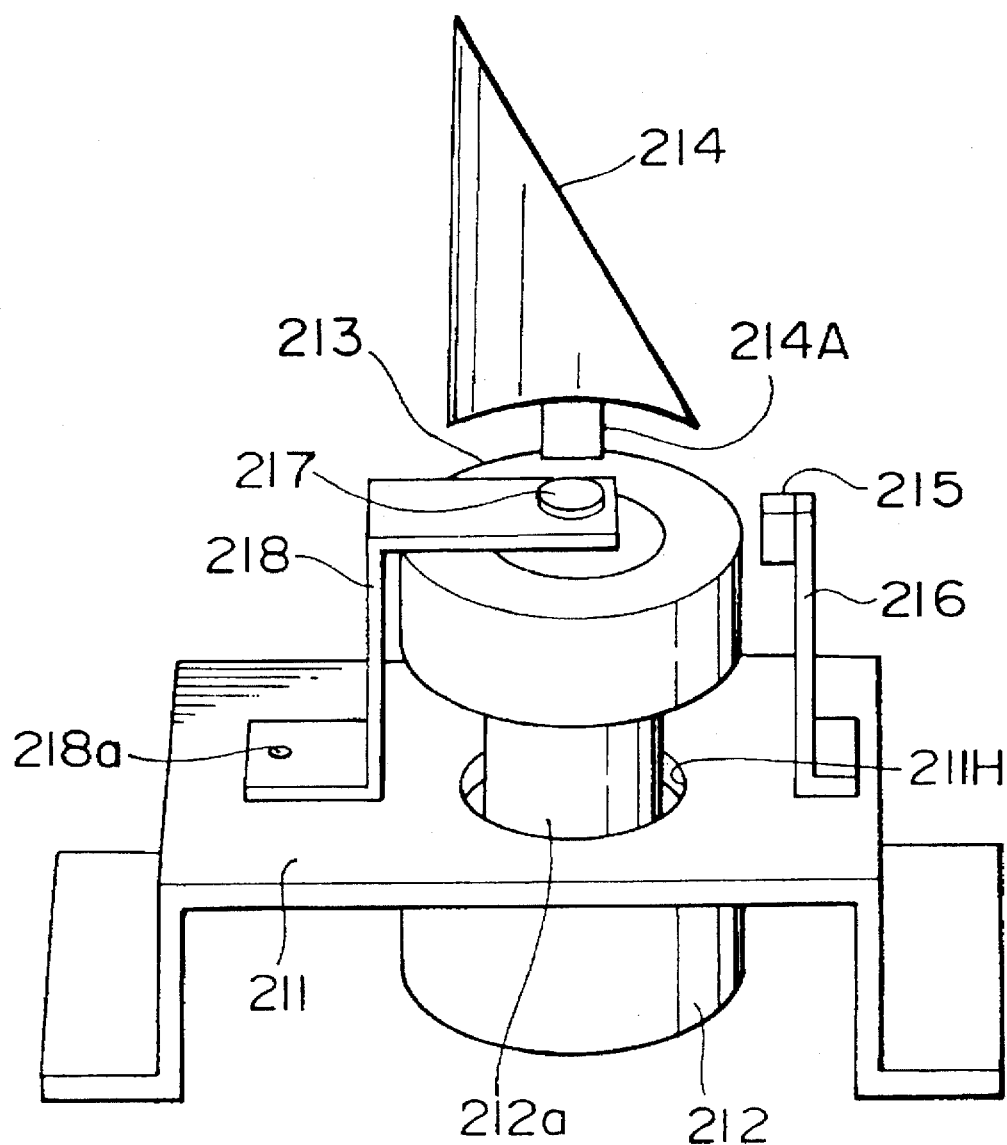
FIG. 56 is a perspective view showing the overall configuration of Embodiment 11-1 of the present invention.

FIG. 56 is a perspective view showing the overall configuration of the embodiment of the detector using the detecting method of the present invention. In FIG. 56, the reference numeral 211 designates a desk-like base; and 212, a stepping motor which serves as a driving source. The reference numeral 213 designates a cylindrical rotor which is driven by the stepping motor 212. The reference numeral 212a designates a rotary shaft for the stepping motor 212. As shown in FIG. 56, the rotary shaft 212a is idly put into a hole 211H provided in the nearly center portion of the base 211 so that the rotary shaft 212a is arranged at a predetermined distance from the base 211.

The reference numeral 214 designates a first screen which is integrally arranged along a predetermined range of the outer circumference of the rotor 213. The screen 214 is formed to a shape which is such that the height changes continuously in the direction of the rotation of the rotor 213 as shown in FIG. 56. For example, the screen 214 is shaped like a triangle. With respect to influence of shadows on a light sensor 217 which will be described later, a connection portion 214A is provided in the bottom side of the triangle so that the screen 214 is lifted up slightly as shown in FIG. 56.

Further, as the material for the screen 214, an opaque material is preferably used, if possible, to form the wall surface of the screen 214 to obtain sharp shadows.

Incidentally, the stepping motor 212 is made to be arranged on a board set on the ground, or the like, and is made to be supported by the base 211 to support the rotor 213 and the screen 214 if necessary.

The reference numeral 215 designates a limit switch for detecting the origin of the rotor 213. The limit switch 215 is mounted to the inner circumferential face of an L-shaped support 216 at the upper end of the support 216 and arranged so as to be opposite to the outer circumferential face of the rotor 213 at a predetermined distance therefrom. Incidentally, the lower end portion of the support 216 is fixed onto the base 211.

The reference numeral 217 designates a light sensor supported by a support arm 218. The light sensor 217 is arranged in a predetermined position which is decided on the influence of shadows projected from the screen 214 onto the rotation center axis line just above the upper face of the rotor 213. Incidentally, the lower end portion of the support arm 218 is fixed onto the base 211 by means of a screw 218a, or the like.

The output signal of the light sensor 217 is supplied to the CPU (not shown) through a substrate (not shown) having electronic elements belonging to the light sensor 217 and through lead wire (not shown), so that a necessary arithmetic operation (which will be described later) is carried out. The rotating control for the stepping motor 212 is also driven on the basis of an instruction given from the CPU.

In the configuration of the embodiment shown in FIG. 56, the light sensor 217 is supported/fixed in a position on the rotation center axis above the rotor 213 by the support arm 218. In the case of such a configuration, the accurate alignment of the light sensor 217 and the screen 214 is made difficult. Accordingly, it is substantially necessary that the center of the light sensor and the center of the screen are aligned by circuit adjustment in the light sensor substrate.

Figure 57:
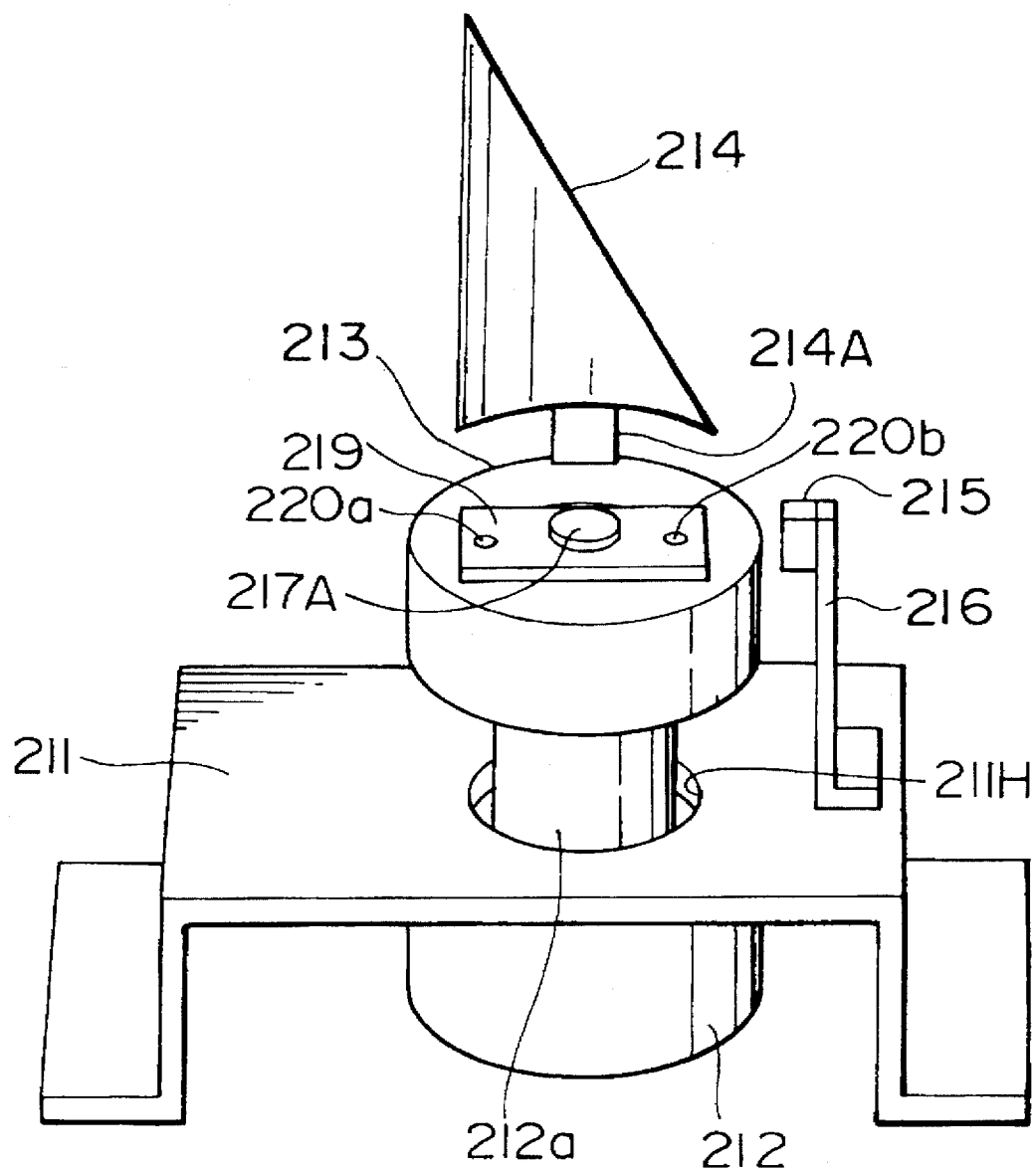
FIG. 57 is a perspective view showing the overall configuration of Embodiment 11-1 of the present invention, and the configuration of FIG. 57 is different from that of FIG. 56 in the mounting of the light sensor.

Therefore, as shown in FIG. 57, the light sensor 217A is preferably provided on the substrate 219 fixed onto the upper face of the rotor 213 by means of screws 220a and 220b, or the like, so that the light sensor 217A is integrally rotated with the rotor 213. In this case, the light sensor 217A is arranged and mounted onto the substrate 219 so that the center of the light sensor 217A is located in a position of the rotation center of the rotor 213 in advance. Though not shown, electronic elements belonging to the light sensor 217A and lead wire connected to the CPU via the electronic elements are included in the substrate 219.

Next, the method will be described below with reference to the flow chart of FIG. 61 other than FIGS. 58A to 60.

In the following description, the operation of the detecting method will be described by using step symbols ST1 to ST12 described in the flow chart shown in FIG. 61.

When the detector of FIG. 56 or 57 is set in a place where light rays of the sun strike and then the stepping motor is initially driven, for example, clockwise in accordance with a drive instructions from a CPU (not shown) for the purpose of detecting the origin, the origin of the rotor 213 is detected (ST1) by the origin detection limit switch 215 so that the stepping motor stops once.

Figure 58A:
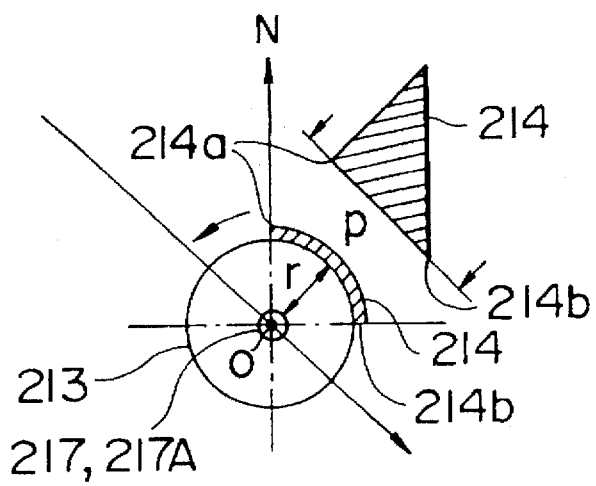
FIGS. 58A to 58C are plan views of an important part for explaining the operating theory of Embodiment 11-1 of the present invention.

In this case, as shown in FIG. 58A, the rotor 213 is made matched with the direction N of the origin (for example, north direction). In this occasion, for example, the front end 214a of the triangular screen 214 coincides with the origin O.

Figure 58B:
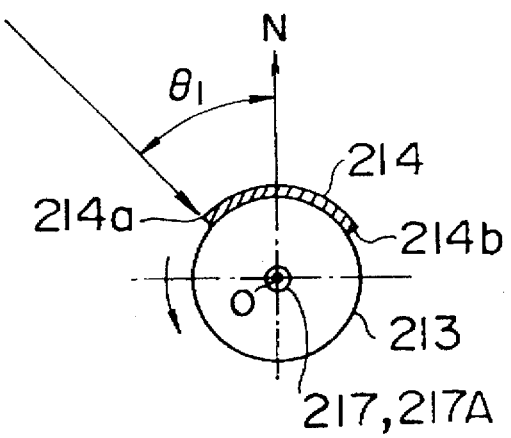

Then, the stepping motor 212 is driven in accordance with a normal driving instruction given from the CPU on the basis of an instruction (ST2) to start detection of the direction and angle (elevation angle) of the optical axis, so that the rotor 213 begins to be rotated in the direction of the arrow (counterclockwise) as shown in FIG. 58A (ST3). As a result, if the output of the light sensor 217 or 217A begins to be reduced at a point of time that the front end 214a of the screen 214 rotates by angle θ1 from the direction N of the origin as shown in FIG. 58B (ST4), a signal corresponding to the angle θ1 is supplied into the CPU so that the CPU calculates the angle θ1 on the basis of a step angle signal given from the stepping motor 212 and the reduced output signal from the light sensor 217 or 217A to thereby detect the direction (azimuth) of the optical axis as θ1 (ST5).

Figure 58C:
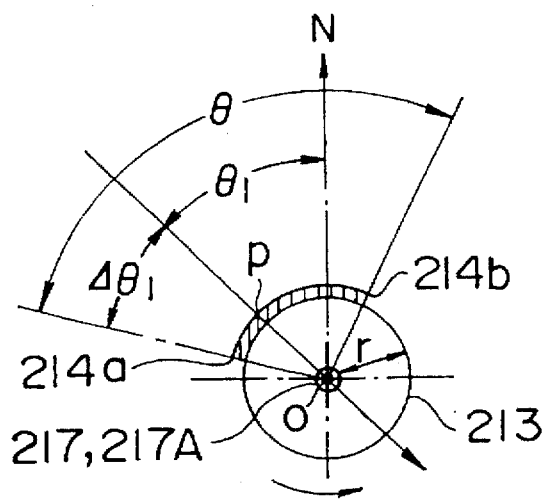

Then, if the output of the light sensor 217 or 217A increases again to return to a high output (ST7) when the rotation of the rotor 213 is continued, that is, when the rotation of the screen 214 is continued, that is, when the screen 214 is rotated further by angle Δθ1 from ST5 (ST6), that is, when the screen 214 is rotated by θ1+Δθ1 in total as shown in FIG. 58C, the control circuit calculates in ST8 the angle (elevation angle) α1 of the optical axis on the basis of Δθ1 as follows.

Figure 59:
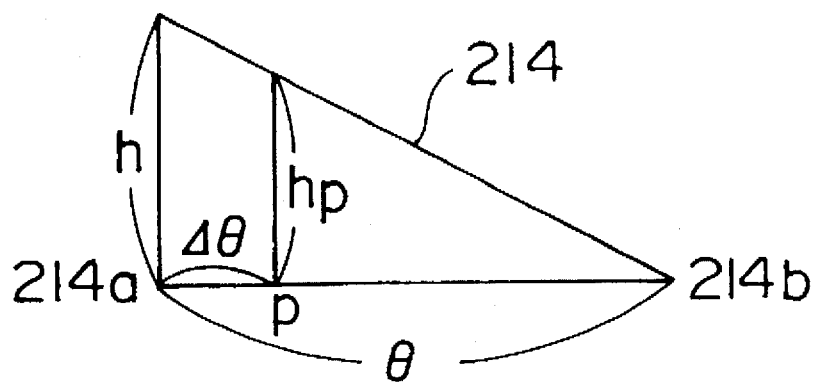
FIG. 59 is a view for explaining the theory of calculation of height hp in an intermediate position P of the screen in Embodiment 11-1 of the present invention.

That is, when heights at the front end 214a and intermediate position P of the screen 214 are represented by h and hp, respectively, as shown in FIG. 59, the height hp is calculated by the CPU on the basis of the following expression (9):

$$hp = h(\theta - \Delta\theta 1)/\theta \quad (9)$$

in which θ represents an angle (FIG. 58C) between opposite ends 214a and 214b of the triangular screen 214. From the point of view of proportion, the value of the angle is converted into the length of the bottom side of the screen 214. From the same reason, the value of Δθ1 is converted into the length between 214a and P in the bottom side of the screen 214 (FIGS. 58C and 59).

Figure 60:
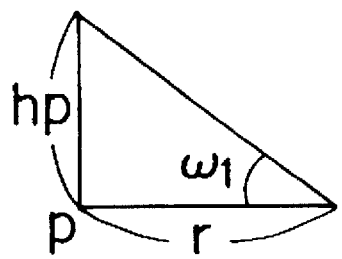
FIG. 60 is a view for explaining the theory of calculation of the angle ωl of the optical axis by using the screen in Embodiment 11-1 of the present invention.
Figure 61:
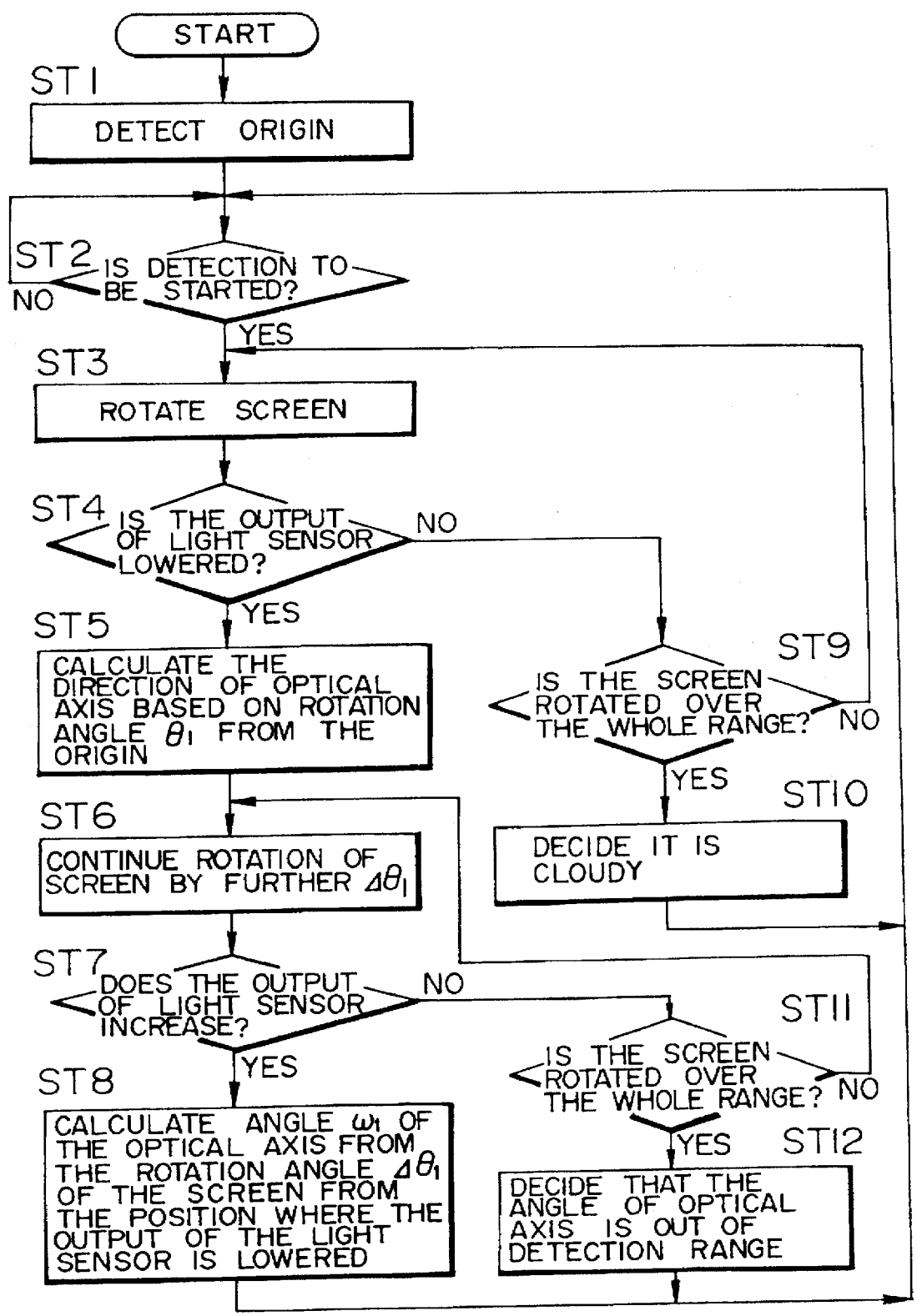
FIG. 61 is a flow chart showing the control operation in Embodiment 11-1 of the present invention.

Next, the angle (elevation angle) ω1 of the optical axis is given by the expression (10) from FIG. 60.

$$\omega 1 = \tan^{-1}(hp/r) \quad (10)$$

Accordingly, the angle (elevation angle) ω1 of the optical axis is obtained as shown in the expression (11) by substituting the expression (9) into the expression (10).

$$\omega 1 = \tan^{-1}\{(h/r)\cdot(\theta - \Delta\theta 1)/\theta\} \quad (11)$$

Accordingly, the angle ω1 of the optical axis is calculated on the basis of the expression (11) when signals corresponding to h, r, θ and Δθ1 are supplied to the CPU (ST8).

As long as the angle ω1 of the optical axis is obtained, the height of the sun can be obtained under the consideration of the mount position of the solar lighting apparatus.

When the output of the light sensor 217 or 217A contrariwise does not begin to be reduced, the rotor 213 is controlled so as to rotate in the whole range (ST9) and then cloudy weather is decided in ST10, so that a detection output "cloudy" is sent out.

When the rotor 213 rotates in the whole range (ST11) without increase of the output of the light sensor 217 or 217A (ST7) though the rotation of the screen 214 is continued (ST6) after the output of the light sensor 217 or 217A is reduced (ST4), the CPU makes a decision in ST12 that the angle of the optical axis is out of detection range. The time that the angle of the optical axis is out of detection range is about noon at which the height of the sun becomes high. Detection with respect to this range is excluded in ST12. Thereafter, the aforementioned detecting operation is repeated.

(Embodiment 11-2)

Next, Embodiment 11-2 of the present invention will be described with reference to FIGS. 62 through 65.

In the case of Embodiment 11-1, the judgment is made impossible at the height of the sun of 90° on the basis of the principle of measurement if the height of the first screen 214 is not infinite. Because the height of the screen is however limited to a predetermined value by the influence of relating elements, Embodiment 11-1 has a disadvantage in that the judgment becomes difficult at about noon at which the height of the sun becomes high. This embodiment is provided to compensate for the disadvantage of Embodiment 11-1.

Figure 62:
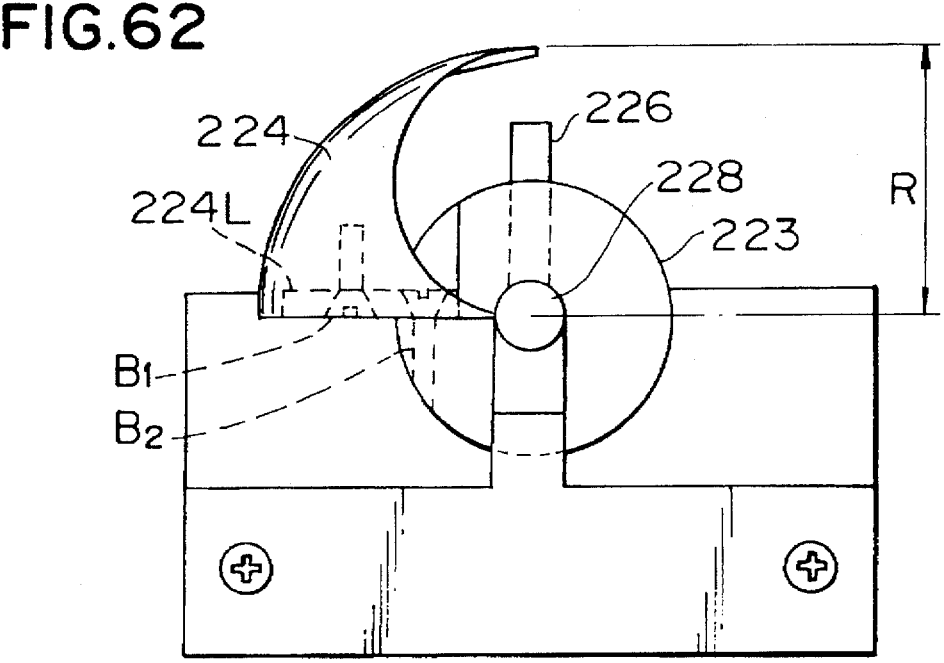
FIG. 62 is a plan view showing the overall configuration of Embodiment 11-2 of the present invention.
Figure 63:
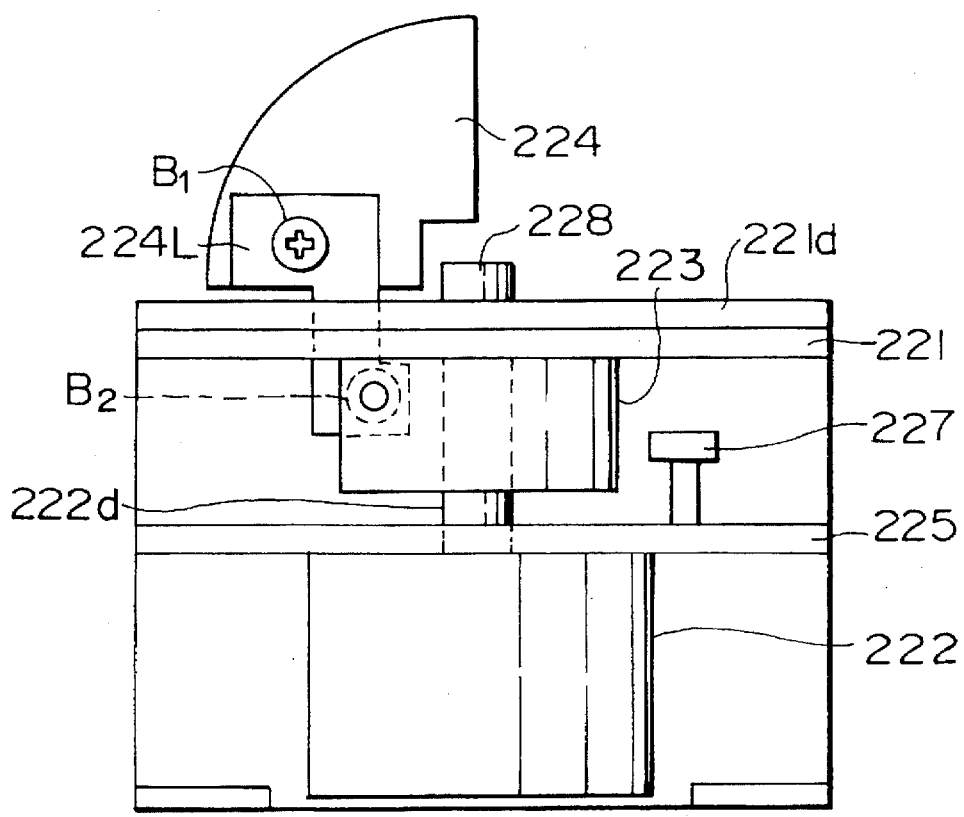
FIG. 63 is a front view showing the overall configuration of Embodiment 11-2 of the present invention.

Now, FIGS. 62 and 63 are a plan view and a front view showing the overall configuration of Embodiment 11-2 of the detector using the detecting method of the present invention. In FIGS. 62 and 63, the reference numeral 221 designates a first support; 222, a stepping motor which serves as a driving source; 223, a cylindrical rotor which is driven by the stepping motor 222; and 222a, a rotation shaft for the stepping motor 222.

The reference numeral 224 designates a second screen which is integrally set together with the rotor 223. As shown in FIGS. 62 and 63, the screen 224 has a front shape of a ⅛ sphere in which a circular arc having a diameter equal to the radius R of the ⅛ sphere is cut off from the ⅛ sphere in the inner side of the ⅛ sphere as shown in FIG. 62. The second screen 224 is designed so that the bottom side portion of the diameter R is fixed to the rotor 223 through a member 224L. In this case, in this embodiment, as shown in FIGS. 62 and 63, the screen 224 and the member 224L are connected to each other by means of a screw B1 whereas the member 224L and the rotor 223 are connected to each other by means of a screw B2.

Also as the material for the screen 224, an opaque material is preferably used, if possible, to form the wall surface of the screen 224 to obtain sharp shadows.

For example, the stepping motor 222 is made to be supported by a second support 225.

The reference numeral 226 designates a limit switch for detecting the origin; and 227, a stopper for stopping the rotation of the screen 224.

The reference numeral 228 designates a light sensor which is supported by a first support 221 through a substrate 221a having electronic elements belonging to the light sensor 228 and which is arranged in a predetermined position which is decided on the basis of the influence of shadows projected from the screen 224 onto the rotation center axis line of the rotor 223.

Though not shown, also in this embodiment, the light sensor 228 is arranged so that the center of the light sensor 228 is located in the rotation center of the rotor 223 in the same manner as in Embodiment 11-1 and can be fixed to the rotator 223 through the substrate. Such a configuration is preferred in the point of view of the alignment of the light sensor 228 and the screen 224.

Similarly to the case of Embodiment 11-1, the output of the light sensor 228 is supplied to the not-shown CPU through electronic elements (not shown) arranged on the substrate 221d of the light sensor 228 and lead wires (not shown) of the electronic elements so that necessary calculation, detection, etc. which will be described later are carried out.

Assume that the rotating control for the stepping motor 222 is also driven on the basis of an instruction given from the CPU.

Next, the method of the present invention will be described below with reference to not only FIG. 64 but also the flow chart of FIG. 65 and furthermore FIGS. 58A to 58C. The reason why FIGS. 58A to 58C are referred to is in that Embodiments 11-2 and 11-1 are different in the shape of the screen but quite equal in the operation of the screen so that the description of parts equivalent to those in FIGS. 58B and 58C can be omitted.

In the following description, the operation of the detecting method of the present invention will be described by using step symbols ST1 to ST12 described in the flow chart shown in FIG. 65.

When the detector shown in FIGS. 62 and 63 is set in a place where light rays of the sun strike and then the stepping motor 222 is initially driven, for example, clockwise on the basis of a driving instruction from the CPU (not shown) for the purpose of detecting the origin, the operation bar of the limit switch 226 strikes on the stopper 227 to thereby detect the origin of the rotor 223 (ST1) and the stepping motor 222 stops once.

In this case, the rotor 223 is made matched with the direction N of the origin (for example, north direction). In this occasion, for example, the front end 224a of the screen 224 coincides with the origin O (equivalent to FIG. 58A). Then, the stepping motor 222 is driven counterclockwise in accordance with a normal driving instruction given from the CPU on the basis of an instruction (ST2) to start detection of the direction and angle (elevation angle) of the optical axis, so that the rotor 223 begins to be rotated in the direction of the arrow (counterclockwise) as shown in FIG. 64 (ST3). As a result, if the output of the light sensor 228 begins to be reduced at a point of time that the front end 224a of the screen 224 rotates by angle θ1 from the direction N of the origin as shown in ST4 (equivalent to FIG. 58B), a signal corresponding to the angle θ1 is supplied into the CPU so that the CPU calculates the angle θ1 on the basis of a step angle signal given from the stepping motor 222 and the reduced output signal from the light sensor 228 to thereby detect the direction (azimuth) of the optical axis as θ1 (ST5).

Then, if the output of the light sensor 228 increases again to return to a high output (ST7) when the rotation of the rotor 223 is continued, that is, when the rotation of the screen 224 is continued, that is, when the screen 224 is rotated further by angle Δθ1 from ST5 (ST6), that is, when the screen 214 is rotated by θ2=θ1+Δθ1 in total from the origin as shown in FIG. 58C, the control circuit calculates in ST8 the angle (elevation angle) ω2 of the optical axis on the basis of the following theory taking into account this phenomenon.

Figure 64:
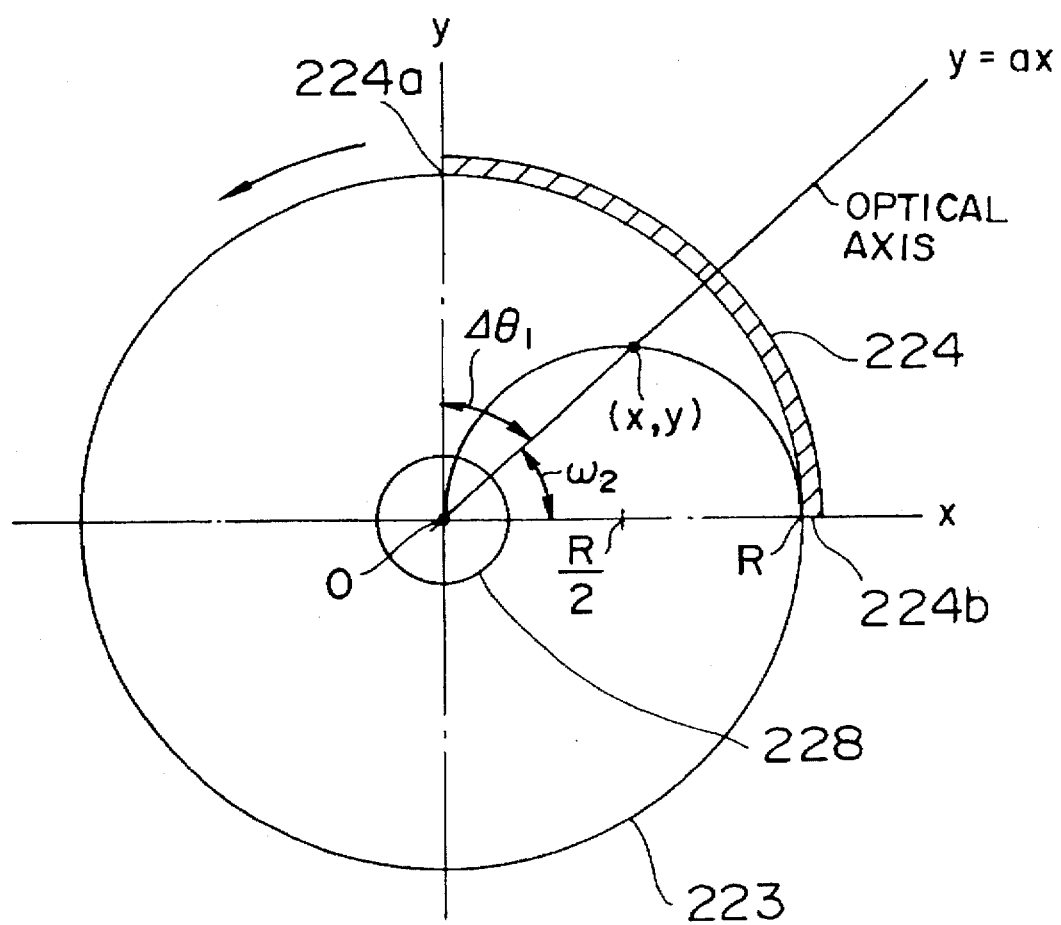
FIG. 64 is a plan view of an important part for explaining the operating theory of Embodiment 11-2 according to the present invention.
Figure 65:
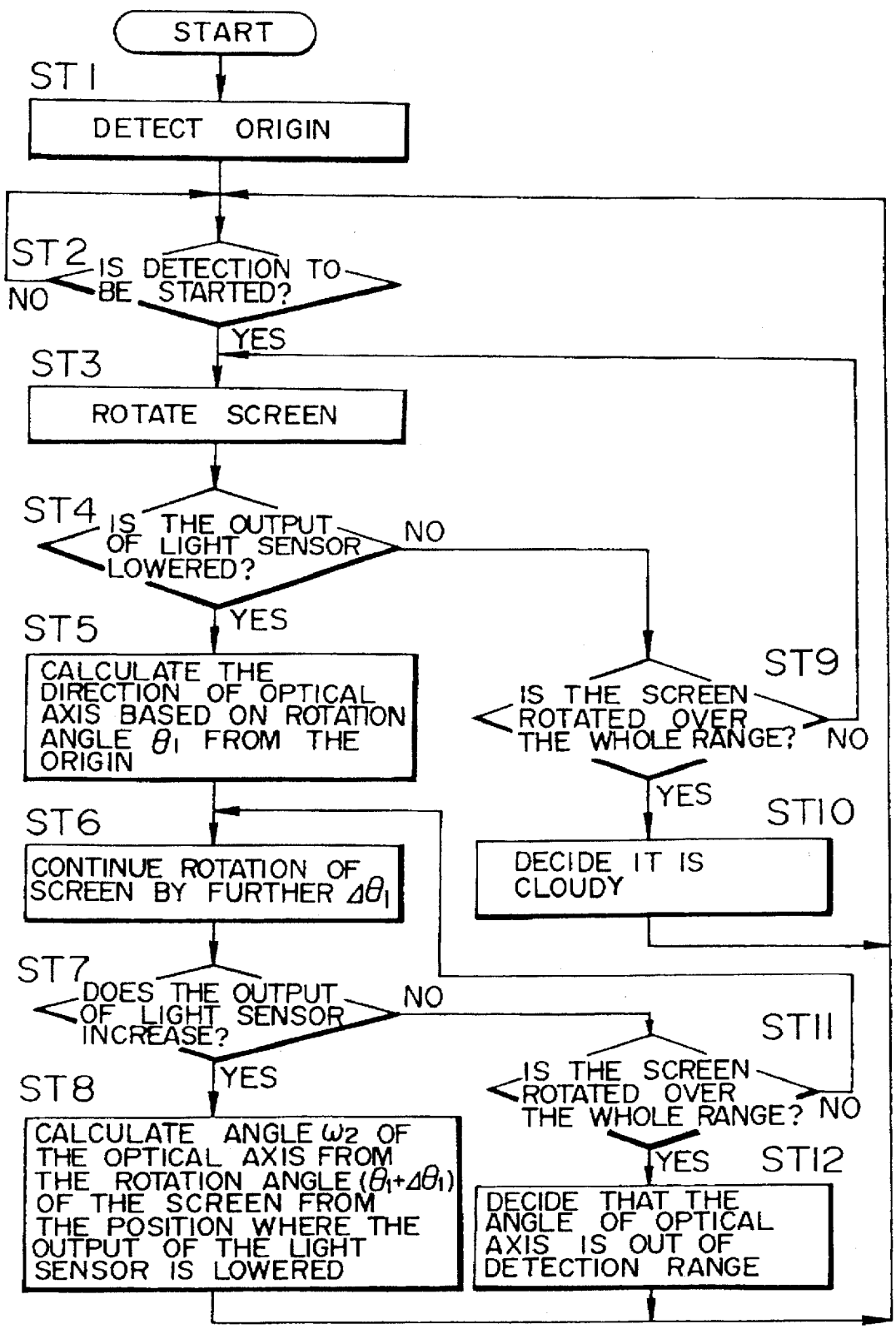
FIG. 65 is a flow chart showing the control operation according to Embodiment 11-2 of the present invention.

That is, when the coordinates of the point of intersection between the screen 224 and the optical axis of the sun, the length of the bottom side of the screen 224, and the gradient of the optical axis are represented by (x, y), R and a=tan (90°−Δθ1), respectively, as shown in FIG. 64, the following expressions (12) and (13) hold.

$$\{x-(R/2)\}^2+y^2=(R/2)^2 \tag{12}$$

$$y=ax=\{\tan(90°-\Delta\theta 1)\}x \tag{13}$$

The coordinates (x, y) of the point of intersection are given from the expressions (12) and (13).

$$x=R/(1+a^2) \tag{14}$$

$$y=Ra/(1+a^2) \tag{15}$$

On the other hand, z at the point (x, y) of intersection on the surface of the sphere satisfies the following expression (16).

$$x^2+y^2+z^2=R^2 \qquad (16)$$

From the expressions (14) to (16), z is given as follows.

$$z=\pm Ra(1+a^2)^{1/2}/(1+a^2) \qquad (17)$$

Accordingly, from the expressions (14), (15) and (17), the angle (elevation angle) $\omega 2$ of the optical axis is given as follows.

$$\tan \omega_2 = z/(x^2+y^2)^{1/2} \qquad (18)$$
$$= a$$

Accordingly, when the relation of the expression (13) is substituted into the expression (18), the angle $\omega 2$ of the optical axis is obtained in the same manner as the expression (11).

$$\omega 2 = (90° - \Delta\theta 1) \qquad (19)$$

Accordingly, the angle $\omega 2$ of the optical axis is calculated on the basis of the expression (19) as long as signals corresponding to $\theta 1$ and $\Delta\theta 1$ are given to the CPU (ST8).

As long as the angle $\omega 2$ of the optical axis is obtained, the height of the sun can be obtained under the consideration of the mount position of the solar lighting apparatus.

When the output of the light sensor 228 contrariwise does not begin to be reduced (ST4), the rotor 223 is controlled so as to rotate over the whole range unless the rotor 223 is stopped by the stopper 227 (ST9) and then cloudy weather is decided in ST10 in the case where the rotor rotates over the whole range, so that a detection output "cloudy" is sent out.

When the rotor 223 rotates over the whole range (ST11) without increase of the output of the light sensor 228 (ST7) though the rotation of the screen 224 is continued (ST6) after the output of the light sensor 228 is reduced (ST4), the CPU makes a decision in ST12 that the angle of the optical axis is out of detection range. In the case of this embodiment, the range not allowing the angle of the optical axis to be detected is very small, so that the unallowable range is excluded as a range which is not used practically. Thereafter, the aforementioned detecting operation is repeated.

In the aforementioned Embodiments 11-1 and 11-2, there has been described the case where the stepping motors 212 and 222 exclusively used for driving the rotors 213 and 223 are set and used, that is, the case where only the rotors 213 and 223 rotate respectively whereas the light sensors 217 and 228 are fixed respectively. The aforementioned configuration however may be replaced, for example, by a configuration in which a screen and a light sensor are set on a rotor in a solar lighting apparatus for taking the sunlight in while pursuing the sunlight every moment and in which both the rotor and the light sensor are designed to rotate so that the exclusive-use stepping motor can be omitted.

Being configured as above, the solar lighting controller of Embodiment 11 has excellent effects as follows.
(1) Because the direction and angle of the optical axis are detected by an arithmetic operation on the basis of the detection output of the light sensor arranged in a predetermined position on the rotation center axis of the rotor and on the basis of the prism angle of the rotor, the number of light sensors required to be set is one.
(2) Because the direction and angle of the optical axis in this occasion can be obtained easily by the CPU in accordance with predetermined arithmetic expressions on the basis of the detection output, the detection can be performed speedily and accurately. In the solar lighting apparatus, when the angle of the optical axis is found, the height of the sun can be obtained as long as an arithmetic operation is carried out by the CPU in relation between the angle of the optical axis and other data such as date of detection, etc.
(3) The screen configured as in Embodiment 11-1 (FIG. 56) has an advantage in that the screen can be produced easily.
In the case of the screen 214 in Embodiment 11-1, a region in which the direction and angle of the optical axis cannot be detected exists in the vicinity of the height of the sun of about 90° though the height of the screen is selected to be as considerably large as possible. In Embodiment 11-2, the region in which the direction and angle of the optical axis cannot be detected in the vicinity of the height of the sun of about 90° can be reduced greatly compared with Embodiment 11-1 even in the case where the height of the screen is selected to be not so large as Embodiment 11-1, because the surface of the screen 224 is shaped like a sphere. Accordingly, in Embodiment 11-2, there is substantially no hindrance to solar lighting control.
(4) If in Embodiments 11-1 and 11-2 the light sensor is mounted through a substrate so that the center of the light sensor is arranged in the rotation center of the rotor, troublesome work of adjusting the center of the screen and the center of the light sensor is not required at the time of assembling of the apparatus to thereby improve producing efficiency because the center of the light sensor and the center of the screen can be aligned accurately.
(5) If the rotor and the screen are driven by the stepping motor so that the required prism angle of the screen is detected on the basis of the step angle of the stepping motor, the prism angle of the screen can be detected speedily and accurately.
(6) Because the detection of cloudy weather is based on a clear criterion as to whether the light sensor is shaded or not, the detection of cloudy weather can be performed automatically by a simple apparatus. Accordingly, usefulness is large compared with the conventional detection due to eye measurement, or the like.

Embodiment 12

Embodiment 12 of the present invention which concerns a solar lighting controller using a distinctively characterized driving method in a solar lighting apparatus will be described below specifically on the basis of Embodiments 12-1 to 12-4 shown in FIGS. 66A to 71.

To make it easy to understand the respective driving methods of the present invention, first, second and third solar lighting apparatuses are described now as typical configuration examples.

Figure 66A:
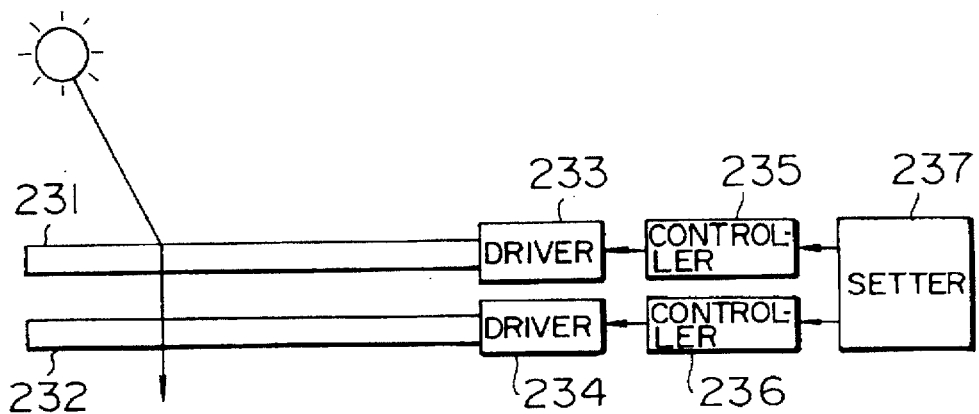
FIG. 66A is a schematic front view showing an example of configuration of a first solar lighting apparatus, inclusive of a driving circuit, to which light prism plate driving methods in Embodiments 12-1 to 12-4 of the present invention are applied.

First Solar Lighting Apparatus:

FIG. 66A shows the configuration of a first solar lighting apparatus. In FIG. 66A, the reference numerals 231 and 232 designate first and second flat lighting prism plates, respectively, which are held so as to be rotatable, for example, horizontally.

Figure 66B:
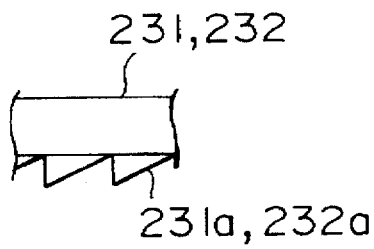
FIG. 66B is an enlarged front view of important part of the lighting prism plate.

These lighting prism plates (which may be hereinafter often simply referred to as "prisms" in the description of Embodiment 12) 231 and 232 are provided with triangular micro prism portions 231a and 232a formed under the lower faces thereof as shown in FIG. 66B. Though not shown, a gear is formed on the outer circumference of each of the prisms 231 and 232.

The reference numerals 233 and 234 designate drivers for driving the prisms 231 and 232, respectively. For example, each of the drivers 233 and 234 includes a motor such as a stepping motor, or the like, a worm gear, a driving gear, etc.

(not shown). The drivers 233 and 234 transmit torque of the motors through the worm gears and the driving gears to gears provided on the outer circumferences of the prisms 231 and 232 to thereby drive the lighting prism plates 231 and 232, respectively.

The reference numerals 235 and 236 designate controllers, respectively. In the case where the motors included in the drivers 233 and 234 are, for example, stepping motors, the controllers 235 and 236 generate in-phase control pulse signals to thereby perform control the rotation of the stepping motors.

The reference numeral 237 designates a setter which gives each of the controllers 235 and 236 a driving instruction to set the prism angles of the lighting prism plates 231 and 232 every hour.

Therefore, the setter 237 is constituted by a CPU, or the like. A program for calculating the current position of the sun determined on the basis of the height and azimuth of the sun every hour on every date and calculating the optimum prism angles of the prisms 231 and 232 correspondingly to the current position of the sun and a program of instructions for driving the prisms 231 and 232 which will be described later are stored in the setter 237 in advance.

The first solar lighting apparatus using the prism driving method of the present invention is constituted by the aforementioned parts 231 to 237.

Also in the case of FIG. 66A, detailed structure and parts such as a power supply, and so on, in the solar lighting apparatus are omitted.

Figure 67:
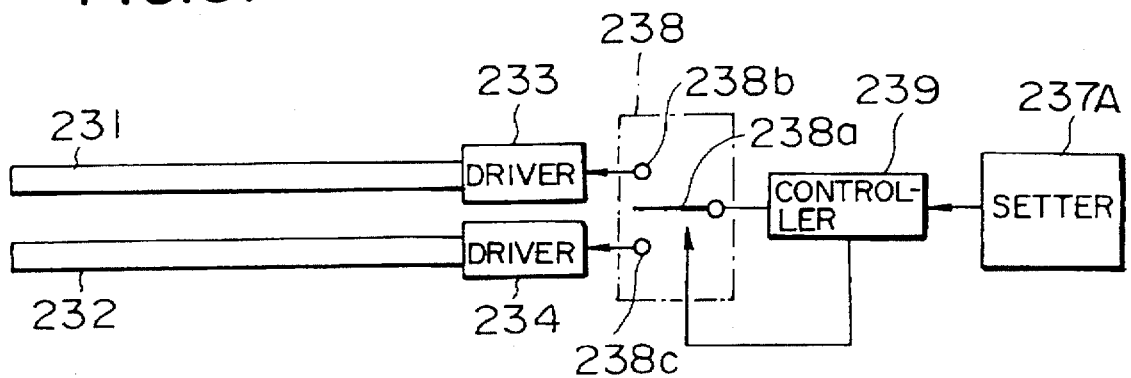
FIG. 67 is a schematic front view showing an example of configuration of a second solar lighting apparatus, inclusive of a driving circuit, to which light prism plate driving methods in Embodiments 12-1 to 12-4 of the present invention are applied.

Second Solar Lighting Apparatus:

A second solar lighting apparatus is configured as shown in FIG. 67.

In FIG. 67, the same structure as that of the first solar lighting apparatus is identified by the same reference characters as in FIGS. 66A and 66B and the description thereof will be omitted.

The reference numeral 237A designates a setter which is similar to the setter 237 in that it is constituted by a CPU, or the like.

A program for calculating the current position of the sun determined on the basis of the height and azimuth of the sun every hour on every date and calculating the optimum prism angles of the prisms 231 and 232 correspondingly to the current position of the sun, a program (including a program for issuing an instruction to turn over a changeover switch 238 which will be described later) of instructions for driving the prisms 231 and 232 which will be also described later, or the like, are stored in the setter 237A in advance.

The reference numeral 238 designates a changeover switch including a switch terminal 238a, and changeover terminals 238b and 238c. When the setter 237A issues an instruction to drive the first or second prism 231 or 232, an instruction to turn the switch terminal 238a to the changeover terminal 238b or 238c is given to the changeover switch 238 so that the changeover switch 238 is turned over.

The reference numeral 239 designates a controller which is common to the drivers 233 and 234. The controller 239 has the same function as the controllers 235 and 236 in FIG. 66A and serves to transmit the driving instruction from the setter 237A to either of the drivers 233 and 234 through the changeover switch 238.

Third Solar Lighting Apparatus:

In the second solar lighting apparatus, there is shown the case where drivers 233 and 234 are provided as exclusive-use means for driving a plurality of lighting prism plates 231 and 232 and where a controller 239 is provided as a common control means.

The third solar lighting apparatus is configured, in addition to the configuration of FIG. 67, so that exclusive-use driving gears for driving the lighting prism plates 231 and 232 are provided in the drivers 233 and 234 and that a common driving element such as a motor, or the like, is provided for giving driving force to the respective driving gears, in which the driving element and the respective driving gears are changed over through mechanical or electrical changeover mechanisms to transmit a driving instruction from the setter 237A to either of the lighting prism plates 231 and 232 to thereby drive either of the lighting prism plates 231 and 232 through the controller 239, the changeover switch 238 and the driving element. As for the controller in this case, the provision of the common controller 239 and the changeover switch 238 shown in FIG. 67 may be replaced by the provision of such exclusive-use controllers 235 and 236 as shown in FIG. 66A.

Embodiments 12-1 to 12-4 of first, second, third and fourth driving methods for a solar lighting apparatus which is a solar lighting controller of the present invention will be described below with reference to FIGS. 66A and 67 and the flow charts shown in FIGS. 68 to 71.

(Embodiment 12-1)

Figure 68:
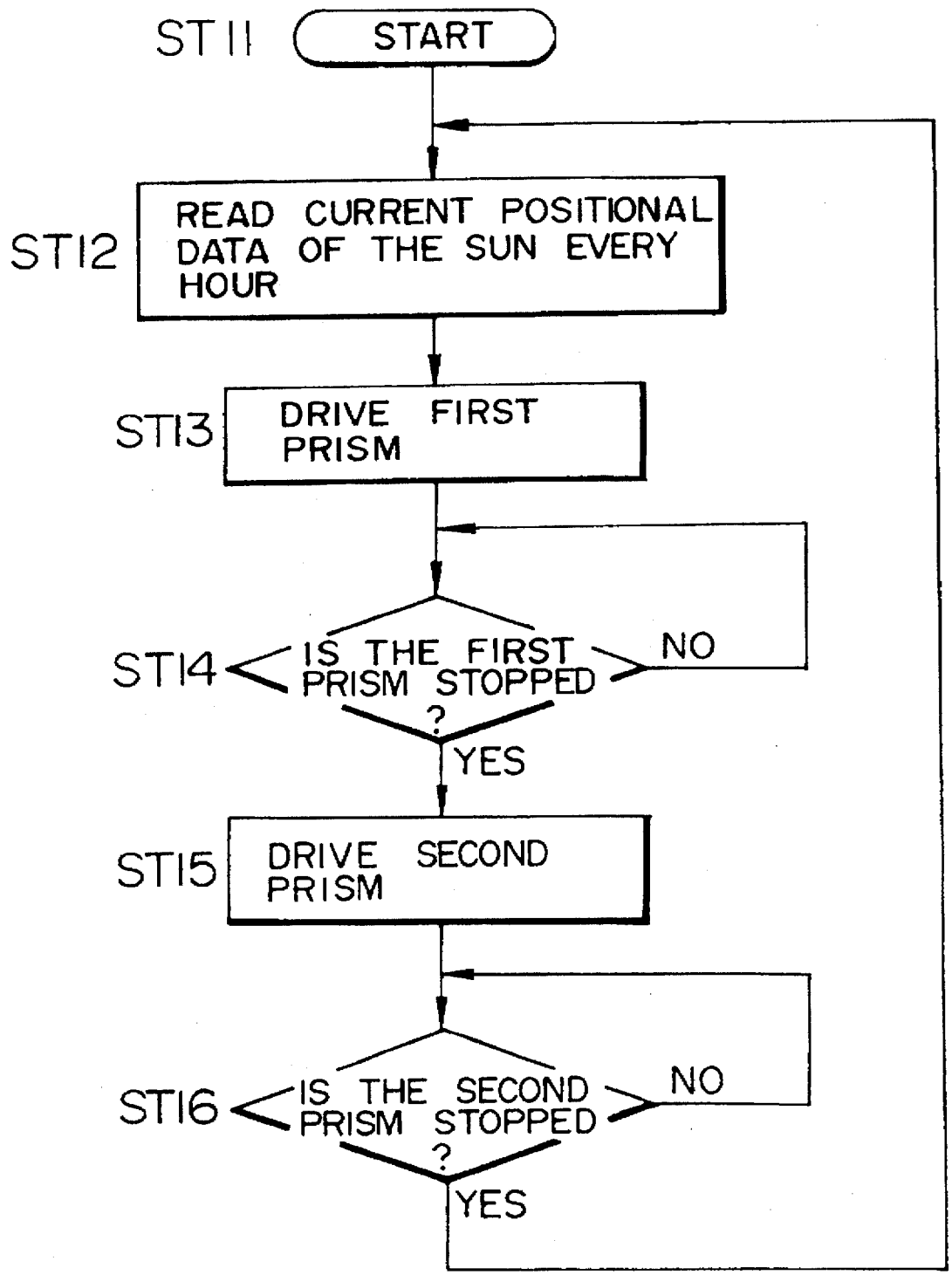
FIG. 68 is a flow chart showing the first driving method in the solar lighting apparatus of Embodiment 12-1 of the present invention.

A first driving method for a solar lighting apparatus as a Embodiment 12-1 is now described with reference to FIGS. 66A and 66B or FIG. 67 and the flow chart of FIG. 68. This driving method can be applied both to the solar lighting apparatus shown in FIGS. 66A and 66B and to the solar lighting apparatus shown in FIG. 67 (the same shall apply hereinafter).

First, when the apparatus is powered on so that the operation thereof starts (ST11), data of the current position of the sun every hour on the date are read in synchronism with a clock included in the setter 237 or 237A so as to be selected from all data which have been stored in the setter 237 or 237A (ST12).

Accordingly, the setter 237 or 237A first calculates a driving instruction for determining the prism angle of the first prism 231 on the basis of the solar position data read as described above and gives the driving instruction to the controller 235 or 239. In the case of the apparatus shown in FIGS. 66A and 66B, the signal of the driving instruction is directly transmitted to the driver 233. In the case of the apparatus shown in FIG. 67, the signal is transmitted to the driver 233 through the changeover switch 238. Accordingly, the first prism 231 is driven by the driver 233 (ST13).

After the setter 237 or 237A then confirms that the first prism 231 driving instruction is canceled, that is, the first prism 231 stops (ST14), a second prism 232 driving instruction determined on the basis of the data of the current position of the sun at that point of time is given to the controller 236 or 239. In the apparatus shown in FIGS. 66A and 66B, the instruction is directly transmitted to the driver 234. In the apparatus shown in FIG. 67, the instruction is transmitted to the driver 234 through the changeover switch 238. As a result, the second prism 232 is driven by the driver 234 (ST15).

After the setter 237 or 237A then confirms that the second prism 232 driving instruction is canceled, that is, the second prism 232 stops (ST16), the driving operation of steps ST12 to ST16 is repeated again.

Accordingly, the first and second prisms 231 and 232 are driven intermittently and alternately so that the prism angles of the prisms 231 and 232 are optimized on the basis of the solar position data at each point of time.

(Embodiment 12-2)

A second driving method for a solar lighting apparatus as Embodiment 12-2 will be described below with reference to FIGS. 66A and 66B or FIG. 67 and the flow chart of FIG. 69.

First, when the apparatus is powered on so that the operation thereof starts (ST21), data of the current position of the sun every hour on the date are read in synchronism with a clock included in the setter 237 or 237A so as to be selected from all data which have been stored in the setter 237 or 237A (ST22).

Here, in this driving method, in the setter 237 or 237A, the displacement A of the optical axis center from the reference center when the first prism 231 is driven first is calculated on the basis of the current solar position data read as described above (ST23), and then the displacement B of the optical axis center from the reference center when the second prism 232 is driven first is calculated (ST24). Then, the value of the displacement A and the value of the displacement B are compared with each other (ST25).

In the case of $A \leq B$ as a result, a driving instruction is issued to drive the first prism 231 and then drive the second prism 232 (ST26). Though not shown in the flow chart of FIG. 69, the driving instruction in ST26 is executed in accordance with steps ST13 to ST16 shown in FIG. 68 (in this case, the lighting prism plates 231 and 232 are driven alternately in the same manner as in Embodiment 12-1 and the driving condition thereof is not described again).

On the contrary, in the case of A>B, a driving instruction is issued to drive the second prism 232 and then drive the first prism 231 (ST27). The driving instruction in ST27 is executed in a reverse sequence of steps ST15, ST16, ST13 and ST14 in FIG. 68.

When, for example, a wait time of 10 sec is then elapsed (ST28), the previous operation is repeated in a normal sequence of steps ST22 to ST28 again (ST28).

Accordingly, also in the case of the driving method of Embodiment 12-2, the first and second lighting prism plates 231 and 232 are driven intermittently and alternately so that the prism angles of the prisms 231 and 232 are optimized on the basis of the solar position data at each point of time.

The driving method of Embodiment 12-2 has a feature in that the driving sequence of the first and second prisms is controlled to be decided by comparison of respective driving sequences from the point of view of the displacement of the optical axis center from the reference center at each point of time in order to compensate for lowering of accuracy in lighting characteristic as a result of the alternate driving.

(Embodiment 12-3)

A third driving method for a solar lighting apparatus as Embodiment 12-3 will be described below with reference to FIGS. 66A and 66B or FIG. 67 and the flow charts of FIGS. 70 and 68.

First, when the apparatus is powered on so that the operation thereof starts (ST31), data of the current position of the sun every hour on the date are read in synchronism with a clock included in the setter 237 or 237A so as to be selected from all data which have been stored in the setter 237 or 237A (ST32).

In this driving method, in the setter 237 or 237A, the moved distance C of the optical axis when the first prism 231 is driven first and then the second prism 232 is driven is calculated on the basis of the current solar position data stored as described above (ST33), and, subsequently, the moved distance D of the optical axis when the second prism 232 is driven first and then the first prism 231 is driven is calculated (ST34). Then, the value of the moved distance C and the value of the moved distance D are compared with each other (ST35).

In the case of $C \leq D$ as a result, a driving instruction is issued to drive the first prism 231 and then drive the second prism 232 (ST36). Though not shown also in the flow chart of FIG. 70, the driving instruction in ST36 is executed in accordance with steps ST13 to ST16 shown in FIG. 68.

On the contrary, in the case of C>D, a driving instruction is issued to drive the second prism 232 and then drive the first prism 231 (ST37). The driving instruction in ST37 is executed in a reverse sequence of steps ST15, ST16, ST13 and ST14 in FIG. 68.

Also in this case, when, for example, a wait time of 10 sec is then elapsed (ST38), the previous operation is repeated in a normal sequence of steps ST32 to ST38 again (ST38).

Accordingly, also in the case of the driving method of Embodiment 12-3, the first and second prisms 231 and 232 are driven intermittently and alternately so that the prism angles of the prisms 231 and 232 are optimized on the basis of the solar position data at each point of time.

In addition, the driving method of Embodiment 12-3 has an advantage in that the driving sequence of the first and second prisms is controlled to be decided by comparison of respective driving sequences from the point of view of the moved distance of the optical axis at each point of time in order to compensate for lowering of accuracy in lighting characteristic as a result of the alternate driving.

(Embodiment 12-4)

A fourth driving method for a solar lighting apparatus as Embodiment 12-4 will be described below with reference to FIGS. 66A and 66B or FIG. 67 and the flow charts of FIGS. 71 and 68.

First, when the apparatus is powered on so that the operation thereof starts (ST41), data of the current position of the sun every hour on the date are read in synchronism with a clock included in the setter 237 or 237A so as to be selected from all data which have been stored in the setter 237 or 237A (ST42).

In this driving method, the area E defined by loci caused as a result of movement of the center of the optical axis between before and after the drive of the prisms 231 and 232 when the first prism 231 is driven and then the second prism 232 is driven is calculated on the basis of the current solar position data stored in the setter 237 or 237A (ST43).

Then, the area F defined by loci caused as a result of movement of the center of the optical axis between before and after the drive of the prisms 231 and 232 when the second prism 232 is driven and then the first prism 231 is driven is calculated (ST44).

The values of the areas E and F thus calculated are compared with each other (ST45).

In the case of E≦F as a result, a driving instruction is issued to drive the first prism 231 and then drive the second prism 232 (ST46). Though not shown also in the flow chart of FIG. 71, the driving instruction in ST46 is executed in accordance with steps ST13 to ST16 shown in FIG. 68.

On the contrary, in the case of E>F, a driving instruction is issued to drive the second prism 232 and then drive the first prism 231 (ST47). The driving instruction in ST47 is executed in a reverse sequence of steps ST15, ST16, ST13 and ST14 in FIG. 68.

Also in this case, when, for example, a wait time of 10 sec is then elapsed (ST48), the previous operation is repeated in a normal sequence of steps ST42 to ST48 again (ST48).

Accordingly, also in the case of the driving method of Embodiment 12-4, the first and second prisms 231 and 232 are driven intermittently and alternately so that the prism angles of the prisms 231 and 232 are optimized on the basis of the solar position data at each point of time.

In addition, the driving method of Embodiment 12-4 has an advantage in that the driving sequence of the first and second prisms is controlled to be decided by comparison of respective driving sequences from the point of view of the area defined by loci caused as a result of movement of the center of the optical axis at each point of time in order to compensate for lowering of accuracy in lighting characteristic as a result of the alternate driving.

The driving method in the solar lighting apparatus according to the present invention is not limited to the aforementioned embodiments.

For example, although the embodiments of the present invention have shown the case where the current position of the sun is detected in synchronism between a clock and solar position data every hour on every date stored in advance in the setter 237 or 237A, the invention can be applied to the case where a sunlight condition judgment means such as an optical axis sensor, a light quantity sensor, or the like, is provided in the solar lighting apparatus so that the current position of the sun every hour is calculated by an arithmetic operation control and storage means such as a CPU, or the like, included in the setter 237 or 237A on the basis of the detection output of the optical axis or light quantity of the sunlight every hour in the place where this apparatus is set.

Although in the solar lighting apparatus shown in FIGS. 66A, 66B and 67, there is shown the configuration in which the lighting portion is arranged so that the respective lighting prism plates are rotated while held horizontally, the arrangement of the lighting prism plates constituting the solar lighting apparatus may be changed correspondingly to the setting condition, etc. of the building to which the solar lighting apparatus is applied.

That is, there may be thought of a solar lighting apparatus having lighting prism plates arranged, for example, obliquely with respect to the roof of the building instead of the aforementioned lighting prism plates arranged horizontally or a solar lighting apparatus having lighting prism plates arranged vertically on the wall portion of the building instead of the aforementioned lighting prism plates arranged horizontally. The lighting prism plate driving method of the present invention is also applied to the solar lighting apparatus having the lighting portion provided with the lighting prism plates arranged as described above.

Although Embodiment 12-1 has been described upon the case where the first and second prisms are driven in order of descending, that is, the first prism is driven and then the second prism is driven, the present invention can be applied to the case where the prisms are driven in order of ascending, that is, the second prism is driven and then the first prism is driven.

Further, in the case where three or more prisms are arranged, there may be thought of a driving method in which the prisms are driven in another sequence than the descending or ascending order, that is, an intermediate prism is first driven and then upper or lower prisms are driven.

Figure 69:
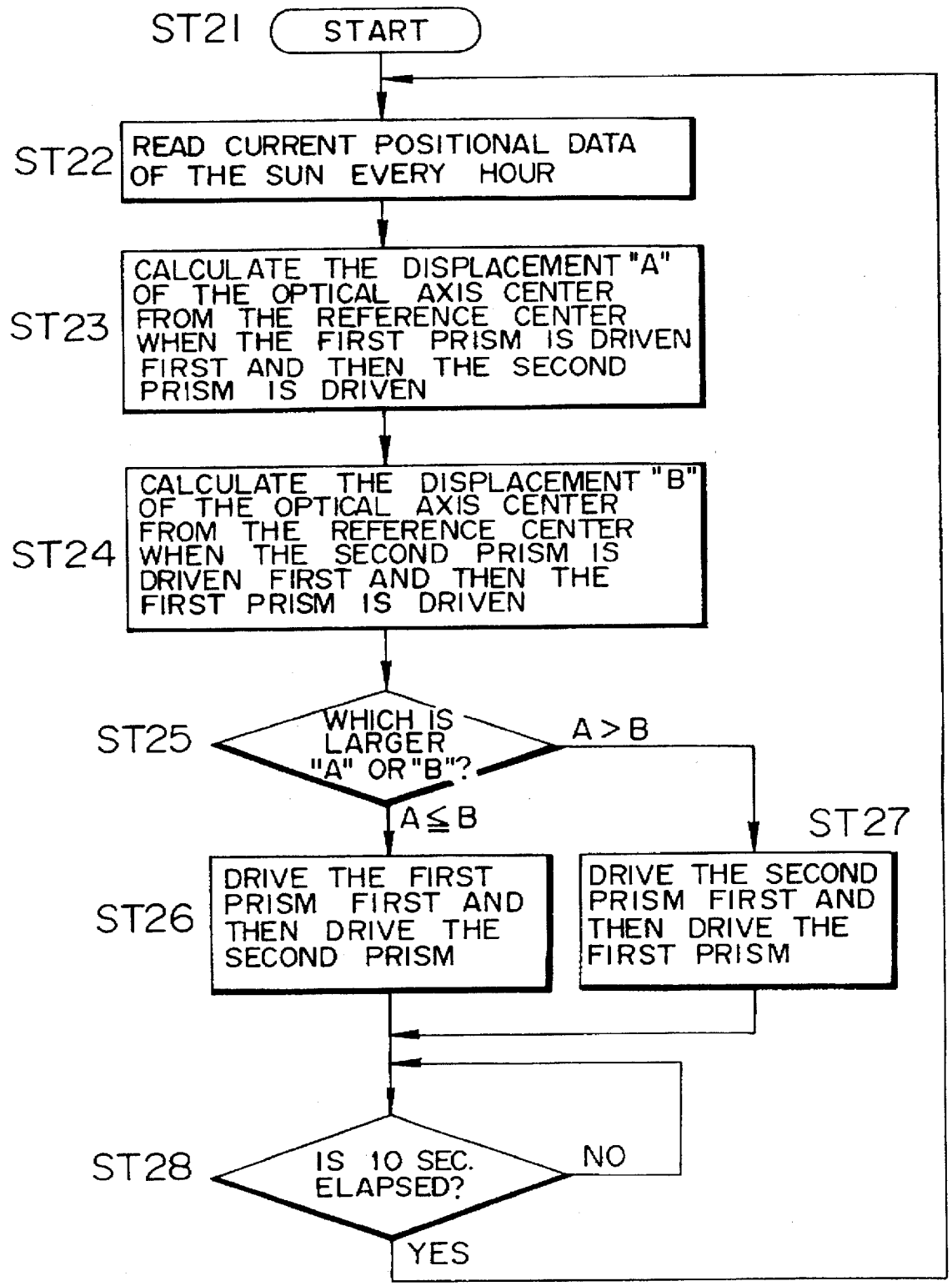
FIG. 69 is a flow chart showing main part of the second driving method in the solar lighting apparatus of Embodiment 12-2 of the present invention.
Figure 70:
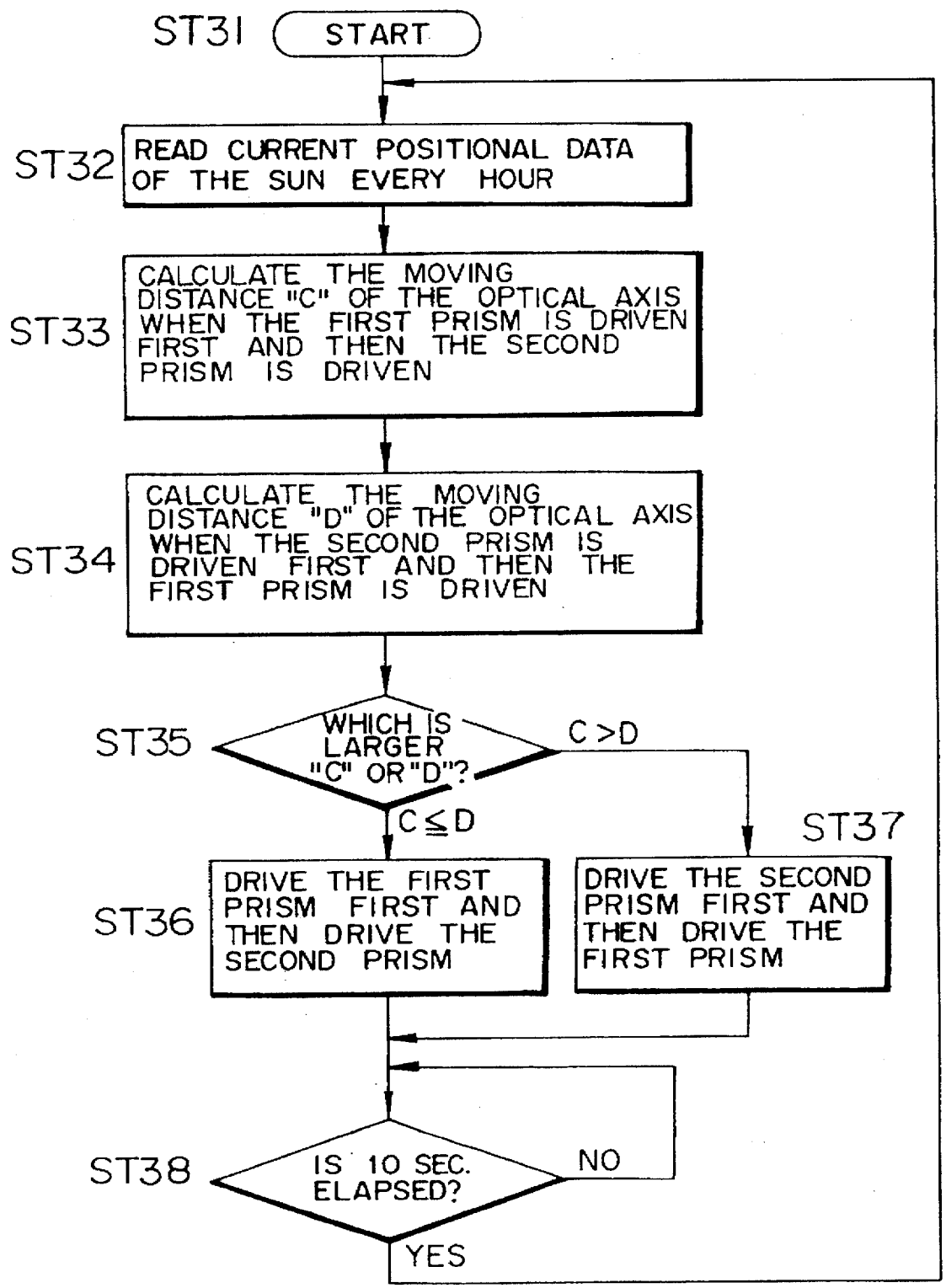
FIG. 70 is a flow chart showing main part of the third driving method in the solar lighting apparatus of Embodiment 12-3 of the present invention.
Figure 71:
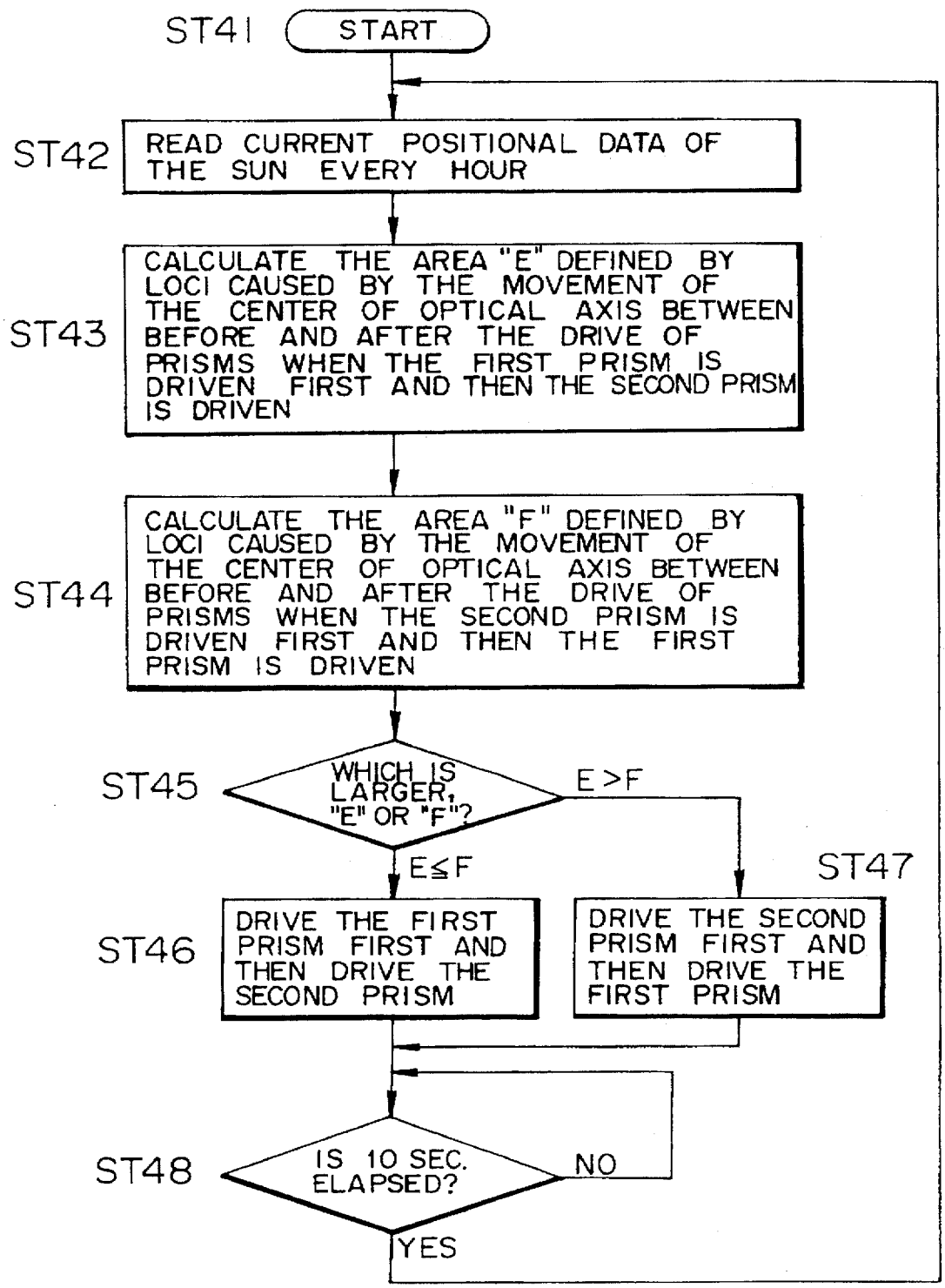
FIG. 71 is a flow chart showing main part of the fourth driving method in the solar lighting apparatus of Embodiment 12-4 of the present invention.

Further, the calculation of initial data for comparison between driving sequences from the predetermined point of view as shown in Embodiments 12-2 to 12-4 need not be performed in the sequence in the flow chart shown in FIGS. 69 to 71. For example, the flow chart of FIG. 69 may be modified so that the procedure of the sequence ST23→ST24 is replaced by the procedure of the sequence ST24→ST23 and then comparison between A and B is made in ST25.

Although Embodiments 12-2 to 12-4 have been described upon the case where a wait time of 10 sec is provided in each of the steps ST28, ST38 and ST48 before the cycle is shifted to the next one, the wait time can be set variously in accordance with needs in the setting place. For example, the wait time may be set to be 1 minute.

Ideally, it is preferable from the point of view of improvement of lighting characteristic that the step ST48 is omitted, that is, the wait time is set to zero.

Although the embodiments have been described upon the case where two lighting prism plates are used as the plurality of lighting prism plates arranged in the lighting portion, the present invention can be also applied to the case where three or more lighting prism plates are provided as described above.

In the case where three or more lighting prism plates are arranged, the lighting prism plates may be designed so that the first and second lighting prism plates in the aforementioned embodiments are simply replaced by the first, second and third lighting prism plates or that lighting prism pates are driven by a method in which a plurality of lighting prism plates are driven as one set.

For example, the driving method in the case of three lighting prism plates will be described upon Embodiment 12-1. That is, it is possible to use a driving method which is applied to a combination of a plurality of lighting prism plates such that the first and second prisms are driven first in ST13, the stopping of the first and second prisms is then confirmed in ST14, the third prism is then driven in ST15 and the stopping of the third prism is confirmed in ST16.

Because lighting prism plates are driven as described above, the solar lighting controller of Embodiment 12 has excellent effects as follows.

(1) Even in the case where exclusive-use drivers and controllers thereof are provided for a plurality of lighting prism plates as shown in FIG. 66A, the lighting prism plates are not driven simultaneously but driven intermittently and alternately in a predetermined sequence as described above in Embodiments 12-1 to 12-4 so that both the capacity of the power supply and the maximum consumed electric power can be reduced by the intermittent driving.

(2) In this case, by the provision of common driver elements such as motors, or the like, of a smaller number (inclusive of 1) than the number of the lighting prism plates and the provision of changeover means of a smaller number (inclusive of 1) than the number of the lighting prism plates as shown in FIG. 67, there arises, in addition to the effect of reduction in the capacity of the power supply and power saving, an effect that the cost of the apparatus is reduced by the reduction of the number of driver elements or controller elements correspondingly, if the common driver elements or controller elements are used so as to be selected by the changeover means when the lighting prism plates are driven.

(3) Further, if the aforementioned driving methods (1) and (2) are carried out after the driving sequence of the lighting prism plates to be driven intermittently as shown in Embodiments 12-2 to 12-4 is discussed in the predetermined point of view, lowering of accuracy (in lighting characteristic) caused by intermittent driving is made little so that the lowering of accuracy can compensated for without hindrance to practical use.

(4) If a wait time is provided in a practically reasonable time range as shown in the steps ST28, ST38 and ST48 in FIGS. 69, 70 and 71 before the driving operation carried out in the preceding steps is repeated when one cycle of driving operation in the steps of intermittently driving the lighting prism plates is completed, the maximum consumed electric power can be reduced more greatly while the accuracy in lighting characteristic is more or less lowered correspondingly to the wait time.

Embodiment 13

Embodiment 13 of the present invention which concerns an origin detector in a Solar lighting apparatus used in a solar lighting controller will be described below specifically on the basis of Embodiments 13-1 to 13-4 shown in FIGS. 72 through 77C.

(Embodiment 13-1)

Figure 72:
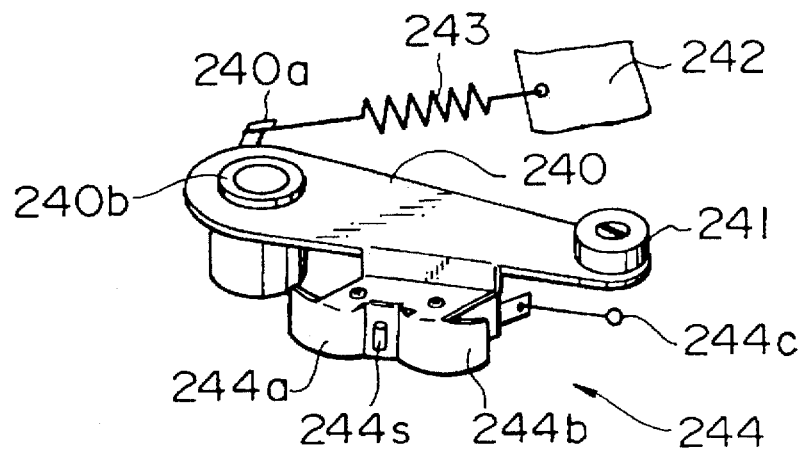
FIG. 72 is a perspective view showing the arrangement of a ring position driven lever, a micro switch and parts relevant thereto which constitutes the origin detector in Embodiment 13-1 of the present invention.

Embodiment 13-1 of the present invention will be described with reference to FIGS. 72 through 75. FIG. 72 is a perspective view showing the mount condition of a micro switch. In FIG. 72, the reference numeral 240 designates a ring position driven lever. A ring position detection roller 241 is rotatably provided at an end of the lever 240. A spring seat 240a for a spring 243 by which the lever 240 is attached to a fixed portion 242 and a rotary shaft 240b which serves as a fulcrum for turning the lever 240 are provided on the base side of the lever 240. The ring position detection roller 241 is arranged so as to be in contact with a rotary ring 257 which will be described later.

The reference numeral 244 designates a mechanical type micro switch; 244s, a contact of micro switch 244; and 244a and 244b, guide plates arranged on both sides of the contact 244s, respectively. In order to guide the operation of the contact 244s by an origin roller 245 which will be described later, for example, the guide plates 244a and 244b have curved surfaces. The reference numeral 244c designates an output terminal of the micro switch 244.

Figure 75:
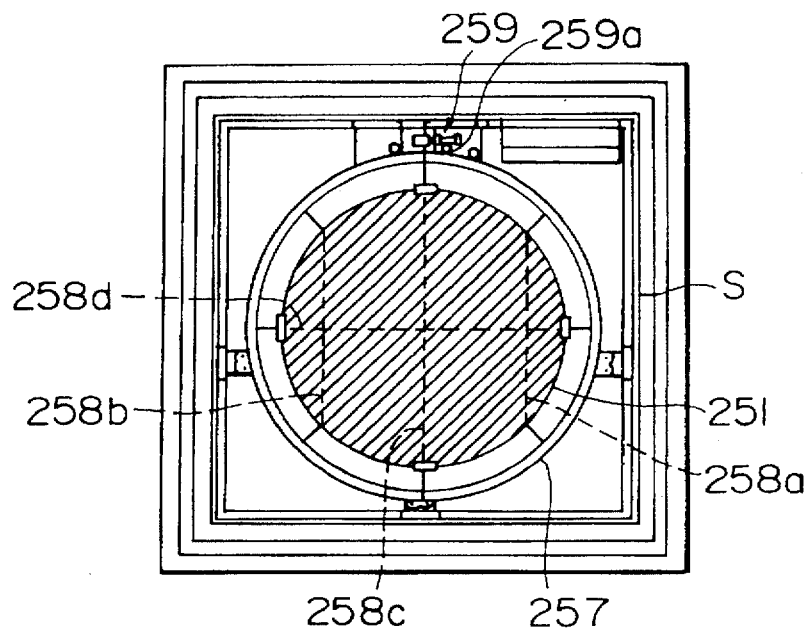
FIG. 75 is a plan view showing the overall configuration of the solar lighting apparatus to which the origin position detector in Embodiment 13-1 of the present invention is applied.

As shown in FIG. 75, a lighting prism plate 251 in this embodiment is configured so that, for example, four holding plates 258a to 258d formed of the same material (polycarbonate, or the like) as the lighting prism plate 251 are arranged so as to cross each other as shown in FIG. 75 to thereby integrally rotate the lighting prism plate 251 and a rotary ring 257 arranged outside the lighting prism plate 251 and provided so as to be concentric with the lighting prism plate 251.

A gear (not shown) in FIG. 75 (designated by the reference numeral 257G in FIG. 73A) is provided on the outer circumference of the rotary ring 257 so that the rotary ring 257 supplied with torque from a driving gear 259a of a rotation driver 259 rotates. In FIG. 75, the reference character S designates a support frame for the rotary ring 257.

Returning to FIGS. 73A and 73B, these drawings are perspective views showing the state of arrangement of an origin roller.

Figure 73A:
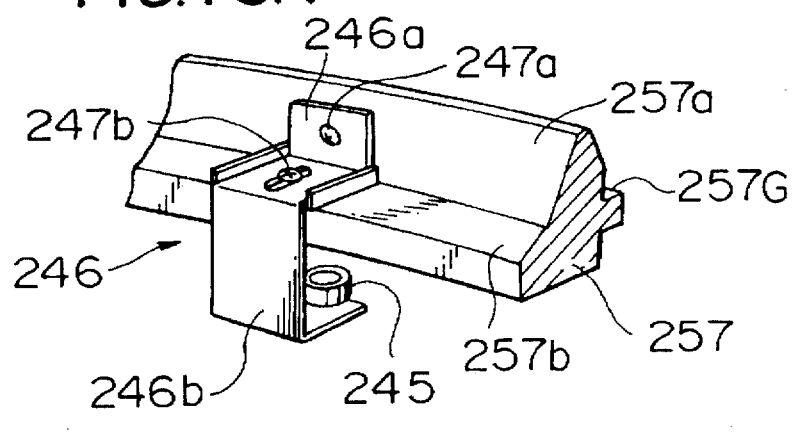
FIG. 73A is a perspective view showing the condition of arrangement of the origin roller in Embodiment 13-1 of the present invention.
Figure 73B:
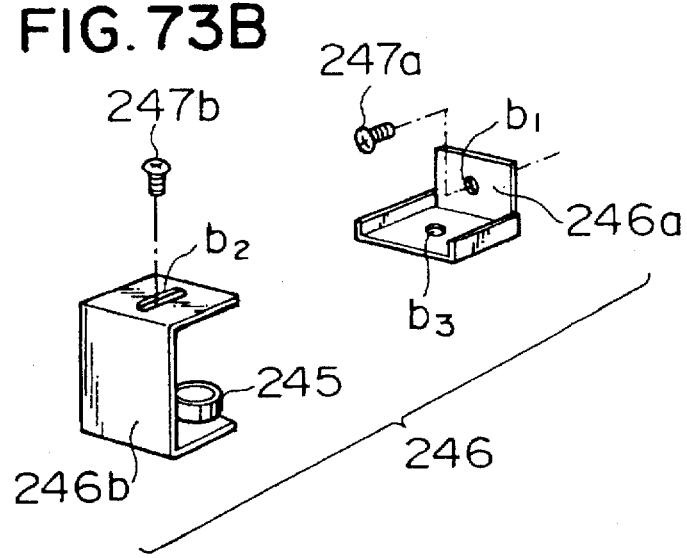
FIG. 73B is an exploded perspective view showing the configuration of mount fittings.

In FIGS. 73A and 73B, the reference numeral 245 designates an origin roller which is rotatably provided in the lower end portion of a support plate 246a of a mount fitting 246 which is described as follows.

The mount fitting 246 is composed of a legless chair-shaped pressure plate 246a, and a sectionally C-shaped support plate 246b. A vertical portion of the pressure plate 246a is fixed to an inner circumferential wall 257a of the rotary ring 257 by driving a screw 247a into a screwhole b1. A horizontal portion of the pressure plate 246a is put on the upper end of the support plate 246b and fixed to an edge portion 257b of the rotary ring 257 by driving a screw 247b into screwholes b2 and b3 so that the pressure plate 246a and the support plate 246b are united into one body. The origin roller 245 is provided at the lower end of the support plate 246b so as to face the contact 244c of the micro switch 244. In this case, the mount position of the origin roller 245 is set so that the origin roller 245 makes the contact 244s operate when the rotary ring 257 is rotated to a position opposite to the contact 244s of the micro switch 244.

The origin position detector of Embodiment 13-1 of the present invention is configured as described above.

Figure 74A:
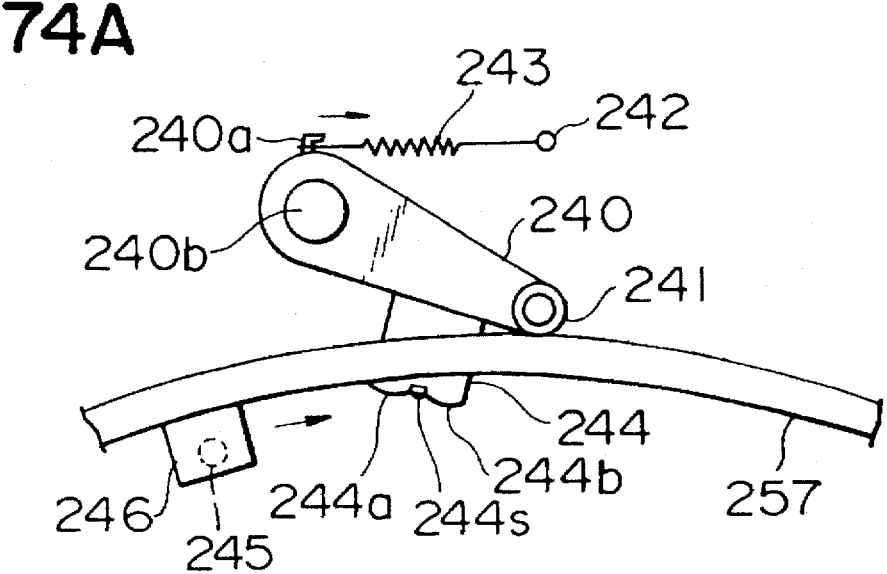
FIGS. 74A to 74C show an example of configuration of the origin detector in Embodiment 13-1 of the present invention.

The operation of the origin position detector of Embodiment 13-1 will be described below with reference to FIG. 75 as well as with reference to FIGS. 74A through 74C.

First, the rotary ring 257 is rotated together with the lighting prism plate 251 by the rotation driver 259 shown in FIG. 75. Because in this occasion the base portion of the lever 240 is pulled by the spring 243 as shown in FIG. 74A, the lever 240 is raised up with use of the rotary shaft 240b as a fulcrum. Accordingly, pressing force due to the spring 243 is given to the ring position detection roller (hereinafter referred to as "roller" simply) 241 provided in the end portion of the lever 240, so that the roller 241 is driven to rotate by the rotation of the rotary ring 257.

Figure 74B:
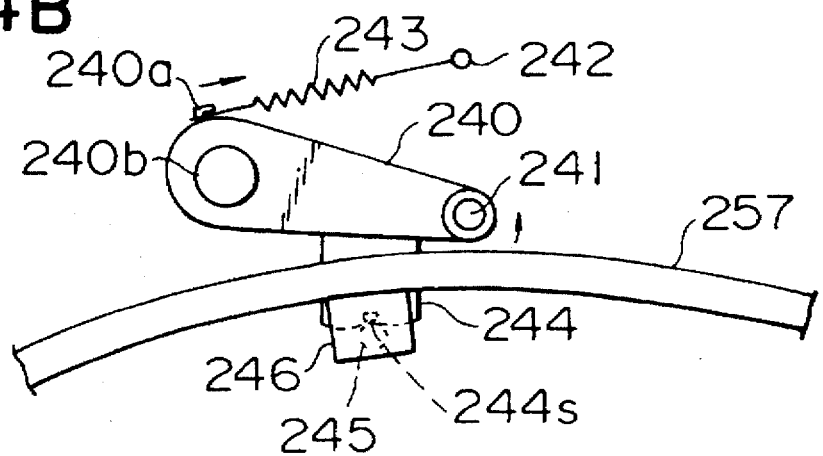
Figure 74C:
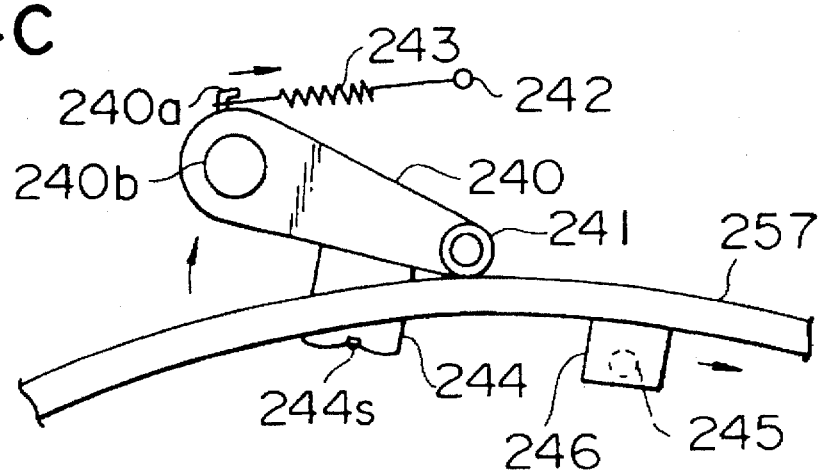

Accordingly, when the rotation of the rotary ring 257 makes the origin roller 245 come to the position opposite to the contact 244s via the guide plate 244a of the micro switch 244 as shown in FIG. 74B, the origin roller 245 pushes the contact 244s to make the contact 244s operate so that an origin position detection signal is sent out from the output terminal 244c (see FIG. 72).

Because in this occasion the contact 244s is pushed up as shown in FIG. 74B, the lever 240 rotates slightly counterclockwise with use of the rotary shaft 240b as a fulcrum. Accordingly, the spring 243 is stretched to thereby rotate the lever 240 further counterclockwise. As a result, the roller 241 is instantaneously separated from the outer circumference of the rotary ring 257 as shown in FIG. 74B.

When the rotary ring 257 further rotates so that the origin roller 245 passes through the guide plate 244b, the pressing force given to the contact 244s from the origin roller 245 disappears. Accordingly, upon reception of the pulling force of the spring 243, the lever 240 rotates clockwise around the rotary shaft 240b as a fulcrum. As a result, the lever 240 is pressed against the outer circumference of the rotary ring 257 by the spring 243 again as shown in FIG. 74C, so that the roller 241 is driven to rotate by the rotation of the rotary ring 257.

As described above, in this embodiment, the origin roller 245 is attached to the rotary ring 257 so as to be united with the rotary ring 257 into one body whereas the contact 244s of the micro switch 244 which is operated by the origin roller 245 when the rotary ring 257, that is, the lighting prism plate 251 reaches the position of the origin is arranged in a predetermined position together with a body of the micro switch. In this occasion, the ring position detection roller 241 integrally attached to the micro switch 244 is always pressed against the rotary ring 257 by the spring 243 through the lever 240 so that the roller 241 is driven to rotate by the rotation of the rotary ring 257 continuously. As a result, even in the case where the locus of rotation of the rotary ring 257 changes and the center of rotation thereof is displaced from its initial center 0 of rotation, the lever 240 is rotated clockwise or counterclockwise around the rotary shaft 240b as a fulcrum in response to the actual change of the locus of rotation of the rotary ring 257 so that the contact 244s of the micro switch 244 does not come off from the operating position where the contact 244s and the origin roller 245 are in contact with each other. Thus, the deviation of the locus of rotation of the rotary ring 257 is coped with.

Accordingly, in this embodiment, even in the case where the lighting prism plate or the rotary ring is deformed because of thermal expansion, or the like, the origin roller makes the contact of the micro switch operate to thereby detect the position of the origin accurately when the lighting prism plate passes through the position of the origin.

(Embodiments 13-2 and 13-3)

Embodiments 13-2 and 13-3 of the present invention shown in FIGS. 76A and 76B will be described below. In each of the drawings, parts of the same structure as in Embodiment 13-1 are identified by like reference characters in FIGS. 72 to 75 and the description of the parts will be omitted.

(Embodiment 13-2)

Figure 76A:
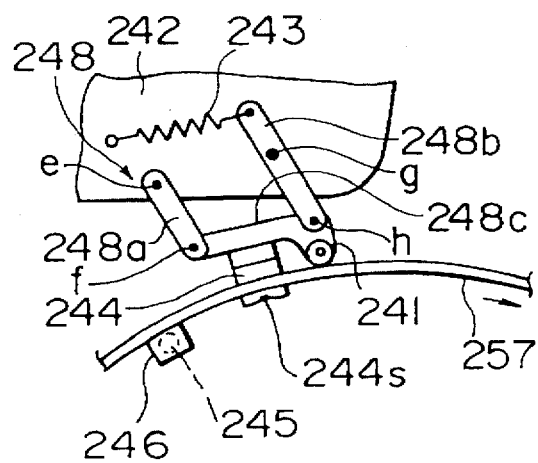
FIG. 76A is a plan view of an important part showing Embodiment 13-2 of the present invention.

As shown in FIG. 76A, the origin roller 245 mounted to the rotary ring 257 side by using the mount fitting 246 in this embodiment is the same as in Embodiment 13-1 but the point of difference between this embodiment and Embodiment 13-1 is in that the ring position driven lever 240 of Embodiment 13-1 as means for supporting the ring position detection roller 241 and the micro switch 244 is replaced by a parallel link mechanism 248 composed of links 248a to 248c.

In FIGS. 76A, the reference characters e to h designate fulcrums of the parallel link mechanism 248.

Also in the case of this embodiment, because the origin roller 245 makes the contact 244s of the micro switch 244 operate to thereby detect the position of the origin when the rotation of the rotary ring 257 makes the lighting prism plate reach the position of the origin and because the parallel link mechanism 248 operates in response to the change of the locus of rotation of the rotary ring 257, the positional relation between the contact 244s of the micro switch 244 and the origin roller 245 is compensated for so as not to be changed.

(Embodiment 13-3)

Figure 76B:
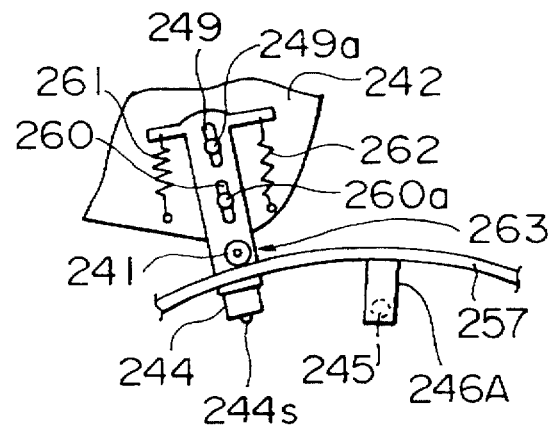
FIG. 76B is a plan view of important part in Embodiment 13-3 of the present invention.

This embodiment is configured as shown in FIG. 76B.

This embodiment is different from Embodiments 13-1 and 13-2 in that the origin roller 245 is rotatably attached to the mount fitting 264A provided on the rotary ring 257 side and having a length which is extended toward the center of the rotation of the rotary ring 257 by the thickness of the micro switch 244 and in that a slider mechanism 263 is provided as means for supporting the ring position detection roller 241 and the micro switch 244.

This slider mechanism 263 is configured not only so as to be guided toward the center of the rotation of the rotary ring 257, for example, by two long holes 249 and 260 and support shafts 249a and 260a inserted into the long holes 249 and 260 and supported to a fixed portion 242 but also so as to be linked to the fixed portion 242 by springs 261 and 262. Because the ring position detection roller 241 provided in the slider mechanism 263 tracks the change of the locus of rotation of the rotary ring 257, compensation is made so that the positional relation between the contact 244s of the micro switch 244 and the origin roller 245 is not changed.

(Embodiment 13-4)

In each of Embodiments 13-1 to 13-3 having been described above, as an example shown in FIG. 75, the rotary ring 257 is provided outside the lighting prism plate 251 so as to be concentric with the lighting prism plate so that the position of the origin of the lighting prism plate 251 is detected through the rotary ring 257.

In this embodiment, there is shown an example of a configuration in which the position of the origin of the lighting prism plate is directly detected by using the aforementioned technical thought of the present invention even in the case where the rotary ring 257 is not attached to the lighting prism plate 251. This embodiment will be described below with reference to FIGS. 77A to 77C.

In each of the drawings, parts of the same structure as in Embodiment 13-1 are identified by like reference characters in FIGS. 72 to 74C and the detailed description of the parts will be omitted.

In this embodiment, the origin roller 245 is rotatably provided in an end portion 264a of the mount fitting 264 which is arranged in a reference position as the origin of the outer circumferential portion of the lighting prism plate 251 so as to be above the surface of the lighting prism plate 251 as shown in the drawings and so as to be projected from the outer circumferential face of the lighting prism plate 251. Further, the micro switch 244 is provided on an upper side 265a of the prism position driven lever 265 nearly C-shaped in section and is arranged so that the contact 244s of the micro switch 244 is made to operate by the origin roller 245. Further, the prism position detection roller 266 is rotatably provided on the lighting prism plate 251 side of the lower side 265b of the lever 265 and fixed to the fixed portion 242 through the rotary shaft 267. The reference numeral 268 designates a spring which is designed so that not only the prism position driven lever 265 is rotated with use of the rotary shaft 267 as a fulcrum by the spring pressure of the spring 268 but also the prism position detection roller 266 is pressed on the outer circumferential portion of the lighting prism plate 251 by the spring pressure of the spring 268.

Figure 77A:
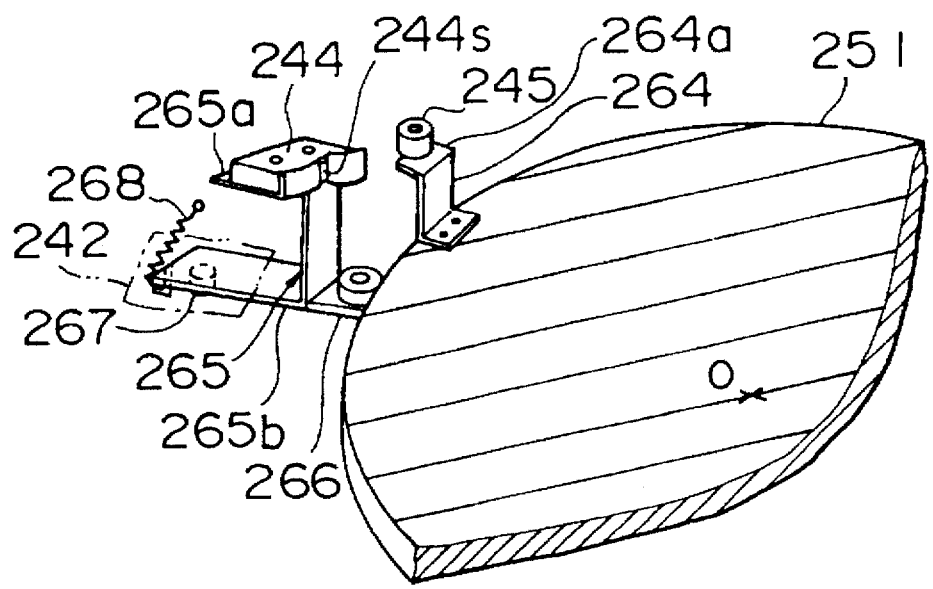
FIGS. 77A to 77C show the configuration of an important part of Embodiment 13-4 of the present invention.
Figure 77B:
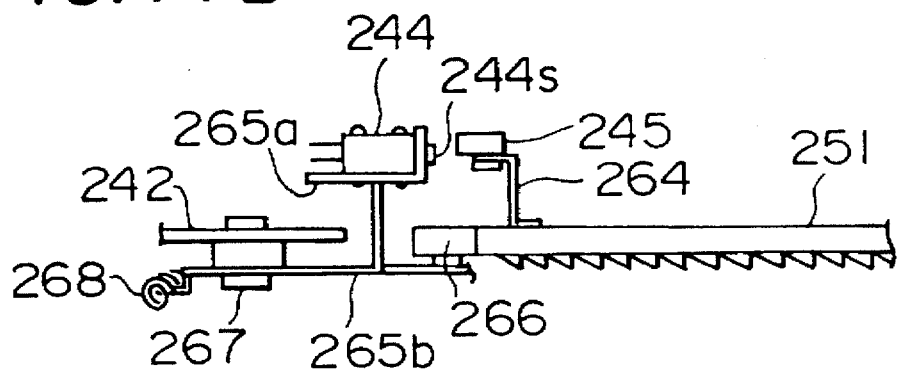
Figure 77C:
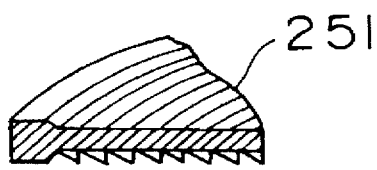

In the case where the rotary ring is not attached to the lighting prism plate as shown in this embodiment, the outer circumferential portion is preferably formed to be thicker than other portions as shown in FIG. 77C in order to increase the strength of the lighting prism plate 251.

Also in this embodiment configured as described above, even in the case where fluctuation occurs in the locus of rotation of the lighting prism plate 251 because of thermal expansion, or the like, the prism position driven lever 265 is rotated clockwise or counterclockwise around the rotary shaft 267 as a fulcrum so as to track the fluctuation of the locus. As a result, compensation is made so that the positional relation between the contact 244s of the micro switch 244 and the origin roller 245 is not changed.

The origin position detector in the solar lighting apparatus according to the present invention is not limited to the aforementioned embodiments.

For example, although each of Embodiments 13-1 to 13-3 is configured so that the origin roller 245 is arranged below the inner diameter of the rotary ring 257 and that the contact 244s of the micro switch 244 is arranged below the inner diameter of the rotary ring 257 correspondingly to the position of the origin roller 245, the present invention can be applied to the case where the origin roller 245 is arranged above the outer diameter of the rotary ring 257 and where the contact 244s of the micro switch 244 is arranged above the outer diameter of the rotary ring 257 correspondingly to the position of the origin roller 245 as shown in Embodiment 13-4 shown in FIG. 77A.

Although Embodiment 13-1 shown in FIGS. 73A and 73B has been described upon the case where the mount fitting 246 is composed of two parts, that is, a pressure plate 246a and a support plate 246b, the mount fitting 246 may be composed of one part obtained by uniting the two parts 246a and 246b into one body.

Although Embodiment 13-3 shown in FIG. 76B has been described upon the case where two long holes 249 and 260, two support shafts 249a and 260a and two springs 261 and 262 are provided, these long holes, support shafts and springs may be replaced by one long hole, one support shaft and one spring.

Similarly, Embodiment 13-4 may be modified so that the origin roller 245 is attached toward the lower face side of the outer circumference of the lighting prism plate 251 through the mount fitting 264 and that the prism position detection roller 266 provided in the prism position driven lever 265 correspondingly to the origin roller 245 is arranged in a position which is below the lower face of the lighting prism plate 251 and opposite to the origin roller 245.

Further, as for Embodiment 13-4, various changes can be made. For example, the prism position driven lever 265 may be replaced by a parallel link mechanism similar to the parallel link mechanism 248 of Embodiment 13-2 shown in FIG. 76A or by a slider mechanism similar to the slider mechanism 263 of Embodiment 13-3 shown in FIG. 76B.

In the aforementioned embodiments, the present invention can be also applied to a solar lighting apparatus having two or more lighting prism plates provided therein. In this occasion, one origin position detector as described above in the embodiments may be provided correspondingly to each of the lighting prism plates.

The relation between the direction of the prism notches in the lighting prism plate and the position of the origin as shown in the drawings for the respective embodiments is shown as an example but the relation is not limited to the example. This is because the position of the origin is decided on the basis of the position of the lighting prism plate position detection roller or the position of the ring position detection roller as well as the arrangement of the origin roller and further because the position of the origin can be adjusted also by control means such as a micro computer, or the like, which is arranged separately to generate a drive control instruction to control the drive of the lighting prism plate.

Being provided with the origin position detector in the solar lighting apparatus, the solar lighting controller of Embodiment 13 has excellent effects as follows.

(1) Because a mechanical micro switch is used as means for detecting the position of the origin instead of a light sensor which is a conventional optical detecting means, heat resistance is increased so that there is no risk of damaging the function of the micro switch caused by the temperature in use of this type apparatus.

(2) In the present invention, a prism position detection roller or a ring position detection roller is arranged so as to be always driven to rotate by the rotation of a lighting prism plate or a rotary ring which rotates together with the lighting prism plate in a concentrical position outside the lighting prism plate. Further, a prism position driven lever or a ring position driven lever provided with the detection roller and an origin roller is provided. Accordingly, the lever is designed such that even in the case where the locus of rotation of the lighting prism plate or the rotary ring fluctuate, the lever tracks the fluctuation of the locus so as to rotate around a predetermined shaft as a fulcrum with the assistance of a spring so that the positional relation between the origin roller and the contact of the micro switch is compensated for.

Accordingly, the position of the origin of the lighting prism plate can be detected always accurately regardless of the fluctuation of the locus of rotation thereof caused by the temperature condition, or the like, both in the case where the lighting prism plate is arranged alone and in the case where a rotary ring is arranged so as to be concentrically and integrally with the lighting prism plate.

(3) Accordingly, the lighting characteristic of the solar lighting apparatus can always hold stable characteristics.

What is claimed is:

1. A solar lighting apparatus comprising:

at least first and second lighting prism plates rotatably arranged and spaced apart by a predetermined distance, wherein prism angles of said lighting prism plates are controlled correspondingly to a height and azimuth of the sun so that sunlight refracted by said lighting prism plates is output in a predetermined direction; and wherein said first and second lighting prism plates satisfy at least one of the following conditions (1) and (2):

$$(|\theta H|+|\theta L|)/2 \geq (90°-\theta\alpha) \quad (1)$$

$$|\theta H|=|\theta L| \quad (2)$$

wherein θL represents a first outgoing angle between outgoing light and a line normal to the first lighting prism plate when objective light rays at a first height of the sun are output from said first lighting prism plate, θH represents a second outgoing angle between outgoing light and a line normal to the second lighting prism plate when light rays at a second height of the sun are output from said second lighting prism plate, and θα represents a permissible range of incident angles through which said second lighting prism plate can be controlled.

2. A solar lighting apparatus according to claim 1, wherein micro prism portions are formed on at least one surface of at least one of said first and second lighting prism plates.

3. A solar lighting apparatus according to claim 1, wherein micro prism portions are formed on an outgoing face portion of each of said first and second lighting prism plates, a distance of displacement S is provided between an end portion of inoperative faces of the micro prism portions of the first lighting prism plate and an end portion of inoperative faces of the micro prism portions of the second lighting prism plate so that said distance of displacement S is determined in a range of 0<S<P (P: prism pitch) so that transmittance is maximized.

4. A solar lighting apparatus comprising:

at least one rotatable lighting prism plate, wherein a prism angle of said lighting prism plate is controlled correspondingly to a height and azimuth of the sun so that sunlight refracted by said lighting prism plate is output in a predetermined direction;

wherein an inoperative face angle a of said lighting prism plates satisfies the following expressions:

$$90°<\alpha\leq\theta e \quad (1)$$

$$\theta h \leqq \alpha \leqq \theta e \qquad (2)$$

in which θe represents an outgoing angle of light output of the lighting prism plate at a first height of the sun, and θh represents an outgoing angle of light output of the lighting prism plate at a second height of the sun.

5. A solar lighting apparatus according to either one of claims 1 or 4, wherein when a plurality of lighting prism plates are utilized, at least one lighting prism plate has a material different in Abbe number.

6. A solar lighting apparatus according to claim 5, wherein when first and second lighting prism plates are used, one member selected from the group of polymethyl methacrylate, polymethylpentene, norborene resin, and amorphous polyolefin is used for the first lighting prism plate and polycarbonate is used for the second lighting prism plate.

7. A solar lighting apparatus according to either one of claims 1 or 4, wherein a high-refractive material, such as polycarbonate, is used as a material for each lighting prism plate.

8. A solar lighting apparatus according to either one of claims 1 or 4, wherein in order to prevent surface reflection of light rays, each lighting prism plate is coated with at least one coating layer of a fluorine anti-reflection film having a uniform thickness.

9. A solar lighting apparatus according to either one of claims 1 or 4, further comprising a driver/holder for each lighting prism plate, each driver/holder including:
   a drive means having a driving roller for rotating said lighting prism plate based on a predetermined control instruction corresponding to the height and azimuth of the sun; and
   a pressure means for elastically applying pressure to said lighting prism plate from one side.

10. A solar lighting apparatus according to claim 9, wherein:
    said pressure means is constituted by at least one pressure roller for giving pressing force to said lighting prism plate from one side through a spring;
    said driver/holder further including at least one pair of driven rollers which are arranged in predetermined positions opposite to said pressure roller and which rotate together with rotation of said lighting prism plate while maintained in said predetermined positions to thereby support the pressing force of said pressure roller.

11. A solar lighting apparatus according to claim 9, wherein said drive means has a motor for giving rotation force to the driving roller directly or indirectly, a sunlight condition detector for detecting movement of the sun height and azimuth, and a setter for receiving a signal from said sunlight condition detector and giving a control instruction to said motor.

12. A solar lighting apparatus according to claim 9, wherein said drive means has a first torque transmission means provided on an outer circumference of said driving roller, and a second torque transmission means for receiving torque transmitted by said first torque transmission means, and wherein said lighting prism plate is driven based on a control instruction given to said drive means.

13. A solar lighting apparatus according to either one of claims 1 or 4, further comprising a lighting prism plate holder for holding said lighting prism plates by using a plurality of holding plates made of transparent resin.

14. A solar lighting apparatus according to claim 13, wherein said holding plates are mounted on a metal rotary ring through fittings so that differences in expansion/contraction due to thermal expansion coefficients of said holding plates and said lighting prism plates can be absorbed.

15. A solar lighting apparatus for a skylight, comprising:
    lighting means for performing lighting corresponding to a height and azimuth of the sun, a direction of light rays of which changes every moment, wherein said lighting means comprises a plurality of lighting prism plates arranged one on another and spaced apart by a predetermined distance, wherein each lighting prism plate is rotated corresponding to the height and azimuth of the sun.

16. A solar lighting apparatus for a skylight according to claim 15, further comprising a light distribution plate arranged in an output side of said lighting means.

17. A solar lighting system apparatus in which one or more lighting prism plates are rotatably arranged and spaced apart by predetermined intervals in a lighting portion and a prism angle of each lighting prism plate is controlled based on a height and azimuth of the sun so that sunlight refracted by each said lighting prism plate is output in a predetermined direction, said solar lighting apparatus comprising:
    an origin roller provided at a reference position acting as an origin of rotation of each said lighting prism plate on an outer circumferential portion of each lighting prism plate;
    a mechanical micro switch having a contact provided in a locus of rotation of each said lighting prism plate so that said contact is operated by said origin roller; and
    a prism position driven means for supporting a prism position detection roller contacting the outer circumferential portion of each said lighting prism plate so that said prism position driven means rotates together with rotation of each said lighting prism plates while tracking the locus of rotation of each lighting prism plate and for supporting said micro switch so as to track a positional relation between said contact of said micro switch and said origin roller.

18. A solar lighting apparatus in which one or more lighting prism plates are rotatably arranged and spaced apart by predetermined intervals in a lighting portion and a prism angle of each lighting prism plate is controlled based on a height and azimuth of the sun so that the sunlight refracted by each said lighting prism plate is output in a predetermined direction, said solar lighting apparatus comprising:
    an origin roller provided at a reference position acting as an origin of rotation of each lighting prism plate on an outer circumferential portion of a concentrical rotary ring provided integrally on an outer circumference of each said lighting prism plate;
    a mechanical micro switch having a contact provided in a locus of rotation of said rotary ring so that said contact is operated by said origin roller; and
    ring position driven means for supporting a ring position detection roller contacting the outer circumferential portion of said rotary ring so that said ring position driven means rotates together with rotation of said rotary ring while tracking the locus of rotation of said locus of said rotary ring and for supporting said micro switch so as to track a positional relation between said contact of said micro switch and said origin roller.

19. In a solar lighting apparatus in which one or more lighting prism plates are rotatably arranged and spaced apart by predetermined intervals in a lighting portion and a prism angle of each said lighting prism plate is controlled based on a height and azimuth of the sun so that sunlight refracted by each said lighting prism plate is output in a predetermined direction;

a solar lighting controller comprising a central processing unit including a solar position detector for detecting the height and azimuth of the sun at a plurality of points, when viewed from a position where said solar lighting apparatus is set, and an arithmetic operation storage means, wherein a solar position signal containing the height and azimuth of the sun at each point given from said solar position detector is given to said central processing unit and subjected to arithmetic processing in said central processing unit so that an instruction necessary for control of rotation of said lighting prism plate is generated from said central processing unit to control the prism angle of said lighting prism plate based on the detected position of the sun.

20. In a solar lighting apparatus according to claim 19, further comprising a setter including a time measurement function capable of determining at least a date and time, wherein solar position data every hour is read into said setter in connection with the time function to thereby set the prism angle of each said lighting prism plate.

21. In a solar lighting apparatus according to either one of claims 18 or 19, further comprising a sunlight lighting condition detector arranged opposite each lighting prism plate, wherein:

an output signal of the lighting condition detector is output to the central processing unit, arithmetic processing is performed in the central processing unit, and a corrected rotating instruction is issued from the central processing unit to thereby control rotation of the lighting prism plate.

22. A solar lighting controller according to either one of claims 18 or 19, wherein when a plurality of said lighting prism plates are provided, a lighting prism plate driving process is carried out so that said lighting prism plates are driven alternatively and intermittently in a predetermined sequence in every cycle of said driving process.

23. A solar lighting controller according to claim 22, wherein a predetermined wait time is provided before a start of a next cycle of said driving process after completion of one cycle of said driving process.

24. A solar lighting controller according to either one of claims 18 or 19, wherein when a plurality of said lighting prism plates are provided, driving elements including electric motors, a number of which is less than a number of said lighting prism plates, are provided so that said driving elements are used commonly to said lighting prism plates through switching means.

\* \* \* \* \*

UNITED STATES PATENT AND TRADEMARK OFFICE
CERTIFICATE OF CORRECTION

PATENT NO. : 5,729,387
DATED : March 17, 1998
INVENTOR(S) : Kazuo TAKAHASHI, et al.

It is certified that error appears in the above-identified patent and that said Letters Patent is hereby corrected as shown below:

On the title page,,item [30], the first listed Foreign Application Priority Data should be:

--Feb. 17, 1995  [JP]  Japan  ........... 7-052116--

Signed and Sealed this

Nineteenth Day of May, 1998

Attest:

BRUCE LEHMAN

Attesting Officer

Commissioner of Patents and Trademarks